United States Patent
Blanton, Jr. et al.

(10) Patent No.: US 12,117,532 B1
(45) Date of Patent: Oct. 15, 2024

(54) MOBILE BASE STATION CALIBRATION AND RECALIBRATION

(71) Applicant: RENU ROBOTICS CORP., San Antonio, TX (US)

(72) Inventors: Michael Odell Blanton, Jr., San Antonio, TX (US); Kristopher Charles Kozak, San Antonio, TX (US)

(73) Assignee: RENU ROBOTICS CORP., San Antonio, TX (US)

( * ) Notice: Subject to any disclaimer, the term of this patent is extended or adjusted under 35 U.S.C. 154(b) by 671 days.

(21) Appl. No.: 17/408,353

(22) Filed: Aug. 20, 2021

Related U.S. Application Data

(63) Continuation-in-part of application No. 17/029,992, filed on Sep. 23, 2020, now Pat. No. 11,944,032, and a continuation-in-part of application No. 16/748,465, filed on Jan. 21, 2020, now Pat. No. 11,510,361.

(60) Provisional application No. 62/904,451, filed on Sep. 23, 2019, provisional application No. 62/918,161, filed on Jan. 17, 2019.

(51) Int. Cl.
*G01S 19/07* (2010.01)
*G01S 19/06* (2010.01)

(52) U.S. Cl.
CPC ............ *G01S 19/071* (2019.08); *G01S 19/06* (2013.01); *G01S 19/073* (2019.08)

(58) Field of Classification Search
CPC ....... G01S 19/071; G01S 19/073; G01S 19/06
See application file for complete search history.

(56) References Cited

U.S. PATENT DOCUMENTS

| | | |
|---|---|---|
| 5,204,814 A | 4/1993 | Noonan et al. |
| 7,668,631 B2 | 2/2010 | Bernini |
| 8,958,939 B2 | 2/2015 | Einecke et al. |
| 9,026,299 B2 | 5/2015 | Johnson et al. |
| 9,137,943 B2 | 9/2015 | Einecke et al. |
| 9,173,343 B2 | 11/2015 | Bernini |
| 9,848,529 B2 | 12/2017 | Franzius et al. |
| 10,104,837 B2 | 10/2018 | Hashimoto et al. |
| 10,321,625 B2 | 6/2019 | Einecke et al. |
| 10,429,487 B1 * | 10/2019 | Fowe ................ G01S 5/0289 |
| 10,698,417 B2 | 6/2020 | Churavy et al. |
| 10,824,163 B2 | 11/2020 | Einecke et al. |
| 10,856,467 B2 | 12/2020 | Maggard |
| 10,888,046 B2 | 1/2021 | Gorenflo et al. |
| 2014/0163779 A1 * | 6/2014 | Braunstein ............ G05D 1/021 701/25 |
| 2016/0274241 A1 * | 9/2016 | Gentry ................ G01S 19/03 |
| 2017/0108867 A1 | 4/2017 | Franzius et al. |
| 2019/0155296 A1 * | 5/2019 | Moore ............... G05D 1/0274 |
| 2019/0196481 A1 * | 6/2019 | Tay .................... G01S 17/86 |
| 2019/0302276 A1 * | 10/2019 | Sandford ........... G01S 19/485 |

(Continued)

*Primary Examiner* — Jaime Figueroa
*Assistant Examiner* — Zachary Joseph Wallace

(57) ABSTRACT

Disclosed is an approach for recalibrating a mobile base station (MBS) after it has moved to a non-survey location by determining a satellite-signal-accurate (SSA) location for the mobile base station based on GPS signals received by the mobile base station and further determining a near-survey-accurate (NSA) location for the mobile base station based on the determined SSA location for the mobile base station and applying an offset calculated by the navigational vehicle based on relatively fixed objects for which near-survey-accurate locations are known.

20 Claims, 22 Drawing Sheets

(56) References Cited

U.S. PATENT DOCUMENTS

| | | |
|---|---|---|
| 2019/0331758 A1* | 10/2019 | Malkes ................. G01S 7/4004 |
| 2019/0346848 A1* | 11/2019 | Zhou .................... G05D 1/0088 |
| 2020/0370890 A1* | 11/2020 | Hamilton ................. G08G 1/04 |
| 2021/0029873 A1 | 2/2021 | Yamauchi et al. |
| 2021/0051317 A1* | 2/2021 | Yan .......................... G06T 7/80 |
| 2021/0059112 A1 | 3/2021 | Kim |
| 2021/0096574 A1 | 4/2021 | Lee et al. |
| 2021/0123742 A1 | 4/2021 | Yang et al. |
| 2021/0127569 A1 | 5/2021 | Gruhler et al. |
| 2021/0153428 A1 | 5/2021 | Mittmann et al. |
| 2021/0157327 A1 | 5/2021 | Lee et al. |

* cited by examiner

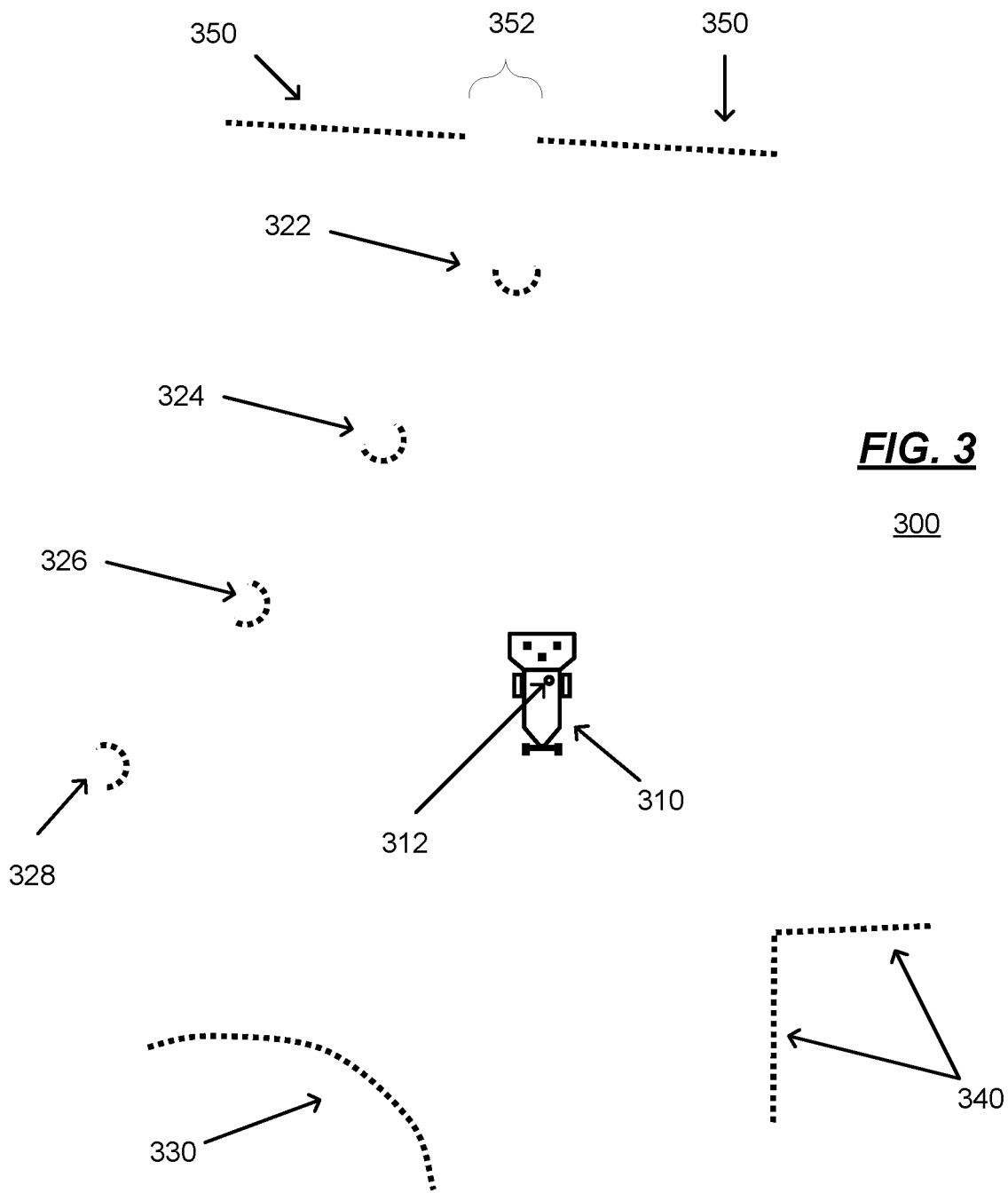

600

620

640

660

1200

MOBILE BASE STATION CALIBRATION AND RECALIBRATION

CROSS-REFERENCE TO RELATED APPLICATIONS

This application is a continuation-in-part of, claims benefit of and priority to, and incorporates by reference herein in their entirety the following: U.S. patent application Ser. No. 16/748,465, filed Jan. 21, 2020, titled "SYSTEM AND METHOD FOR AUTOMATED GROUNDS MAINTENANCE", which in turn claims benefit and priority to U.S. Provisional Application No. 62/918,161, filed Jan. 17, 2019, titled "SYSTEM AND METHOD FOR AUTOMATED GROUNDS MAINTENANCE"; and U.S. patent application Ser. No. 17/029,992, filed Sep. 23, 2020, titled "AUTONOMOUS VEHICLE SYSTEMS AND METHODS", which in turn claims benefit and priority to U.S. Provisional Application No. 62/904,451, filed Sep. 23, 2019, titled "AUTONOMOUS VEHICLE SYSTEMS AND METHODS".

BACKGROUND

Under normal circumstances a GPS receiver can accurately determine the location of an autonomous vehicle to within certain tolerances—tolerances that have improved over time in step with improvements and refinements in GPS technologies. The accuracy of the location determinations for an autonomous vehicle will naturally carry over to determinations made by the autonomous vehicle for site features such as fixed obstacles and dynamic objects (as discussed earlier herein). However, there are situations when more accurate location determinations are needed and GPS alone is not precise enough. Moreover, for real-time GPS location determinations, several sources of error related to timing, satellite orbits, and atmospheric conditions (among other things) may negatively affect the receipt of GPS signals and thereby result in varying and changeable degrees of inaccuracy in GPS location determinations at different times.

Stated differently, typical GPS receivers that utilize RTK corrections can be accurate to within a few centimeters but, while these measurements can be substantially accurate relative to the one or more base stations that provide corrections (i.e., locally accurate), the accuracy in a global frame (e.g., WGS84) is dependent on how accurately these base stations have been surveyed. While performing an accurate survey of an RTK base station location is generally preferred, an accurate survey may require purpose-built survey equipment or a relatively long sample auto-survey process may required too much time (e.g., two days or more) to achieve sub-centimeter accuracy. For a mobile base station, neither of these options is practical.

SUMMARY

Disclosed herein are various implementations directed to utilization of a GPS base station for determining the extent of the GPS signal inaccuracies and mitigating them with regard to both initial location determinations made directly (i.e., made by the autonomous vehicle for its own location) and indirectly (i.e., made by an autonomous vehicle for sensed/detected fixed obstacles and dynamic objects) as well as subsequent location determinations for the autonomous vehicle and possibly additional refinements to the locations of fixed obstacle and dynamic objects after the mobile base station has moved (e.g., leaving the site and then returning to the site in a location different from its original location).

More specifically, disclosed herein are various implementations directed to systems, processes, apparatuses, methods, computer-readable instructions, and other implementations for recalibrating a mobile base station communicatively coupled to an autonomous vehicle, the method comprising: determining a satellite-signal-accurate (SSA) location for the mobile base station based on GPS signals received by the mobile base station; and determining a near-survey-accurate (NSA) location for the mobile base station based on the determined SSA location for the mobile base station and applying an offset calculated by the navigational vehicle.

For certain such implementations: the offset calculated by the navigational vehicle is based on a difference between a satellite-signal-accurate (SSA) location determined for the navigational vehicle based on GPS signals received by the navigation vehicle, and a near-survey-accurate (NSA) location determined for the navigational vehicle; the near-survey-accurate (NSA) location determined for the navigational vehicle is based on the navigational vehicle sensing the relative locations of a plurality of objects each having a known near-survey-accurate (NSA) location; the known near-survey-accurate (NSA) location for each object from among the plurality of objects was previously calculated based on a direct-survey-accurate (DSA) location; the known near-survey-accurate (NSA) location for each object from among the plurality of objects was previously calculated by the navigational vehicle or by a second navigational vehicle; a subset of objects from among the plurality of objects are dynamic objects; and/or the dynamic objects are solar panels and posts.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, there is shown in the drawings example constructions of the implementations; however, the implementations are not limited to the specific methods and instrumentalities disclosed. In the drawings:

FIG. 3 is a diagrammatic illustration, representative of the various implementations disclosed herein, of an autonomous vehicle sensing for obstacles in its operating environment such as, for example, an autonomous mower using LIDAR to sense for solar panels, solar panel posts, and other obstacles on a solar farm said autonomous mower may be tasked to mow;

DETAILED DESCRIPTION

Figure 1A:
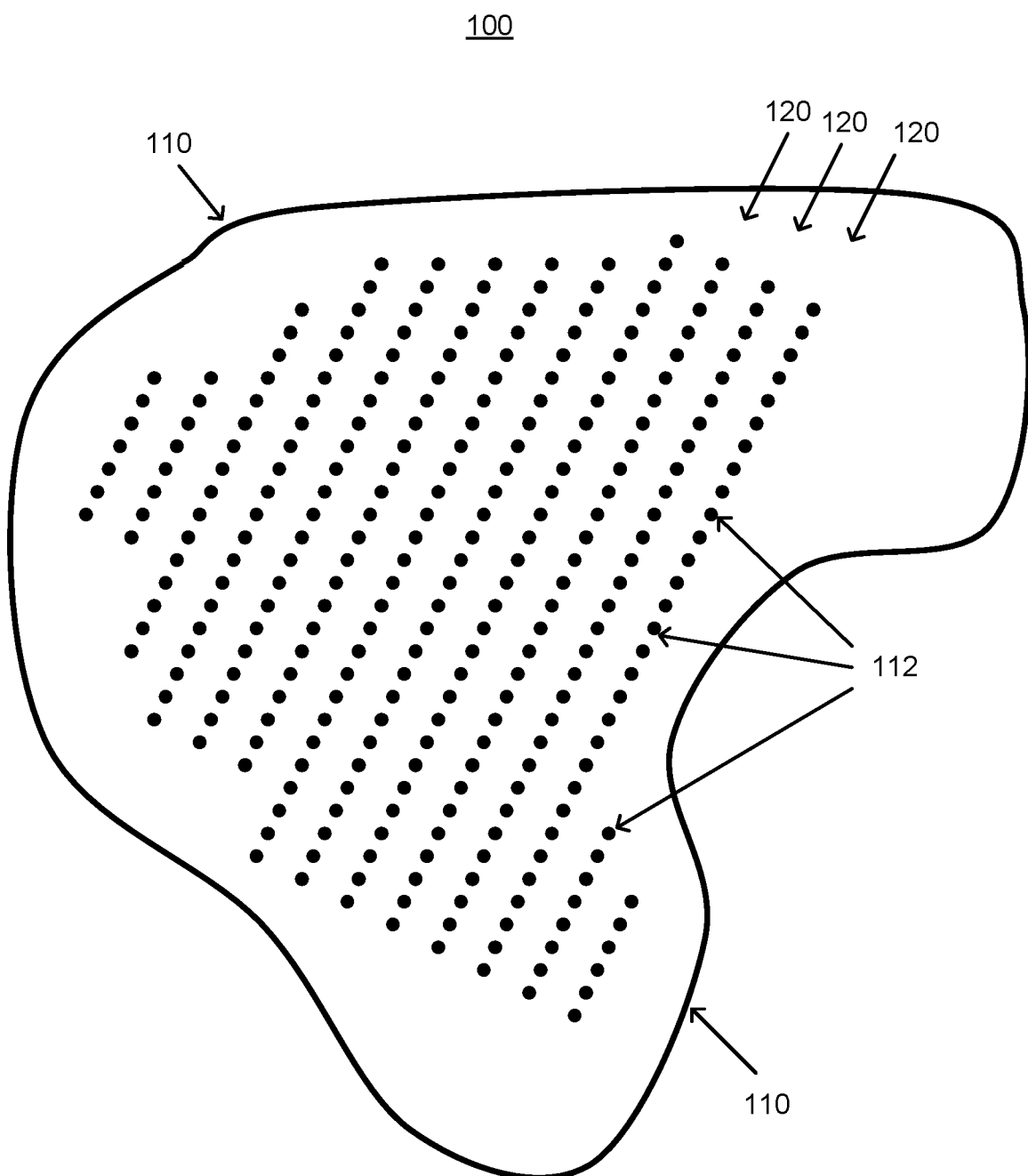
FIG. 1A is a general illustration of an exemplary operating site logically bounded and populated with well-ordered obstacles representative of a typical operating environment for the various implementations disclosed herein.

Disclosed herein are approaches for recalibrating a mobile base station (MBS) after it has moved to a non-survey location by determining a satellite-signal-accurate (SSA) location for the mobile base station based on GPS signals received by the mobile base station and further determining a near-survey-accurate (NSA) location for the mobile base station based on the determined SSA location for the mobile base station and applying an offset calculated by the navigational vehicle based on relatively fixed objects for which near-survey-accurate locations are known.

An understanding of various concepts is helpful toward a broader and more complete understanding of the various implementations disclosed herein, and skilled artisans will readily appreciate the implications these various concepts have on the breadth and depth of the various implementations herein disclosed. Certain terms used herein may also be used interchangeably with other terms used herein and such terms should be given the broadest interpretation possible unless explicitly noted otherwise.

For example, references made herein to GPS are non-limiting and are merely exemplary and representative of any and all GNSSs with no intention whatsoever to limit the disclosures herein to GPS alone; instead, such references should be read as broadly as possible and inclusive of and equally applicable to any and all GNSSs. Moreover, any reference to a single GNSS system—and in particular any reference to GPS—should be deemed a reference to any GNSS individually, combinations of GNSSs, or all GNSSs collectively.

Exemplary Implementation

An autonomous vehicle representative of various implementations disclosed herein may make a 3D measurement of the environment using LIDAR or another vehicle-mounted sensor to yield data in the form of a point cloud containing position of various points in the environment relative to the sensor (e.g. solar panel surface, solar array support structure, ground, grass, other vegetation, people, etc.).

Single frame measurements for many sensors including LIDAR may not provide sufficient information to distinguish the target object (such as solar panels) from other objects in the environment. However, by aggregating sensor data as the vehicle moves a clearer representation of the environment can be obtained that can help fill in gaps in the measurements. Sensors such as many types of LIDAR can have large gaps between individual measurement points that are fixed relative to the sensor by moving the sensor. Moving the sensor can also provide close-up measurements of distant locations which can then be connected together via aggregation. While measurement performance can decline quickly as distance from the sensor increases, moving the sensor allows the environment to be observed from multiple locations and at a smaller distance for objects of interest toward which the autonomous vehicle can move. The foregoing notwithstanding, however, it should be noted that nothing herein precludes the use of single frame measurements as sources for object detection by the various implementations herein disclosed.

When the measurements are sufficiently aggregated, the points associated with the panels can be segmented (separated) from the rest of the points. Multiple known methodologies can be used to do this, from using a simple height threshold (i.e., selecting all points above a certain height) to fitting mathematical planes to the data and removing outlying points (i.e., those that are far from the plane.) In this manner, the likelihood of misattributing points to the panels can be mitigated. In addition, removal of points associated with the ground is important to avoid mis-fitting planes to the data.

To fit the planes to the data, these mathematical planes—defined by a point on the plane and a 3D vector that is in a direction normal to the plane—can be fit to the remaining data. Random Sample Consensus (RANSAC) can then be used to find multiple distinct, non-co-planar, planes in a data set. Each plane with a minimum number of associated valid measured points, of course noting that any three points that are not all collinear can define a plane, and therefore requiring a much higher number of points are needed to ensure that the points correspond to a true approximately planar surface in the environment.

After identifying the points associated with distinct planes, the orientation of the panels can be determined based on the tilt and alignment of the panels based on the direction of the long edge using a combination of methods which might include detecting the edge directly, finding the major axis of the points associated with the panels, and/or using additional a priori data about the installed orientation of the panels. The cross-row extents of the panels are then determined by identifying the edges of the panels in the data in the cross-row direction. The a priori known size/shape of the panel sections can be used to refine these measurements. Finally, the centerline is fit to the center of the extents and aligned with the panels.

When a solar panel is movable and the pivot point is offset from the top surface of the panel, the centerline can be moved to the pivot based on the known geometry of the panels. Although this adjustment might only change the position estimate by a small amount, this offset may be crucial for yielding the desired positioning precision of the autonomous vehicle, such as an autonomous mower, to get complete mowing coverage of the site without running into structures on the site.

Finally, the panel detection may then be used to determine the position of the autonomous mower relative to a row of solar panels. This measurement can be used in two ways: (1) to ensure that the autonomous vehicle (or "robot") maintains a safe distance from the structures; and (2) to provide a high precision measurement of lateral position (cross-row positioning) when GPS is unavailable and/or real-time kinematic (RTK) corrections or other utilized positioning methods are unreliable. Therefore, by creating a map that stores the georegistered centerlines of the panels, the live measurements can be compared to the centerlines in the map and used to offset the estimated position of the autonomous vehicle based on map data versus detected data.

Notably, for the various implementations disclosed herein, the base station position need not be globally accurate, but only that measurements made by a subsequent base station be reconciled to the measurements made by previous base stations (including the initial base station) with global accuracy being a convenient reference but not a necessary one. Stated differently, numerous alternative local- and wide-area augmentation methods exist such as, for example, the use of RTK with a local base station, as well as various approaches using Satellite Based Augmentation Systems (SBAS) that may utilize networks of base stations for generating corrections to improve accuracy. Each of these additional or alternative approaches can be both precise and accurate, although many such high accuracy systems or services can entail expensive hardware, subscription services, and/or nontrivial setup procedures. Accordingly, while local accuracy/precision is relevant, global accuracy is not as relevant, so an inaccurately surveyed base station (providing RTK corrections) that can be setup in a matter of minutes and requires only modestly priced hardware may be sufficient for site-based positioning and will continue to suffice so long as the base station is not moved. Once the base station is moved, however, measurements that were made relative to the inaccurately surveyed base station are no longer usable but can be made useable again by adjusting the assumed ("surveyed") position of the base station in a manner that minimizes the error of the surveyed points—that is, where several known unique points measured with the original base station location are again measured with a new base station in its new location. The difference between the measurements of such known, unique points can then be used to logically "shift" the assumed position of the base station. As such, the new base station is not physically moved but only its assumed surveyed position is changed to conform to the original survey as a frame of reference. After making this logical shift, the measurements made on the site can be reconciled with the measurements made with the original base station.

Autonomous Vehicles

Various implementations disclosed herein relate to autonomous vehicles (or "robots") such as, for example, mobile maintenance robots, autonomous mowers, or other such vehicles and devices that might be utilized for any purpose such as, for example, maintenance operations at renewable energy installations. Even in this narrow but representation example, however, such maintenance operations may include a diverse range of activities and tasks including without limitation mowing, spraying for pests, spraying insecticides, washing of solar panels, security monitoring of the area, replacement of failed components, or other maintenance operations including but not limited to inspections of combiner boxes, wire connections, or infrastructure (including solar panels), and where any such "inspections" may be with performed with multispectral cameras capturing image data within specific wavelength ranges across the electromagnetic spectrum.

For the various implementations herein disclosed, an autonomous vehicle may comprise a variety of sensors, such as (but not limited to) LIDAR (light detection and ranging), RADAR (Radio Detection and Ranging), IMU (inertial measurement unit), inertial navigation systems, temperature sensors, humidity sensors, noise sensors, accelerometers, pressure sensors, GPS (global positioning system), ultrasonic sensors, cameras or other sensors. LIDAR may include, in some examples, 3D laser scanning, or a combination of 3D scanning and laser scanning. The autonomous vehicle may implement autonomous navigation to traverse a work area using sensors for collision avoidance and adjusting routing as needed. The autonomous vehicle may be communicatively connected to a central management system through a GPRS (General Packet Radio Service) network or other cellular data network or cell-based radio network technology mobile network, an IEEE 802.11x wireless network or any other network modality. Any number of networks (of the same or different types) may be present and used in any combination suitable for performing any one or more of the methodologies described herein.

Autonomous Vehicle Navigation

One way of establishing a route for an autonomous vehicle to achieve complete coverage is to manually drive the route with the autonomous vehicle so that it can record the route and later repeat the traversal of said route. However, this method of training relies on the operator to select the route that the vehicle will follow and, in addition to the human effort required, the route selected by the operator may not be the most efficient route for the vehicle overall or in different operating conditions.

Alternative approaches to route development may be based on simultaneous localization and mapping (SLAM) techniques. SLAM provides the capability to generate a map without human intervention combined with the ability to localize within this map, and self-localization of the autonomous vehicle can be performed even if the process of generating the map is still in progress. On the other hand, SLAM techniques work well in indoor environments where there are a lot of features and well-defined physical boundaries. In unbound outdoor environments, however, there are fewer navigational features for SLAM to reference thus making SLAM substantially less effective. Of course, while the terms "mapping" (i.e., locations of objects within an environment) and "positioning" (i.e., determining a location within an environment based on a map) might be distinguishable from "routing" (i.e., choosing a navigational path within an environment), these various terms are closely related and may be used interchangeably herein consistent with the idea that that navigating through an environment (i.e., following a route) requires an autonomous vehicle to know its location within the environment.

To help compensate for the shortcomings of SLAM, some autonomous mowing systems utilize a boundary wire to surround a mowing area and emit a weak electromagnetic signal that can be detected by the autonomous mower. While systems that use boundary wires may help increase the efficacy of SLAM, they have their own shortcomings. For example, defining a mowing area requires installing the boundary wire, which may be impractical for the large, remote areas on which renewable energy farms are often located. Similarly, redefining existing mowing areas requires reinstalling new wire in a new pattern, which again is impractical for many renewable energy farms. As such, while the use of a boundary wire may be suitable for relatively small residential and small business environments, it is not suitable for utilization on a larger scale such as energy production sites.

It is possible to guide an autonomous vehicle with GPS-based localization along paths and routes. Paths are generally lines of travel which are defined in a way to allow the vehicle to safely traverse near and around static obstacles in the operating space. A path is considered to be a line that exists in real world space between two GPS coordinate points, and a path may have a start point and an end point defined by GPS coordinates (or other equivalents). A path can be either straight or curved, and is typically definable by some mathematical geometric construct such as a line or curve in two-dimensional space for example. As used herein, "GPS coordinates" or other coordinate-specific examples are exemplary only and should be understood to include any and all alternate coordinate sources such as other WGS84 coordinates (as used by GPS), any of the several known Cartesian coordinate frames, or other coordinate systems without limitation.

A path is used by the autonomous vehicle as a guide for driving. As the vehicle traverses along the path, the vehicle compares its position via GPS coordinates to the path and makes corrections as necessary to follow the path as accurately as the mechanical capabilities and/or precision of the sensors of the vehicle will allow. The autonomous vehicle may also incorporate other techniques to follow a path such as LIDAR-based localization and inertial navigation/dead reckoning (particularly in areas where GPS is unavailable or unreliable). For example, the panel-and-post (P&P) detection/localization methods described herein may be used as a specific implementation that utilizes LIDAR-based localization. Routes are considered to be a collection of paths, which are interconnected at nodes, where the nodes are either endpoints or intersection points between paths.

For example, certain implementations disclosed herein may utilize approaches for determining optimized task-specific routes such as mowing routes for an autonomous mower. Such implementations may use information about a site to automatically plan a mowing route for transit to and from a mowing region and the actual mowing of the region. Site information may include, for example, overhead/aerial/satellite imagery; CAD, blueprint or similar data that provides precise geometry and location of structures; data, such as from cameras, LIDAR, or other sensors that has been recorded on site using either sensors on the autonomous vehicle, or data from other sensors, such as from a surveygrade laser scan or a purpose-built data collection system; manually or automatically generated region, route or path information that explicitly indicates areas to drive and/or mow; and/or manually or automatically generated annotations or metadata to site data (of any type).

For some implementations, a mowing route may include two components: transit sections and mowing sections. Transit sections are paths where the autonomous mower moves from one area to another without mowing, and mowing sections are areas where the autonomous mower mows vegetation (e.g., has its cutting mechanism running). The mowing route may be optimized for distance, energy efficiency, and/or fastest effective mow rate (taking into consideration transit and recharge times) or other criteria.

Select implementations may also utilize a route network with annotated mowing regions, said route network including geometric or geographical points and connections between points along with relevant annotations or metadata. Any of several existing route-finding algorithms can be used with the route network to systematically find routes from one point to another within the network. Moreover, route-finding algorithms can solve for routes that optimize a specific metric (such as route length) when more than one viable route exists and multiple metrics are available from which to select.

In some instances it may be possible to predefine routes that provide full mowing coverage in mowing regions; however, such routes may not accommodate differences in the vehicle (such as if a smaller mower deck is used than when the original routes were created) or in the mowing parameters (such as if the desired path overlap changes). Additionally, in cases where mowing is performed in repetitive patterns (such as along multiple parallel rows), and where there is more than one entrance/exit to a mowing region (such as at both ends of a row of solar panels), the optimal entrance to a region and exit from a region may vary based on where the autonomous mower starts.

In addition, multiple methodologies can be used to generate a full route that includes an arbitrary number of transit regions and mowing regions. For example, one approach might minimize the total distance traveled (transit distance plus mowing distance) where the order in which the mowing regions are sequenced may be determined automatically. Another approach might sequence the mowing regions in a specified order where the length of transit is minimized or, in some alternative implementations, determined on-the-fly based on the entry/exit points of the regions.

For specific implementations, the paths to achieve full mowing coverage of a mowing region may be stored in a data store or, alternatively, computed on-demand (or on-the-fly) so as to achieve full coverage of the mowing region. For other implementations, the paths that are within the mowing region and the corresponding mow pattern—that is, the order in which the mow paths are traversed—may be computed on-demand or on-the-fly.

GPS/GNSS

Various implementations herein disclosed utilize GPS and/or other GNSS system for navigation and to support mapping of an operation site, and several such implementations may utilize more than one such GNSS and/or make use of multi-frequency receivers that support multiple or all of the deployed GNSS constellations.

A global navigation satellite system (GNSS) is a satellite navigation system with global coverage such as, for example, the U.S. Global Positioning System (GPS). Other examples of GNSSs include Russia's Global Navigation Satellite System (GLONASS), China's BeiDou Navigation Satellite System (BDS), and the European Union's Galileo system.

GPS provides geolocation and time information to a GPS receiver anywhere on or near the Earth where there is an unobstructed line of sight to a plurality of satellites—generally requiring at least three for basic location determinations and at least four to include an altitude determination—with greater accuracy being achievable with the inclusion of additional satellites (that is, more than four satellites) when possible. Satellite-emitted GPS signals are relatively weak, however, and can be easily blocked by mountains, buildings, or other obstacles, although this can also mitigated by the inclusion of additional satellites when possible.

High accuracy GPS/GNSS receivers can be used in many applications for high-accuracy, high-precision guidance of autonomous vehicles, and some implementations of high-accuracy GPS utilization may be supplemented by real-time kinematic (RTK) corrections. However, there are a number of common conditions that can result in degradation or complete unavailability of GPS signals when the GPS antenna's view of the sky above is blocked and a minimum number of satellites necessary for GPS positional determinations are not available. For example, such conditions can be common when operating in and around solar arrays, and particularly whenever driving underneath such arrays, where solar panels are elevated and reside atop posts having a substantially smaller footprint on the ground than the solar panels themselves. Therefore, in order to ensure continuous, reliable location determinations when GNSS measurements are lost or rendered inaccurate, other methods for localization are required.

Again, as stated earlier herein—and except where expressly stated otherwise—references made herein to GPS are non-limiting and are merely exemplary and representative of any and all GNSSs with no intention whatsoever to limit the disclosures herein to GPS alone; instead, such references should be read as broadly as possible and inclusive of and equally applicable to any and all GNSSs. Moreover, any reference to a single GNSS system—and in particular any reference to GPS—should be deemed a reference to any GNSS individually, combinations of GNSSs, or all GNSSs collectively.

Real-Time Kinematics (RTK)

Real-time kinematic (RTK) positioning is the application of surveying to correct for common errors in current satellite navigation (GNSS) systems. RTK uses measurements of the phase of the signal's carrier wave in addition to the information content of the signal—relying on a single reference station or an interpolated virtual station for real-time corrections—for providing enhanced accuracy to GNSS-based location determinations. With reference to GPS in particular, RTK positioning is commonly referred to as carrier-phase enhancement or carrier-phase GPS (CPGPS).

RTK systems may use a single base station receiver (BSR) to service a number of mobile units (e.g., autonomous vehicles). The BSR re-broadcasts the phase of the carrier that it observes, and each of the mobile units compare their own phase measurements with the one received from the BSR to determine an accurate distance and direction from the BSR which can then be used by the mobile unit to refine GPS determinations for of its own location (at least relative to BSR). This approach enables mobile units to calculate their relative position very precisely, although the absolute position determination is accurate only to the same accuracy as the computed position of the BSR which may be precisely accurate when the BSR is located at a known surveyed location (e.g., a fixed survey benchmark), which in turn enables mobile units to produce a highly accurate map using location fixes relative to that surveyed location. But even without survey, RTK provides highly accurate relative position/location determinations useful to any of the several implementations herein disclosed, and especially in applications for determining the location of an autonomous vehicle with very high accuracy.

More specifically, RTK is a differential GNSS technique based on the use of carrier measurements and the transmission of corrections from the base station, whose location is well known, to a mobile unit (or "rover") so that location errors effectively cancel out. RTK is based on the several high-level principles: (1) in a clean-sky location, the main errors in the GNSS signal processing (satellite clock bias, satellite orbital error, ionospheric delay, and tropospheric delay) are constant in such a location and therefore cancel out when differential processing is used as between two or more receiving stations (the RTK base station and one or more mobile units); (2) the "noise" of carrier measurements is smaller than the noise of pseudo-code measurements; and (3) although additional processing of carrier measurements is needed due to carrier phase ambiguity, this can be readily addressed for dual-frequency differential measurements using two closely-located receivers.

In general, the range is calculated by determining the number of carrier cycles between the satellite and the mobile units, then multiplying this number by the carrier wavelength. However, the calculated ranges still include errors from such sources as satellite clock and ephemerides, as well as ionospheric and tropospheric delays. To eliminate these errors, and in view of the carrier-based measurements, the RTK base station transmits its measurements to its mobile units where "ambiguity resolution" is performed by each mobile unit to determine its position using algorithms that incorporate ambiguity resolution and differential correction. The position accuracy achievable by the rover depends on, among other things, its distance from the base station (referred to as the "baseline") and the accuracy of the differential corrections. Corrections are as accurate as the known location of the base station and the quality of the base station's satellite observations. Site selection is important for minimizing environmental effects such as interference and multipath, as is the quality of the base station and rover receivers and antennas.

An RTK base station can cover a service area having a 10-20 kilometer radius, although a real time communication channel is needed to connect the base station and mobile unit. A network of RTK base stations can thereby extend the use of RTK to a larger area containing a network of reference stations, although operational reliability and accuracy depend on the density and capabilities of the reference-station network. A Continuously Operating Reference Station (CORS) network is a network of RTK base stations that broadcast corrections where accuracy is increased in the CORS network because more than one station helps ensure correct positioning and guards against a false initialization of a single BSR.

LIDAR Technology

Technologies for "light detection and ranging" (LIDAR) or camera based localization are common supplemental or alternative localization approaches that can be utilized by autonomous vehicles. Such methods typically identify features (objects, patterns, locations, landmarks) in live sensor data and find correspondences in a georeferenced map containing similar data, or "reference points," to estimate position. The features in the environment that are used for determining position—these references points—are generally static and do not change over time.

A problem for using a standard version of this type of approach for localization at solar facilities is that very little of the visible infrastructure at the site is completely static. In many solar facilities, the panels are actively rotated to track the sun and, although the support structure is generally fixed, grass and vegetation in and around the solar panel posts can obscure the view of said reference points, as can the angled position of the solar panel positioned thereupon.

To address these challenges—and in the context of a solar arrays as an example of navigational obstacles for an autonomous vehicle (albeit ones that also just happen to be predictably ordered)—disclosed herein are approaches utilized by several implementations that can directly detect individual solar array panels and then determine the centerline of the panels (regardless of the tilt angle) which, in turn, can be used as a surrogate for solar panel post locations and the rows formed thereby. Based on these determinations, the distance of the autonomous vehicle from a centerline defined by these posts can then be used to estimate the global position of the autonomous vehicle and the intended path for it to traverse, as well as the proximity to any specific post as well as the lowest edges of the solar panels which may also pose as navigational obstacles to the autonomous vehicle.

LIDAR may use ultraviolet, visible, and/or near infrared light to image objects and can target a wide range of materials—including non-metallic objects, rocks, and even rain—in order to map physical features with high resolutions. For example, eye-safe 1550 nm lasers operating at relatively high power levels are common as this wavelength is not strongly absorbed by the eye and because they are compatible with night vision technologies operating closer to the 1000 nm infrared wavelengths.

LIDAR uses active sensors that supply their own illumination source that hits objects and the reflected energy is detected and measured by sensors. Distance to the object is determined by recording the time between transmitted and backscattered pulses and by using the speed of light to calculate the distance traveled. LIDAR may also be employed using a spindle-type mechanism or something functionally similar in order to provide a 360-degree view of the environment around an autonomous vehicle as well as to continuously monitor and update this 360-degree view while the autonomous vehicle is in motion.

Applications of LIDAR (and other terrestrial laser scanning) can be either stationary or mobile, and the 3D point clouds acquired from these types of scanners can be used alone or matched with digital images taken of the scanned area from the scanner's location to create realistic looking 3D models in a relatively short time when compared to other technologies. Mobile LIDAR (and other mobile laser scanning) may comprise two or more scanners attached to a moving vehicle to collect data along a path. The data collected is organized as a 3D point cloud in which detected objects may be further processed, accurately located, and recognized from among different known categories or identities of possible and expected objects.

LIDAR mapping effectively produces an occupancy grid map through a process that uses an array of cells divided into grids and then stores the height values when LIDAR data falls into the respective grid cell. A binary map is then created by applying a particular threshold to the cell values for further processing from which the radial distance and z-coordinates from each scan can be used to identify which 3D points correspond to each of the specified grid cell and thereby leading to the process of data formation.

Autonomous Mowers

While it is generally desirable to have substantial ground cover on renewable energy facilities such as solar farms and wind farms, for example, for both aesthetic reasons and to mitigate ground erosion, improper maintenance of this ground vegetation can lead to overgrowth and result in reduced energy production, unsafe working conditions, and increased fire risk. To address this need, various implementations disclosed herein are directed to autonomous vehicles that may be a mobile maintenance system or, more specifically, an autonomous mowing system ("mower") that may include one or more blades disposed below a mowing deck coupled to a tractor, for example, as well as any and all other vegetation-reducing systems that may or may not utilize spinning-blade cutting mechanisms.

One of the challenges with respect to solar farms is that the panels themselves can be static or continuously moving and may need to be close to the ground in order to perform optimally. Traditional mowing machines have insufficient vertical clearance to allow them to operate continuously without regard to the panel movement themselves, and traditional mowing technologies use a mowing surface that is wholly, or at least mostly, contained within the main wheelbase of the mower itself and having the wheels operating outside of the mowing surface. However, in this configuration a problem may arise because the physical plant (e.g., engine, drive motors, or other substantial physical components of the mower) may be necessarily disposed above the mowing surface, creating a mowing system that is still substantially high and reducing its utility in environments having low-to-the-ground obstacles.

To address these challenges, certain implementations disclosed herein this application—such as those implementations corresponding to the illustrations of FIGS. 7A, 7B, and 7C described in more detail later herein—may be directed to mobile automated maintenance systems designed to provide for low profile mowing that can pass under solar panels even when the solar panels are positioned (or oriented) with at least one edge close to the ground. This is achieved by disposing the mowing deck forward of (or behind) the primary physical plant that houses the drive system. The mowing deck may also be supported on the ground by wheels or cantilevered. Power may be provided through electrical connections to motors on the mowing deck to drive the mower blades. The mowing deck itself may be a low-profile mowing deck that has a substantially lower profile than the primary physical plant.

For several implementations, the height of the mowing surface may be changed using a mowing deck having an adjustable height. For example, a mowing deck may be mounted on hinge pins disposed on a tractor portion of the system, and a set of actuators may be adapted to move a vertical slide mounted to the hinge pins to provide for vertical adjustment with those actuators. In addition, or in the alternative, a mobile automated maintenance system can include a second set of actuators that might tilt the mowing surface.

The capability to lift/tilt the mowing surface provides a mobile automated maintenance system the enhanced capability to adapt to different contours of the ground and provides the advantage of level cutting of vegetation by the mowing system. The capability to lift or tilt the mowing deck can also be used to compensate for other conditions, such as, but not limited to, friction over ground or grass height or other conditions that require the mowing surface to be adapted, either in height or in tilt, on an ongoing basis. Other features may also enhance the mower's ability to adapt to different contours. For example, where the mowing deck is supported by wheels, the wheels may be operationally coupled to actuators that can be actuated to maintain a desired amount of force of the wheel or to lift a portion of the deck.

Autonomous Vehicle Variations and Configurations

For certain implementations, the autonomous vehicle may have four wheels with two positioned forward and widely dispersed to the outsides of the tractor and provide the driving force to propel the tractor and the system, including opposing propulsive force to facilitate turning. Two additional wheels may also be utilized and disposed to the rear of the tractor and provide stability. For alternate implementations, four wheels may be disposed at the corners of the tractor where all four are modified to provide propulsive force and/or turning capabilities to the autonomous vehicle. Other alternative implementations may instead employ a different number of drive wheels or guide wheels. Moreover, for a variety of implementations, the autonomous vehicle may be a low- or zero-turn vehicle, that is, a vehicle that can achieve a small turn radius or a turn radius that is effectively zero.

The various implementations disclosed herein may operate on battery-stored electrical power for which a charging system for the autonomous vehicle is provided in any of several different configurations and having a variety of different features. For solar farm and wind farm installations, for example, the charging system may operate on electrical power produced by the farm; however, because there may be times when maintenance is required when the sun is obscured or wind calm and such power is not available—or, more commonly, when the site may not allow for utilization of the power produced by the site or when the site is not a power-producing site—several such implementations are directed to a charging system for an autonomous vehicle may be configured to rely on other power sources, may generate its own power, or may store and transport power from other locations and other sources for utilization by or replenishment of the autonomous vehicle when needed.

Although certain implementations described herein are specifically directed to mobile automated maintenance systems and related methods for facilities and installations on a large acreage where ground cover is desired to prevent soil/ground erosion, provide pleasing aesthetics, or for other reasons, and that these implementations may be discussed primarily in terms of maintenance operations at solar farms (or other renewal energy sites such as those for wind turbine farms, ash ponds, or other facilities or installations), it will be readily understood and well-appreciated by skilled artisans that the various implementations described herein have broad applicability to other utilizations and are not limited to renewable energy or power generation facilities or installations in any way whatsoever. Instead, the various implementations disclosed herein should be broadly understood to be applicable to utilizations beyond renewable energy and also should be understood as disclosing such utilizations in the broadest contexts possible consist with the disclosures made herein.

Operational Sites

FIG. 1A is a general illustration 100 of an exemplary operating site 110 logically bounded and populated with well-ordered obstacles 112 (here shown as a plurality of rows 120) representative of a typical operating environment for the various implementations disclosed herein. More specifically, in this example, the operating site is a large outdoor area, unbounded by physical limits (i.e., no fences or other physical barriers defining the outer limits of the open space) but have corresponding logical boundaries defined by location data (e.g., a series of continuous location values that together provide an unbroken limitation to the operating site) corresponding to the area shown as the operating site 110 in FIG. 1A.

The well-ordered obstacles 112 of FIG. 1A may be any physical object that might impact navigation of the autonomous vehicles. For example, each well-ordered obstacle 112 shown in FIG. 1A might correspond to solar panel post locations which, as illustrated in FIG. 1A, form a plurality of rows 120 (which is not uncommon for a solar farm) and where the ability of an autonomous vehicle to navigate the operating site 110 for such a solar farm is at least limited by the location of the fixed solar panel posts, if not the solar panels themselves as well.

Figure 1B:
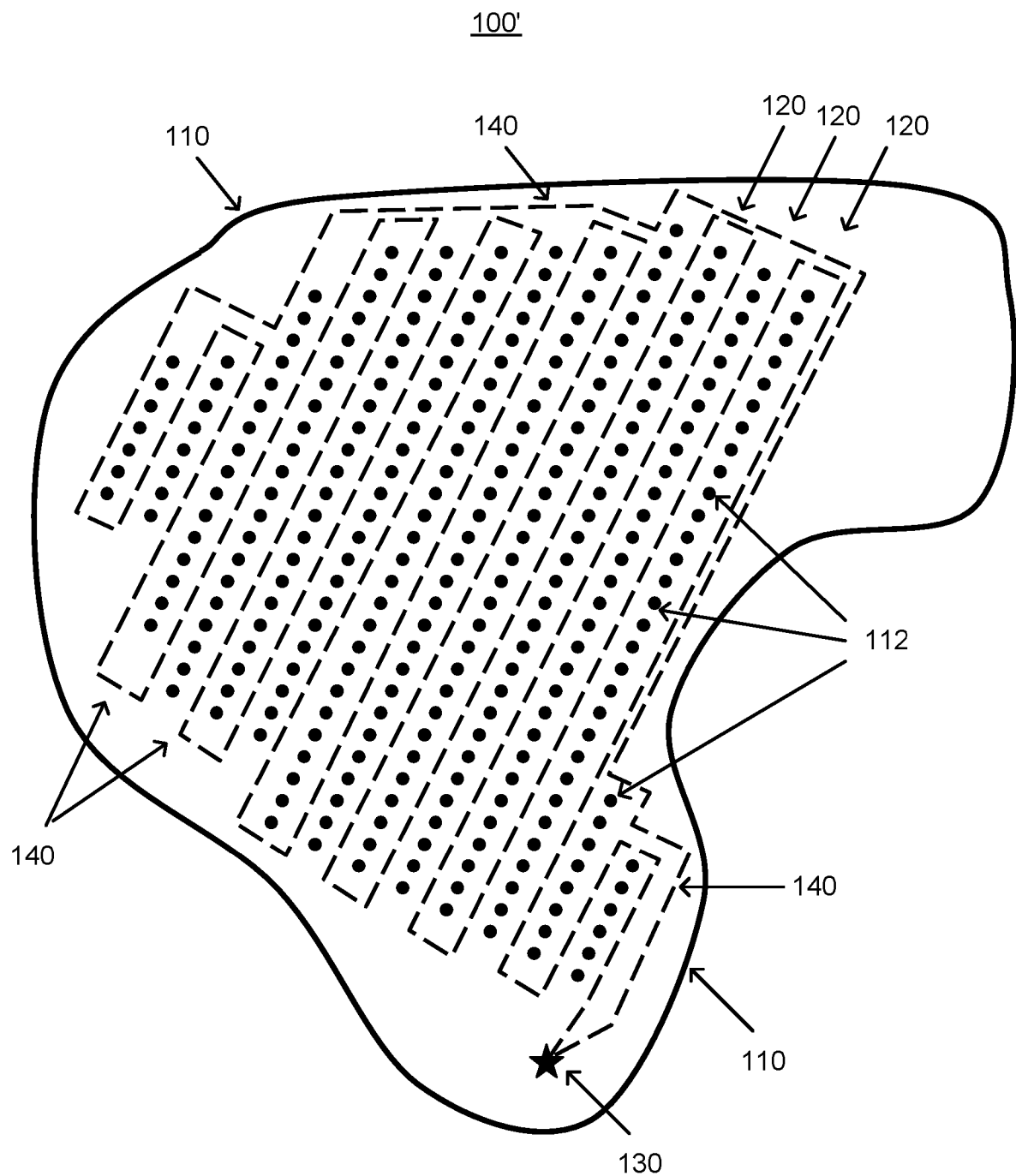
FIG. 1B is a general illustration of the exemplary operating site of FIG. 1A superimposed with a simple operational path plan for navigating among and between the well-ordered obstacles of the operating site representative of the various implementations disclosed herein.

FIG. 1B is a general illustration 100' of the exemplary operating site 110 of FIG. 1A superimposed with a simple operational path plan 140 for navigating among and between the well-ordered obstacles of the operating site representative of the various implementations disclosed herein. In FIG. 1B, an autonomous vehicle may randomly navigate within the logical boundaries of the operation site 110 to detect and determined fixed reference locations for the solar panel posts 112 and develop the operational path plan 140 so as to navigate amongst and between the rows 120 formed by the posts 112. As shown in this FIG. 1B, the operational path plan 140 may have the autonomous vehicle depart and return to a single fixed point 130 although in alternative implementations the start point and end point may be different, may be dynamic, may be random, and so forth. Notably, the operational path plan as shown is highly simplified for illustrative purposes only; a more extensive path plan is also anticipated based on the extensive disclosure of the parent applications to which priority is claimed and the contents of which have been incorporated herein by reference.

Solar Panels and Posts (SP&P)

Figure 2A:
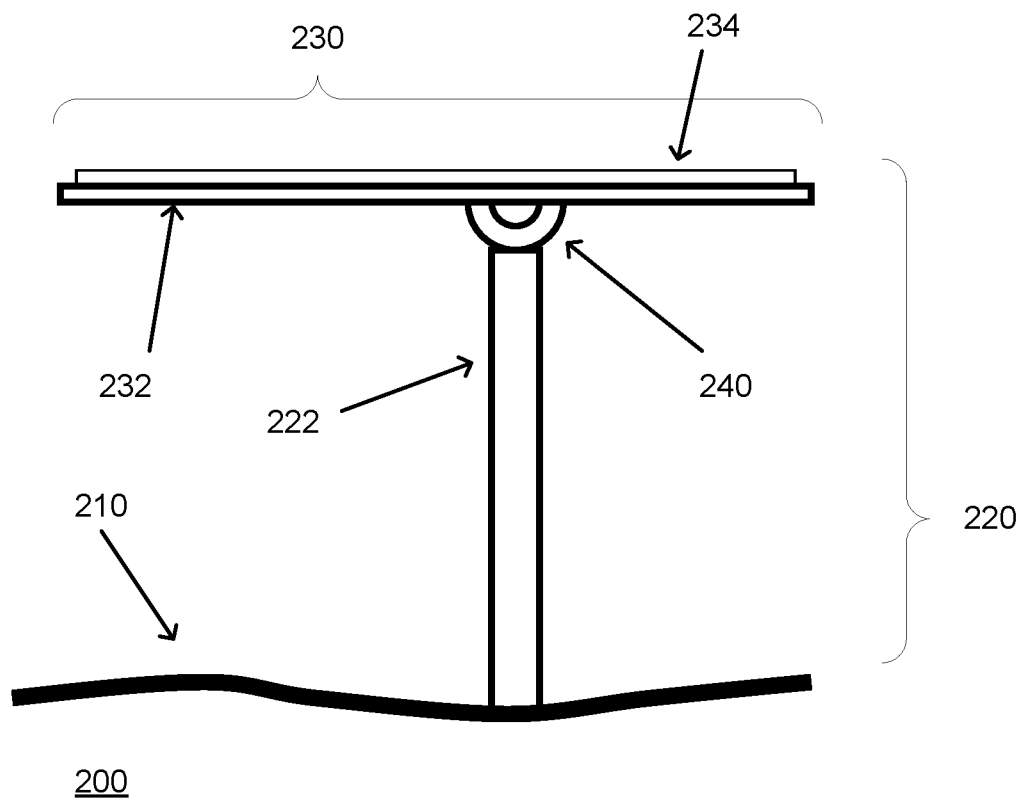
FIG. 2A is an illustration of an exemplary dynamic object—specifically, a solar panel fixed atop a solar panel post—that might exist in the operating environment illustrated in FIG. 1A.

FIG. 2A is an illustration 200 of an exemplary dynamic object 220—specifically, a solar panel 230 fixed atop a solar panel post 222 via an orientable coupling 240—several of which might be emplaced in the ground 210 of the operating environment 110 illustrated in FIG. 1A. The solar panel 230 may comprise a backing surface 232 and an energy capture surface 234 where the latter is purposefully highly absorbent (and minimally reflective) of electromagnetic energy generated by the sun to produce electrical power. Wires (not shown) carrying the produced electrical power from the solar panel 230 to an on-site collection/transmission facility (not shown in FIG. 2A or in FIG. 1A) may run centrally down the post 222 and underground or, although not illustrated as such, may be provided overhead or in some other fashion.

As shown in the side view of the solar panel 230 and post 222 illustrated in FIG. 2A, the solar panel 230 may be oriented horizontally, with all edges equally distant above the ground 210, such as for collecting sunlight when the sun is directly overhead, for non-operating storage of the solar panel 230 at night or other low-light conditions, or to support cleaning or maintenance operations including those that might be undertaken by an autonomous vehicle such as an autonomous mower or a mobile maintenance vehicle.

It should be noted that while the orientable coupling 240 may be offset from the geometric center of the backing surface 232 of the solar panel 230 as shown in FIG. 2A (as well as in FIGS. 2B, 4B, and 5B, each described later herein), for alternative solar panels (not shown) the orientable coupling 240 may be geometrically centered on the backing surface 232. However, regardless of whether the orientable coupling 240 is centered or offset on the backing surface 232 of the solar panel 230, the orientable coupling 240—and, by extension, the location of the portion of the backing surface 232 to which the orientable coupling 240 is attached, as well as the corresponding portion of the energy capture surface 234—is, for most practical purposes, statically located in the same location as the solar panel post 222 to which the orientable coupling 240 is affixed. In other words, the orientable coupling 240, the portion of the backing surface 232 to which it is attached, and the corresponding portion of the energy capture surface 234 are always co-located with the solar panel post 222 to which the orientable coupling 240 is attached. As such, as long as the location and orientation of the solar panel 230 can be detected by an autonomous vehicle, it is possible to determine—as done by various implementations disclosed herein—the location of the corresponding post 222 even when such a post 222 cannot be directly detected by the autonomous vehicle.

Figure 2B:
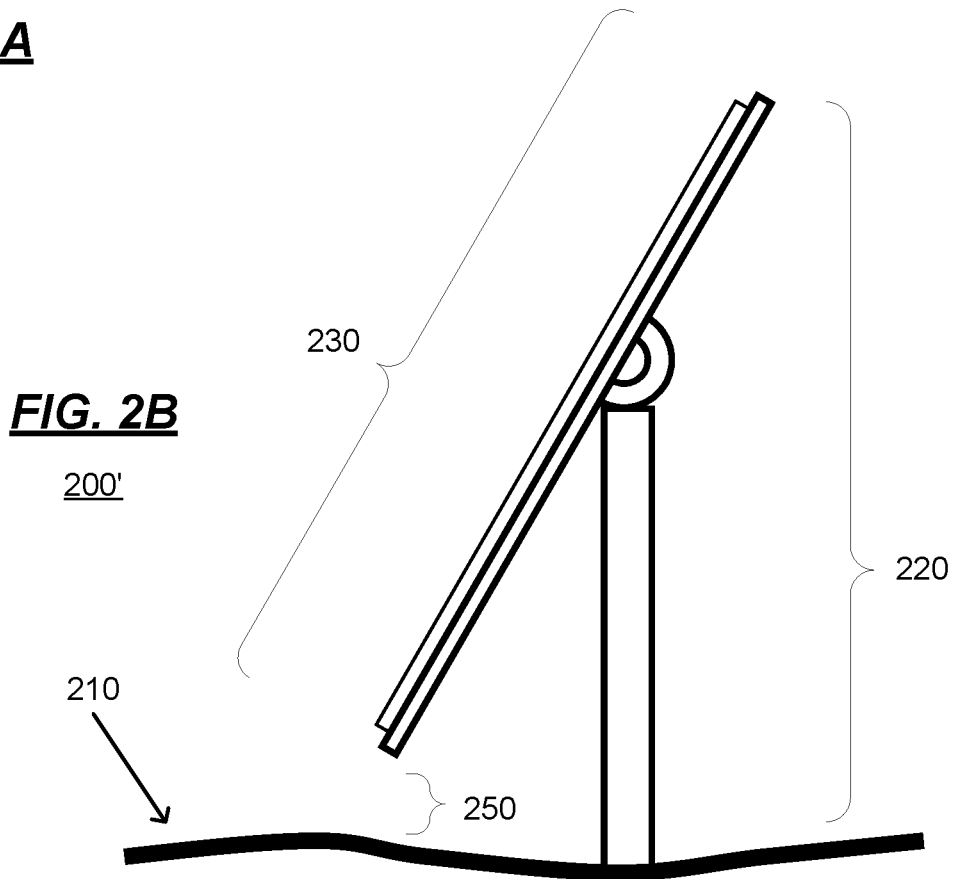
FIG. 2B is an illustration of the exemplary dynamic object of FIG. 2A in an alternate orientation whereby said dynamic object—specifically, the solar panel—may itself become an obstacle to navigation in the operating environment illustrated in FIG. 1A.

FIG. 2B is an illustration 200' of the exemplary dynamic object 220 of FIG. 2A in an alternate orientation whereby said dynamic object 220—specifically, the solar panel 230—may itself become an obstacle to navigation in the operating environment illustrated in FIG. 1A because at least one edge of the solar panel 230 is at a reduced distance 250 above the ground 210 under which an autonomous vehicle—such as the tractor portion of an autonomous mower, if not the mowing deck itself—may be too high to pass underneath.

In addition to changing its angle relative to the ground 210, the solar panel 230 may also rotate from side to side (not shown) in order track the sun during its course through the sky. As is well-known and readily appreciated by skilled artisans, such lateral and vertical movements are common and desired for self-orienting solar panels 230 to maximize the exposure of the energy capture surface 234 and in turn maximize energy production. In this manner, the solar panel 230 constitutes a "dynamic object" insofar as it may or may not be an obstacle to an autonomous vehicle depending on its orientation at any given time, as well as because when oriented in a manner that it is an obstacle the solar panel 230 may be in different rotational positions vertically, laterally, or both and thus may constitute an obstacle in different locations at different times, thereby requiring real-time monitoring and determinations of whether the solar panel 230 is an obstacle (due to its orientation) as well as where that obstacle is actually located, albeit within a reasonable distance from the "fixed obstacles" represented by its associated post 222.

Notably, while the movement of the solar panel 230 precludes it from being a static location reference point (a.k.a., "fiducial" or "landmark") for purposes of navigation by an autonomous vehicle, specific implementations disclosed herein are directed to the use of "dynamic fiducials" such as a self-orienting solar panel 230 that locate itself within a relatively small footprint of locations and also exhibits other detectable features—such as the orientation angle and rotation—that can be used to extrapolate a static location reference point such as, for example, the location corresponding to the solar panel post 222 the location of which might not be directly detectable as discussed in more detail with regard to FIG. 3. Stated differently, by detecting the variable location and orientation (both vertically and laterally) of a solar panel 230, the corresponding solar panel post 222—and, by extension, the location of that corresponding solar panel post—can be mathematically determined when it is known (e.g., by manual input, by earlier detection, etc.) where the post 222 is operationally coupled to the solar panel 230 which is generally consistent for all such solar panels 230 on a solar farm.

Panel and Post (P&P) Detection

Certain autonomous vehicles may need to operate on sites having obstacles around which the autonomous vehicle must navigate, and sometimes in close proximity thereto. These obstacles may be numerous and well-ordered (e.g., into rows such as solar panels and posts on a typical solar farm) or disparately located and unordered (e.g., to match terrain like windmills on a typical wind farm). However, the known location of these obstacles may not be enough for autonomous vehicle to get close enough to perform its designated tasks.

For example, an autonomous mower on a solar farm may need to detect both solar panels and posts (SP&Ps) in order to navigate and mow as closely as possible to each SP&P. However, even when the GPS coordinates of each SP&P are known, the limits of GPS, both in precision and in availability, may not enable the autonomous mower to navigate to within the desired proximity of each such obstacle. In the context of a solar farm, this challenge may be exacerbated the solar panels changing orientation and angle to achieve optimal exposure to sunlight, the lower edge of each said solar panel possibly creating an occasional dynamically-changing navigational obstacle to the autonomous mower, while the posts upon which the solar panels are mounted may themselves may be obscured by vegetation growth and therefore difficult to directly detect by other conventional locating, detection, and sensing means. Moreover, the dynamic solar panels can also block GPS signals from reaching the autonomous mower, requiring said mower to rely on other sensing devices and geo-location systems for location and orientation control and obstacle avoidance.

As such, various implementations disclosed herein are directed to systems and methods for detecting, by an autonomous vehicle, dynamic obstacles that change position or obstruct navigation (or the performance of tasks) as well as determine the location of obstacles that exist but cannot be directly observed by on-board sensing systems in order to enable said autonomous vehicle to navigate and/or perform tasks within a desired proximity of said obstacles as well as support initial operating site setup and other tasks.

Further disclosed herein are various implementations directed to solutions for an autonomous vehicle to real-time detect and determine dynamic and/or obscured obstacles to support navigation and services to within a desired proximity of said obstacles. Certain such implementations are specifically directed to autonomous mowers, for example, to real-time detect and determine location and orientation of solar panels in a solar farm and, based on the location and orientation of such solar panels, determine the location of their corresponding posts that may be otherwise obstructed from direct detection by the autonomous mower's other sensing systems. Specific implementations are directed to initial operating site setup, operational path planning, subsequent site navigation without GPS, and other related tasks.

FIG. 3 is a diagrammatic illustration 300, representative of the various implementations disclosed herein, of an autonomous vehicle 310 sensing for obstacles in its operating environment such as, for example, an autonomous mower using LIDAR 312 to sense for solar panels, solar panel posts, and other obstacles on a solar farm said autonomous mower may be tasked to mow. In FIG. 3, the autonomous vehicle 310 comprises LIDAR 312 as a detecting device with a known offset relative to the physical edges of said autonomous vehicle 310. Using LIDAR 312—and disregarding readings that correspond to navigable ground—the autonomous vehicle 312 detects the point location and distance of several physical objects including solar panel posts 322, 324, 325, and 328, the solar panels themselves (not shown but discussed in more detail with regard to FIGS. 4A, 4B, 4A, and 5B), a round obstacle 330 of some sort or fashion (such as a rock pile, for example), the corner and facing surfaces of a rectangular object 340 (which may be a building, a vehicle, a recharge station, etc.), and a flat well-like surface 350 partially obscured 352 from the LIDAR by a solar panel post 322.

Although illustrated as a top-down 2D view, the data collected by the autonomous vehicle 310 using LIDAR 312 may be 3D and may range up from the ground to some angle and corresponding increasing height (e.g., 30-degrees). For a spinning LIDAR column comprising 16 vertically arranged laser emitting/detecting elements, for example, the LIDAR could collect 360-degree data from a 30-degree field in vertical increments separated by 2-degrees each and which—due to the motion of the autonomous vehicle 310, slightly altering the vertical angle of the LIDAR 312 by some mechanical means throughout the course of several subsequent and/or continuous 360-degree rotations (that is, "wobbling" the LIDAR column), or otherwise traversing the two-degree separation of the LIDAR elements during subsequent detection passes by some other means—provide data to fill in these two-degree gaps in sensing. This vertical gap-filling, as well as the naturally changing angles and view obtainable by the motion of the autonomous vehicle 310 as it traverses the operating site 110, can produce a comprehensive point cloud of the objects and potential obstacles located at the operating site 110 including solar panels 230 and solar panel posts 222.

Figure 4A:
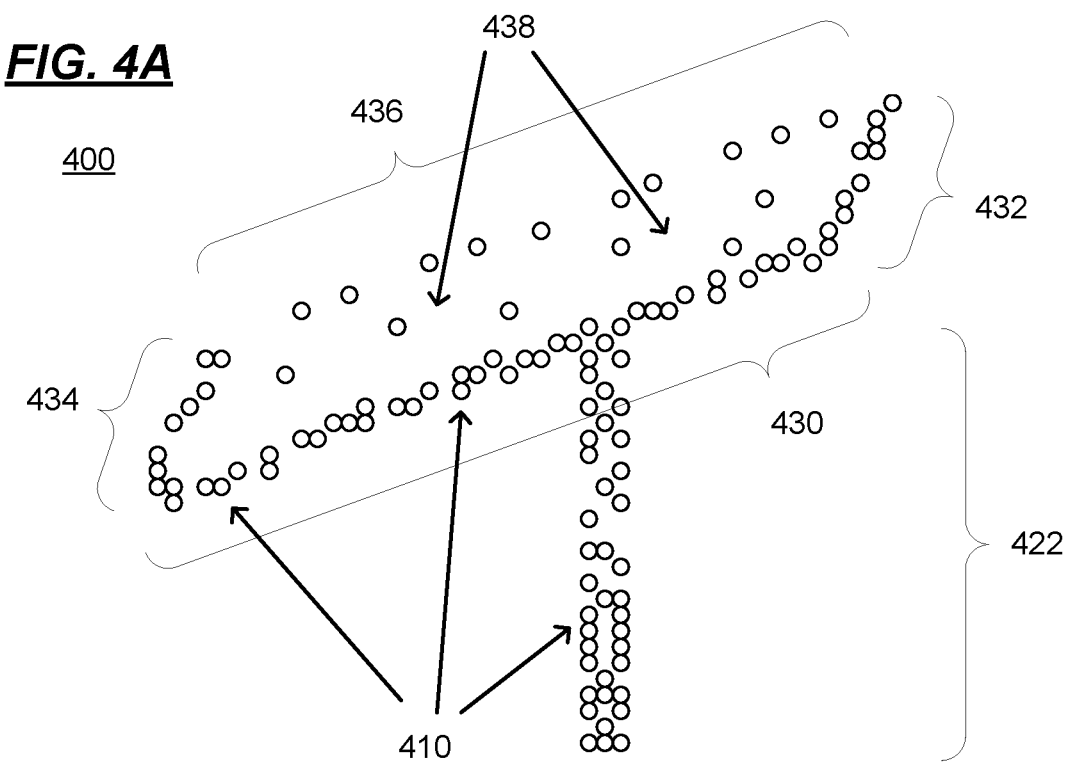
FIG. 4A is an illustration of exemplary detection of objects in an operating site—in this example, the LIDAR data points corresponding to a solar panel and post—representative of the various implementations disclosed herein.
Figure 4B:
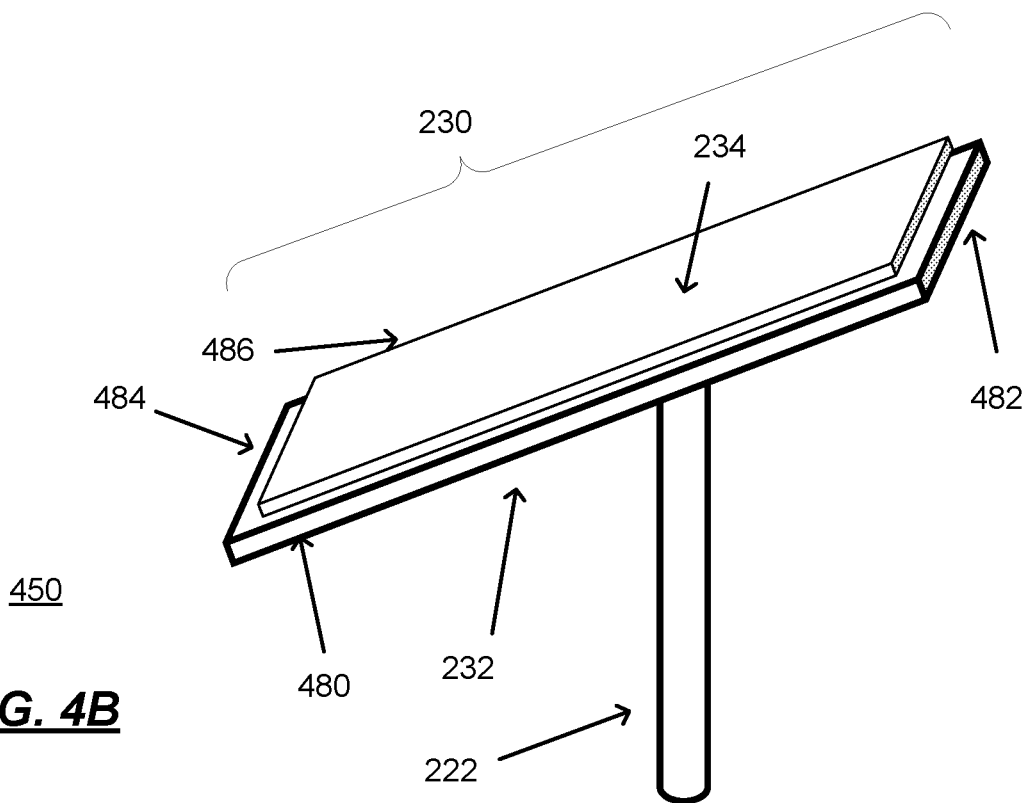
FIG. 4B is an illustration of the solar panel and post detected in FIG. 4A in a manner representative of the various implementations disclosed herein.

FIG. 4A is an illustration 400 of exemplary detection of objects at an operating site 110—in this example, LIDAR 312 data points 410 corresponding to the solar panel and post illustrated in FIG. 4B-representative of the various implementations disclosed herein. In FIG. 4A, the data points 410 coalesce around reflective vertical component 422 and reflective angled components 430, 432, and 434 as well as a detected but substantially non-reflective surface 438 extending to a determinable outer edge 436.

FIG. 4B is an illustration 450 of the solar panel 230 and post 222 detected in FIG. 4A in a manner representative of the various implementations disclosed herein. As shown in FIG. 4B, and with regard to FIG. 4A, the reflective vertical component 422 corresponds to the solar panel post 222 while the reflective angled components 430, 432, and 434 correspond to edges 480, 482, and 484 of the solar panel 230. Furthermore, the detected but substantially non-reflective surface 438 corresponds to the intentionally minimally-reflective (that is, intentionally maximally-absorptive) energy capture surface 234 including its outer edge 486.

Notably, if the solar panel 230 and its energy capture surface 234 was facing away from the LIDAR 312 such that the backing surface 232 was instead obliquely facing the LIDAR 312—that is, that the surface detected by the LIDAR 312 was instead the backing surface 232—the point cloud for this surface would be denser akin to how the edges 430, 432, and 434 comprise denser detection points. In this manner, the LIDAR data points 410 can be used to determine if the solar panel is facing the LIDAR or facing away from the LIDAR which, in turn, enables accurate location determinations for the lower edge of said solar panel which may constitute an obstacle to an autonomous vehicle (as discussed in detail elsewhere herein).

Figure 5A:
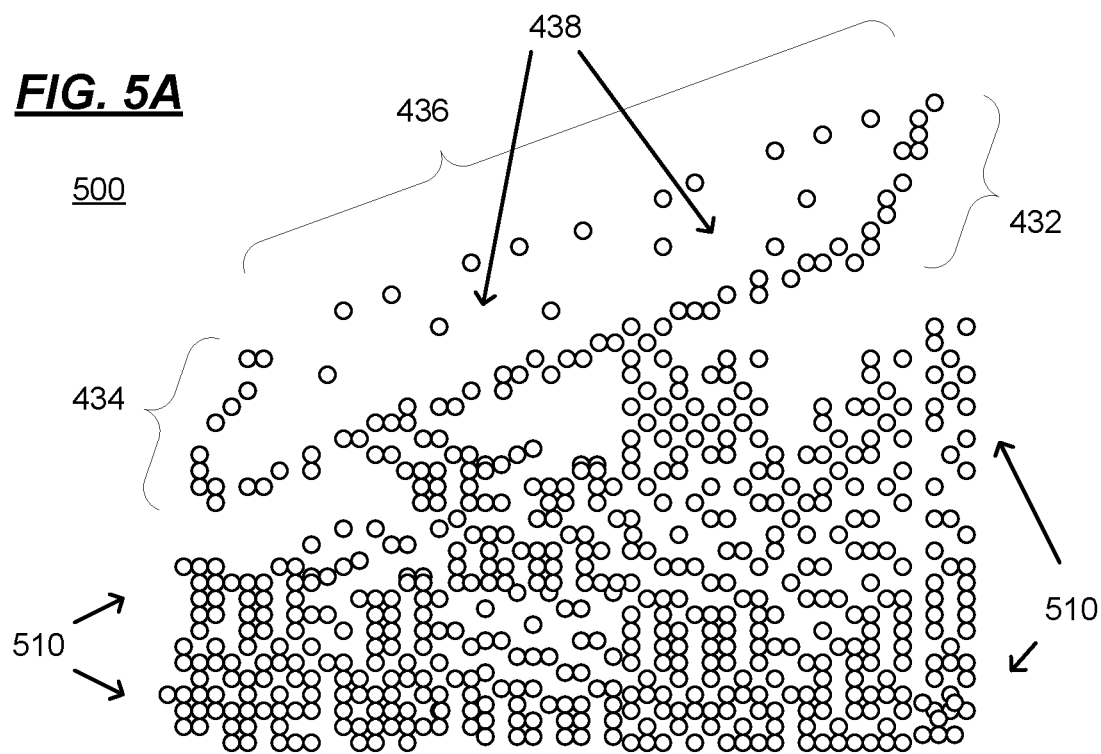
FIG. 5A is an illustration of exemplary detection of objects in an operating site obscured by vegetation growth—in this example, the LIDAR data points corresponding to a solar panel and post and the vegetation obscuring a solar panel post—representative of specific challenges that can be overcome by the various implementations disclosed herein.

FIG. 5A is an illustration 500 of exemplary detection of objects in an operating site obscured by vegetation growth—in this example, the LIDAR data points corresponding to a solar panel and post and the vegetation obscuring a solar panel post—representative of specific challenges that can be overcome by the various implementations disclosed herein. In FIG. 5 the LIDAR 312 data points 410 are similar to those detected in FIG. 4A except for the plethora of additional data points 510 detected beneath the reflective angled components 430, 432, and 434 and the non-reflective surface 438.

Figure 5B:
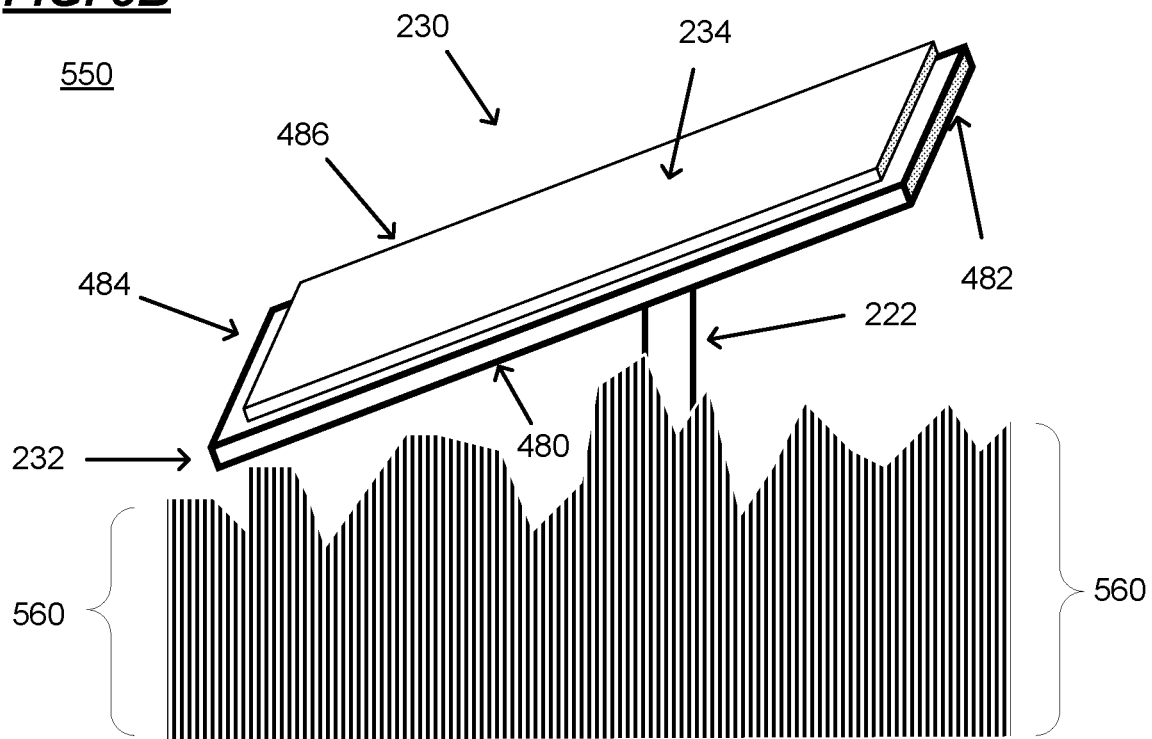
FIG. 5B is an illustration of the solar panel detected in FIG. 5A which can be used to determine the location of the solar panel post that cannot otherwise be directly detected, said determinations being undertaken in a manner representative of the various implementations disclosed herein.

FIG. 5B is an illustration 550 of the solar panel 230 detected in FIG. 5A and which can be used to determine the location of the solar panel post 222 that cannot otherwise be directly detected because of vegetation growth 560 that is obscuring and preventing detection of said post 222 but from which the location of said post 222 can still be determined based on the geometry of the solar panel 230, said determinations being undertaken in a manner representative of the various implementations disclosed herein and discussed in detail elsewhere herein.

Navigational Fallover

As already alluded to earlier herein, LIDAR or other camera-based localization technologies are common alternative localization approaches utilized by autonomous vehicles. Such approaches typically identify features (objects, patterns, locations, landmarks) from the live sensor data and then find corollaries in a georeferenced map as the basis for estimating position. For such approaches, the features in the environment that are used for determining position are generally static, that is, they do not change position, location, or orientation over time. However, certain environments—such as solar farms, for example—have relatively few detectable features that are completely static. On the contrary, at solar farms the solar panels are actively rotated to optimally track the sun for power generation. While the support structure for solar panels is generally fixed (e.g., a solar panel post), grass and vegetation in and around these support structures can obscure the view of these support structures and thereby present substantial navigational challenges.

To overcome these challenges, and in the context of an exemplary solar farm, various implementations disclosed herein may detect the solar panels directly, estimate the centerline of the panels regardless of the tilt angle, and then determine the distance and/or direction (globally or relative to the vehicle) from the centerline to the autonomous vehicle in order to then estimate the position of the latter. In effect, the centerline of the solar panel becomes a surrogate for a static, fixed feature for purposes of navigation.

Figure 6A:
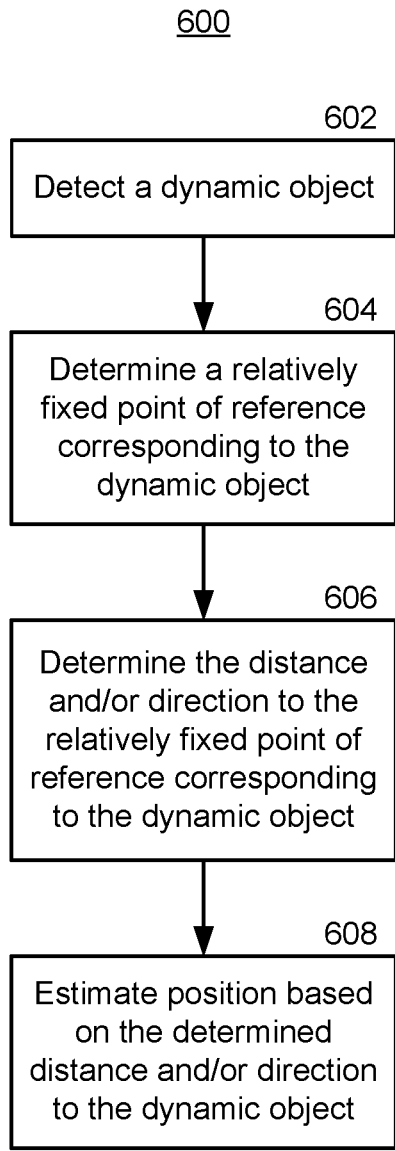
FIG. 6A is a process flow diagram, representative of the various implementations disclosed herein, illustrating an approach by which an autonomous vehicle may navigate an operating site using dynamic objects as a surrogate for fixed features.

FIG. 6A is a process flow diagram 600, representative of the various implementations disclosed herein, illustrating an approach by which an autonomous vehicle may navigate an operating site using dynamic objects as a surrogate for fixed features. In FIG. 6, at 602 the autonomous vehicle detects a dynamic object and, at 604, determines a relatively fixed point of reference corresponding to the dynamic object as a surrogate for a true fixed feature. At 606 the autonomous vehicle then determines the distance and/or direction to the relatively fixed point of reference corresponding to the dynamic object and, at 608, estimates its position based on the determined distance and/or direction to the fixed point of reference determined for the dynamic object.

Notably, while distance and direction to a fixed feature (or dynamic object having a surrogate for a fixed feature) for which location is known can together be used to determine the location of an autonomous vehicle, distance alone or direction alone from three such known-location reference points could instead be used to determine the position of the autonomous vehicle through distance- or direction-based triangulation respectively. Conversely, for certain implementations, navigation may be based on detected or inferred "lines" such as, for example, the line defined by a row of solar panels that may be detected using the panel-post detection methods described herein, where this "line" may be a centerline based on the posts or, for alternative implementations, it may be a line defined by the length or edge of the solar panel(s). Notably, such lines only provide a reference for two of three degrees of freedom for planar positioning—specifically, vehicle orientation and lateral positioning within the row—but does not provide direct measurements of position along the row; nevertheless, an autonomous vehicle may use these measurements to improve a real-time estimate of position and/or orientation of the autonomous vehicle and help to prevent drift that would accumulate when using only other techniques such as odometry, dead-reckoning, and so forth.

In any event, determining a relatively fixed point of reference of a dynamic object as a surrogate for a true fixed feature for said dynamic object may depend on the nature of the object but still highly valuable when multiple identical objects are present—for example, solar panels on solar farms. For certain implementations disclosed herein, and in the context of an exemplary solar farm, determining a relatively fixed point of reference of a dynamic object as a surrogate for a true fixed feature for said dynamic object may comprise detecting the panel centerline for one or more solar panels.

Figure 6B:
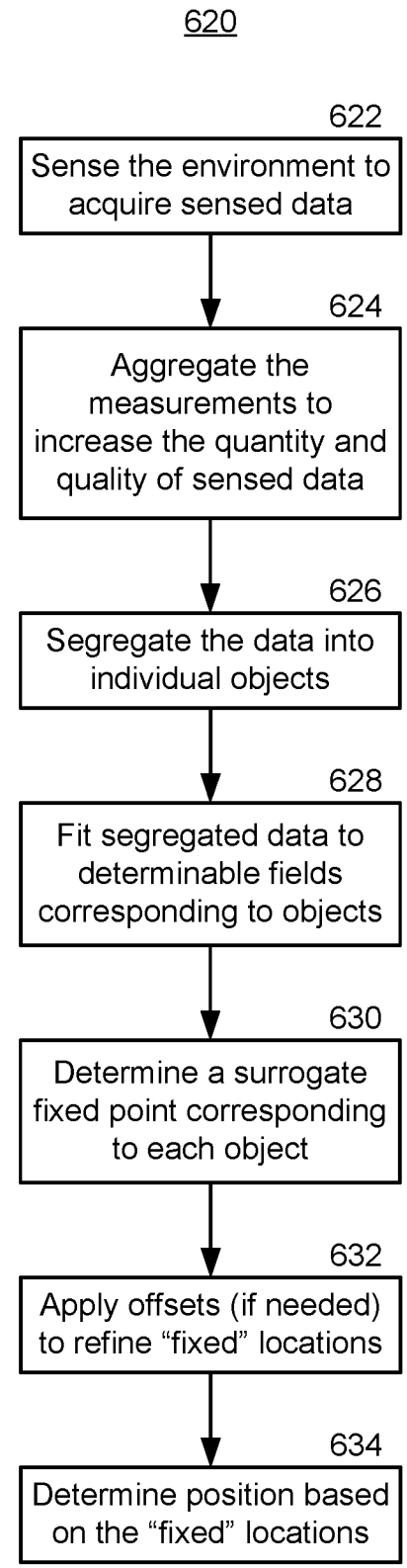
FIG. 6B is a process flow diagram, representative of the various implementations disclosed herein, illustrating an approach for determining a surrogate for a fixed feature based on a dynamic objects.

FIG. 6B is a process flow diagram 620, representative of the various implementations disclosed herein, illustrating an approach for determining a surrogate for a fixed feature based on a dynamic objects. The process described in FIG. 6B is described in the context of an exemplary solar farm for convenience.

At 622 an autonomous vehicle senses its environment. A multi-dimensional sensing of the environment may be made using a vehicle-mounted sensor such as, for example, 3-dimensional LIDAR scanner which yields data in the form of a point cloud corresponding to the positions of various points in the environment relative to the sensor (e.g. solar panel surfaces, solar array support structure or "posts," ground, grass, other vegetation, people, and so forth).

At 624 the autonomous vehicle then aggregates the measurements. Because single frame measurements for many sensors (including LIDAR) may not provide sufficient information to distinguish objects in the environment—such as solar panels/arrays versus other objects in the environment—aggregating sensor data as the vehicle moves may provide a clearer representation of the environment. This process may work in two ways: (1) where movement of the scanner helps to fill in gaps in the measurements; and (2) where movement of the scanner provides more accurate measurements of distant objects. Regarding the former, many sensors (including LIDAR) can have large gaps between individual measurement points, and these gaps may be fixed relative to the sensor so each scan will essentially measure the same points in the environment over and over if the sensor is not physically moved whereas moving the sensor fills in the gaps. Regarding the latter, moving the sensor can also provide close-up measurements of distantly-located objects which can be connected together via the aggregation and overcome limitations in measurement performance that declines dramatically as distance from the sensor increases (particularly range/position accuracy of the measurement points and the resolution of the measurements, that is, number of points per square meter, which decreases with distance from the sensor). In effect, moving the sensor allows the environment to be observed from multiple locations.

At 626 the autonomous vehicle segments the data into individual objects (e.g., solar panels). When the measurements are sufficiently aggregated, the points associated with the solar panels may be segmented (separated) from the rest of the points and from each other. Multiple methods may be used to do this, including but not limited to simple height thresholds (i.e., selecting all points above a certain height) to fitting mathematical planes to the data and removing outlying points (i.e., filter out points farther from the plane.) While step may be optional in some implementations, in select other implementations it may be used to reduce the likelihood of misattributing points to the panels. In particular, removal of points associated with the ground is important to avoid mis-fitting planes to the data at 626.

At 628 the autonomous vehicle fits the data to a determinable field such as, for example, the plane formed by the flat surface of the solar panel itself. Mathematical planes—which are defined by a point on the plane and a 3D vector that is in a direction normal to the plane—can be found in the data while other data can be rejected. For example, as known to skilled artisans, outlier-rejecting plane/model fits like Random Sample Consensus (RANSAC) can be used to find multiple distinct non-co-planar planes in a data set. Each plane with a minimum number of associated valid measured points, noting that any three points that are not all collinear can define a plane but using a much larger number of "in-lying" points may provide a truer and more accurate approximation of a planar surface in an environment.

At 630, the autonomous vehicle may then determine a surrogate fixed point corresponding to each object such as, for example, the solar panel surface centerline. With the resulting points associated with the distinct planes, the orientation and extents of the panels can be determined and, based on the plane's fit, the tilt of the panels can also be derived. For example, the alignment of the panels (i.e., the direction of the long edge) may be found with a combination of methods such as detecting the edge directly, finding the major axis of the points associated with the panels, and/or using additional a priori data about the installed orientation of the panels. The cross-row extents of the panels are then determined by identifying the edges of the panels in the data in the cross-row direction. The a priori known size/shape of the panel sections might also be used to refine these measurements, and the centerline can then be fit to the center of the extents and aligned with each of the panels.

At 632, the autonomous vehicle then applies an offset if, as in the case of m movable solar panels, the pivot point is offset from the top surface of the panel, in effect moving the centerline to the pivot based on the known geometry of the panels to find a relatively static location corresponding to the object. Although possibly changing the position estimate by only a small amount—and this in certain implementations may be optional—for select implementations this offset may be useful for achieving desired positioning precision of the autonomous vehicle for navigating to within a desired minimum threshold distance of objects and obstacles without running into them.

Finally, at 634, the autonomous vehicle may then estimate its own position based on the surrogate fixed position determined for the dynamic objects. For example, the panel detection may then be used to determine the position of the autonomous vehicle. This measurement can be used to ensure that the autonomous vehicle maintains a safe distance from the structures while also being used to provide high-precision measurements of lateral position and vehicle orientation when GPS and/or other navigational resources (e.g., RTK corrections) are not available or not reliable. Moreover, by creating a map that stores the georegistered centerlines of the panels, the live measurements can be compared to the centerlines in the map and used to offset the estimated position of the vehicle on the map.

Accordingly, various implementations disclosed herein are directed to systems, processes, apparatuses, methods, computer-readable instructions, and other implementations for autonomous vehicle navigation by: detecting a first dynamic object; determining a first relatively fixed point of reference corresponding to the first dynamic object; and estimating the location for the autonomous vehicle based on the first relatively fixed point of reference corresponding to the first dynamic object. For several such implementations, estimating the location for the autonomous vehicle may be based on a distance between the autonomous vehicle and the first relatively fixed point of reference and on a direction between the autonomous vehicle and the first relatively fixed point of reference.

For certain such implementations, the autonomous vehicle navigation may be achieved by also: detecting a second dynamic object and a third dynamic object; determining a second relatively fixed point of reference corresponding to the second dynamic object and a third relatively fixed point of reference corresponding to the third dynamic object; and estimating the location for the autonomous vehicle based on the first relatively fixed point of reference, the second relatively fixed point of reference, and the third relatively fixed point of reference. For several such implementations, estimating the location for the autonomous vehicle is triangulated may based on: (a) a first distance between the autonomous vehicle and the first relatively fixed point of reference, a second distance between the autonomous vehicle and the second relatively fixed point of reference, and a third distance between the autonomous vehicle and the third relatively fixed point of reference; (b) a first direction between the autonomous vehicle and the first relatively fixed point of reference, a second direction between the autonomous vehicle and the second relatively fixed point of reference, and a third direction between the autonomous vehicle and the third relatively fixed point of reference; and/or (c) a first direction or distance between the autonomous vehicle and the first relatively fixed point of reference, a second direction or distance between the autonomous vehicle and the second relatively fixed point of reference, and a third direction or distance between the autonomous vehicle and the third relatively fixed point of reference.

For select implementations, detecting the first dynamic object comprises sensing an environment to acquire sensed data and aggregating the sensed data into aggregated data, determining the first relatively fixed point of reference corresponding to the first dynamic object comprises segregating individual object data corresponding to the first dynamic object from aggregated data of the environment, fitting the individual object data into a determinable field corresponding to the first dynamic object, and/or determining the first relatively fixed point of reference from the fitted individual object data.

With regard to the foregoing, and as will be well-appreciated and readily-understood by skilled artisans, processes for "triangulation" may be further generalized using known or approximately known initial conditions—such as approximate autonomous vehicle sensor-based heading and/or approximate vehicle position—which can be used to perform triangulation without the requisite three points or three bearings described above. For example, using an accurate vehicle heading and an approximately known position, a single measurement (direction and range) to a relatively fixed reference point could provide an estimate of position albeit with less accuracy. Similarly, distance measurements to two relatively fixed reference points may be sufficient if the position is approximately known. Conversely, triangulation can also be increasingly refined through the use of more than the three measurements described above, where multiple (and even possibly contradictory) measurements are utilized and reconciled using methods such as random sample consensus (RANSAC) or least squares optimization to minimize measurement and/or estimation errors. Additionally, certain implementations may utilize a fixed reference "line" (such as the centerline of a row of panels) rather than just a fixed reference point for navigation, in which case only two of three degrees of freedom need be inferred with respect to positioning (i.e., the lateral position within the row relative to the direction perpendicular to the row with regard to orientation of the vehicle). Various alternate implementations disclosed herein may make use of such approaches in addition to or in lieu of the other approaches described herein without limitation.

Initial Operating Site Setup

Many operating sites could benefit from the utilization of autonomous vehicles such as, for example, large outdoor areas requiring vegetation maintenance or facilities such as solar farms where unchecked vegetation growth can be a hindrance or worse. For these kinds of locations, autonomous vehicles could provide valuable services such as mowing, inspections, and site security to name a few.

However, the initial setup for an autonomous vehicle to navigate and perform tasks on an operating site can be burdensome and time-consuming, often requiring manual programming or deployment of navigational checkpoints devices. This burden increases for sites populated with natural or intentional obstacles to navigation and can be particularly challenging for well-ordered but obstacle-rich environments such as solar farms. Path development is also complicated for operating sites having dynamic obstacles that change their location or orientation from time to time, as well as sites having inherent visibility problems due to rapid growth of vegetation that can obscure obstacles and other hazards.

For these reasons initial path development can discourage the deployment of autonomous vehicles for operating sites that might otherwise significantly benefit from their utilization. As such, there is a need for solutions to the challenges of initial site setup for autonomous vehicle navigation and path development.

For site setup, two types of routes may be utilized: static routes and dynamic routes. Static routes (or, more precisely, static route segments) are those that are fixed in space, akin to lanes on a road, and are used at a site for transiting between locations for performing one or more tasks separate from or in addition to navigation (such as mowing in the context of an autonomous mower). As such, a complete route might include multiple route segments, each of which is static or pre-defined, although other parts of the routes may not be, that is, are more dynamic and thus are typically computed as-needed or real-time to get from point A to point B (somewhat akin to many GPS-based driving maps navigation applications). These dynamic routes (or, more precisely, route segments) are generated for performing the intended tasks and are incorporated into complete route.

For site setup, both types of routes are important but may be created and represented differently. For example, for certain dynamic routes—such as those where the site setup consists of identifying certain features such as rows or polygons that define the area in which the dynamic routes will be generated—these dynamic routes may be developed via any of the various implementations described herein, and for which there may be a clear analog to equivalent manual processes. The creation of the static route segments, however, may be performed differently depending on known features of the site, based on a pre-defined navigational path, or limited to only those locations where pre-defined transit paths may be required for a variety of different reasons (e.g., safety, efficiency, etc.).

For example, in the exemplary context of an autonomous mower, establishing routes at a site typically includes two main tasks: locating and defining mowing areas, and creating transit paths around a site to facilitate movement to and from mowing areas and to and from docking locations. Mowing areas can be defined in a number of ways, including as a polygon boundary, the interior of which is the area to be mowed. The polygons may include other polygons within their boundaries (holes) that are areas that are not be mowed and may correspond to obstacles, untraversable areas, or keep-out zones. The polygons may be further annotated, such as when they represent mowing areas within rows of a solar field (between rows of solar panels), to provide additional guidance on the creation of mowing paths within the rows that result in efficient and consistent patterns.

The primary features of solar sites are the numerous rows of solar panels, and setting up a solar site requires defining mowing areas within all of the rows of panels. Even relatively small sites can have several hundred rows, and mapping each of the rows directly can be impractical, even for an unmanned and autonomous robot. Instead, the regularity, and precise geometric layout of the panels on these sites can be used to identify the location and size of all the rows without measuring all of them directly. For example, by measuring the location of three points in a section of solar panel rows, such as three extreme corners of the section (where each corner might be defined as the point of intersection between the centerline of the panels at the end edge of a row of panels), as well as the row pitch (the distance between neighboring rows), a mow area defined for a single row can be replicated across an entire section. A section could consist of as few as two panels, or have a hundred or more. A similar process can be used to generate transit paths throughout the section as well.

The three-point survey could be performed in an augmented fashion, for example, by placing a high accuracy GPS antenna over each corner location of a solar panel section and recording the corresponding measured location. The same measurements can be obtained from an autonomous vehicle using LIDAR or another sensing modality where each corner point is detected and its location is estimated based on the combined position of the vehicle and the range and bearing of the measurement from the vehicle. To minimize error in the measured location of these survey points, multiple detections and measurements of the same locations can be acquired as the vehicle moves around the site, and those measurements can be combined (e.g. via averaging) to improve the accuracy of the location estimate).

Alternatively, the site setup task need not be performed completely autonomously. In many cases, simple guidance may be provided by a user/operator or other automated source to facilitate quicker and more accurate setup of the site. For example, a user may create an initial route network for a site by drawing paths on images taken from overhead, by outlining panel sections on such overhead imagery, or by defining rough open area polygon mow regions. While these routes and regions will generally not be accurate enough for direct use by the vehicle for normal mowing operations, particularly within the solar panel rows, this initial rough route development is useful for creating paths for the vehicle to travel in order to collect the measurements necessary, such as the three-point surveys, to fully generate and refine the site map. Such guidance also helps to avoid the pitfalls of trying to identify all of the mow areas by blindly exploring the site.

The resulting site map may consist of multiple different features including a route network, rows, and polygons as well as the connectivity between these features. Polygons and rows generally may be areas designated for mowing. Rows existing in and amongst solar panels may imply that the mowing will take place in close proximity to physical infrastructure including solar panels and their supports. Polygons may represent open areas with no permanent obstacles. The route network may be a set of points and connections between the points that can be used for routing/navigation around a side.

Polygon regions may be established where large scale obstacles like fences, buildings and solar panel rows are used to identify the natural boundaries of the site and create polygons to fit those boundaries. Some of these auto site setup tasks/measurements may also be performed by other robotic or autonomous devices such as unmanned aerial vehicles (UAVs)/drones.

Disclosed herein are various implementations directed to solutions for enabling an autonomous vehicle to perform initial operating site setup to include obstacle detection, navigational reference point identification, and two-part "travel-and-task" path development. Several such implementations are also directed to autonomous vehicles that can perform the solutions presented herein in whole or in part. Also disclosed are solutions for an autonomous vehicle to perform an initial navigational setup at an operating site by: receiving initial location and orientation data pertaining to the autonomous vehicle; iteratively sensing a plurality of recognizable objects and determining a plurality of fixed reference locations corresponding to each of the plurality of recognizable objects relative to the initial location and orientation data; and developing an operational path plan for the autonomous vehicle to traverse the operating site based on the plurality of fixed reference locations. For select implementations, the autonomous vehicle may be an autonomous mower, the dynamic object may be a solar panel and/or solar panel post, and the sensing may be performed using light detection and ranging (LIDAR).

For various implementations herein disclosed, an autonomous vehicle may perform an initial navigational setup at an operating site by receiving initial location and orientation data pertaining to the autonomous vehicle (e.g., an autonomous mower), iteratively sensing a plurality of recognizable objects (e.g., solar panel posts), and determining a plurality of fixed reference locations (e.g., GPS coordinates) corresponding to each of the plurality of recognizable objects relative to the initial location and orientation data, and developing an operational path plan for the autonomous vehicle to traverse the operating site based on the plurality of fixed reference locations. The operation path plan may comprise, for example, a two-part "travel-and-task" path comprising sub-paths for travel only and other sub-paths for task performance while still or while navigating. The autonomous vehicle may also detect natural boundaries for the operating site within which to operate, may calculate its own operational boundary based on (and relative to) a determinable perimeter for the outermost recognizable objects. The autonomous vehicle may also detect non-recognizable objects, some having fixed locations (e.g., rock piles, buildings, fences, etc.) and some not so fixed to their detected location (vehicles, people, animals, other autonomous vehicles) which may or may not provide additional information for inclusion (if not at least consideration) in the development of the operational path plan. Notably, these unrecognizable objects are not dynamic objects (described below) but instead are simply obstacles and/or additional reference points.

Of course, it will be well-understood and readily appreciated by skilled artisans that a recognizable object may be a dynamic object capable of changing its location, and thus determining a fixed reference location corresponding to such dynamic objects may be achieved by first determining that the at least one recognizable object is a dynamic object in a present location that may not be a fixed location, and then determining a present location for the dynamic object and determining a corresponding fixed reference location corresponding to the dynamic object where the corresponding fixed reference location is one that can consistently determinable for the dynamic object even when the dynamic object is subsequently detected to be in a different location compared to the present location—in other words, where the corresponding fixed reference location is consistent and determinable based on the detected location of the dynamic object plus some other information such as the orientation of the dynamic object.

For example, the detected location and orientation of a solar panel can be used to mathematically determine a single fixed location that just happens to correspond to the same location as the corresponding solar panel post upon which the solar panel is affixed. As previously discussed, this determinable relationship is very helpful not only in determining a corresponding fixed location for the solar panel itself for navigation purposes, but it also enables for the detection and location of solar panel posts that might otherwise not be detectable by the autonomous vehicle using its on-board sensors (e.g., due to high vegetation, fog, etc.).

In any event, while a dynamic object may be able to change its location by changing its orientation relative to the corresponding fixed reference location, the unique feature of a dynamic object is the ability for an autonomous vehicle to consistently determine a corresponding fixed reference location corresponding for the dynamic object based on its present location and some other detectable feature such as its present orientation, the combination of which lends itself to a mathematical determination of the corresponding fixed reference location.

Moreover, regarding orientation, dynamic objects may sometimes constitute an obstacle when in one orientation but not in another orientation, and this can also be determined mathematically by determining if the dynamic object in its present orientation at its present location constitutes an obstacle—for example, by determining if the lowest point of the dynamic object would obstruct navigation by the autonomous vehicle—and if so causing the autonomous vehicle to avoid said dynamic object while the latter is in its present orientation (i.e., until the dynamic object is no longer in an orientation that would obstruct travel of the autonomous vehicle).

As for developing an operational path plan for the autonomous vehicle to traverse the operating site based at least in part on the plurality of fixed reference locations, various implementations may determine at least one travel-only sub-path for the autonomous vehicle to traverse to position the autonomous vehicle for performing at least one task, and then determine at least one task-specific sub-path for the autonomous vehicle to traverse while performing the at least one task. Regardless, for certain implementations developing the operational path plan for the autonomous vehicle to traverse the operating site based at least in part on the plurality of fixed reference locations may comprises: determining a reference pattern corresponding to the plurality of fixed reference locations; defining an operational boundary for the operational site based at least in part on the reference pattern; and navigating the autonomous vehicle within the operational boundary and within a desired proximity to at least a subset of objects from among the plurality of recognizable objects.

As for the operational path plan, and for numerous implementations herein disclosed, the autonomous vehicle would be capable of utilizing the operational path plan to navigate the operational site at a future time by re-sensing a subset of the plurality of recognizable objects to produce navigation reference data, determining a current position and a current orientation for the autonomous vehicle based on the navigation reference data, and then traversing the operational site according to the operational path relative to the current position and current orientation.

Accordingly, disclosed are solutions for an autonomous vehicle to perform an initial navigational setup at an operating site by: receiving initial location and orientation data pertaining to the autonomous vehicle; iteratively sensing a plurality of recognizable objects and determining a plurality of fixed reference locations corresponding to each of the plurality of recognizable objects relative to the initial location and orientation data; and developing an operational path plan for the autonomous vehicle to traverse the operating site based on the plurality of fixed reference locations. The autonomous vehicle may be an autonomous mower, the dynamic object may be a solar panel and/or solar panel post, and the sensing may be performed using light detection and ranging (LIDAR). However, the broad and diverse applications of the various implementations disclosed herein are in no way limited to the specific examples described but, instead, should be understand to apply to any autonomous vehicle and operating site without any limitations.

Mobile Base Station (MBS)

For initial site setup as well as subsequent iterative site operations, the precision of location determinations—for fixed obstacles, dynamic obstacles, and for an autonomous vehicle itself at any given time—can greatly enhance navigation and task performance for site operations by the autonomous vehicle.

As mentioned earlier herein, under normal circumstances a GPS receiver can accurately determine the location of an autonomous vehicle to within certain tolerances—tolerances that have improved over time in step with improvements and refinements in GPS technologies. The accuracy of the location determinations for an autonomous vehicle will naturally carry over to determinations made by the autonomous vehicle for site features such as fixed obstacles and dynamic objects (as discussed earlier herein). However, there are situations when more accurate location determinations are needed and GPS alone is not precise enough. Moreover, for real-time GPS location determinations, several sources of error related to timing, satellite orbits, and atmospheric conditions (among other things) may negatively affect the receipt of GPS signals and thereby result in varying and changeable degrees of inaccuracy in GPS location determinations at different times.

To overcome these errors, a GPS base station can be used to determine the extent of the GPS signal inaccuracies and mitigate them with regard to both initial location determinations made directly (i.e., made by the autonomous vehicle for its own location) and indirectly (i.e., made by an autonomous vehicle for sensed/detected fixed obstacles and dynamic objects) as well as subsequent location determinations for the autonomous vehicle and possibly additional refinements to the locations of fixed obstacle and dynamic objects.

As known and appreciated by skilled artisans, a GPS base station is a GPS receiver located at a precise known location that collects GPS satellite signals to determine an offset between the precise known location and the GPS-determined location. This offset can then be utilized by autonomous vehicles operating in the same general area as the GPS base station to correct their own location determinations. Moreover, GPS base stations may operate to continuously or iteratively collect GPS data to update its offset and communicate any changes to autonomous vehicles nearby, for example, utilizing a rolling average of a number of the most recent GPS signals received and/or updating the offset when it varies by some minimal threshold.

In effect, the location of the base station's antenna—where the GPS satellite signals are received—may be determined very accurately for the GPS base station utilizing any of various highly-accurate surveying methodologies. Based on this survey location determination (relative to the base station's antenna), the GPS base station can become both a highly accurate location reference point as well as provide the calculated offset between its known surveyed location and its own GPS location determinations. This offset can then be communicated to and used by other relatively nearby GPS-locating devices—such as those used for an autonomous vehicles—to increase their own accuracy relative to GPS data these devices collect real-time. The basic assumption in doing so is that GPS signals received by said devices are affected substantially the same as the signals received by the GPS base station, so applying the offset can correct for the errors affecting receipt of the GPS satellite signals. In this manner, the difference between the GPS measurements from the base station and the base station's known surveyed location can be used to correct GPS measurements determined by the autonomous vehicle.

Typical GPS base stations are fixedly located and generally immovable such that the actual surveyed location for each does not change and therefore is always accurate. Nevertheless, a mobile GPS base station (MBS) has several distinct advantages over a fixed GPS base station including but not limited to being able to service more than one site, servicing disparately situated sites (that is, sites far enough apart to yield significantly different offsets), and immediately service new sites without need for erecting a permanent and immovable base station. An MBS would also provide flexibility as to subsequent operating locations at each site and which may be highly valuable at dynamic sites (such as solar farms for example). However, MBSs also have several distinct disadvantages, most notably of which is be the need to re-determine the survey-accurate location of the MBS antenna—necessary for offset calculations—each and every time the MBS is moved.

Accordingly, various implementations disclosed herein are directed to an MBS for communication of offsets to autonomous vehicles. The mobile aspect of the MBS may be achieved in any of several configurations including but not limited to being merely conveyable (e.g., driven around on the back of a motor vehicle), towable, air-lifted-in by helicopter or drone, integrated into a motor vehicle or an air vehicle (e.g., drones), or an autonomous vehicle configured to operate as an MBS.

With specific regard to an MBS in the context of the implementations disclosed herein, "being on-site" and other such characterizations should be understood to mean that the MBS is within an operable distance of a site location that enables communication with at least one intended offset recipient at the operating site; as such, this would include MBS locations both physically on the operating site as well as locations outside of the operating site but within sufficient proximity to enable the MBS to provide offset information to, for example, an autonomous robot navigating at said operating site. By way of example, the object 340 detected by the autonomous vehicle 310 in FIG. 3 may be an MBS such as, for example, a wheeled truck-like vehicle located on the operating site.

For various such implementation herein disclosed, after a direct-survey-accurate (DSA) location is determined (or "calibrated") for an MBS, an offset based on the difference between the DSA location and a satellite-signal-accurate (SSA) location (i.e., based on GPS signals) can be calculated and applied to a plurality of "objects" at the operating site—said objects being those suitable for being navigational reference points and including both fixed obstacles as well as dynamic objects for which a surrogate fixed location has been determined (i.e., solar panel and post detection)—to determine for these objects near-survey-accurate (NSA) locations by applying the DSA offset to these objects based on a determined SSA locations for each such object.

As used herein, an NSA location is a location mathematically and/or geometrically calculated (using widely known methodologies) with reference to a known or identifiable DSA location (but is not the DSA location itself), and an SSA location is a location mathematically and/or geometrically calculated with reference to received GPS signals. In general, a DSA location is more precise and accurate than an NSA location which, in turn, is generally more precise and accurate than an SSA location. Accordingly, a DSA offset—that is, an offset based on the difference between a DSA location and an SSA location calculated for the same location, e.g., the GPS antenna for an MBS—is more precise and accurate than an NSA offset—that is, an offset based on the difference between an NSA location and an SSA location calculated for same location—although an NSA offset is sufficient for use (i.e., provides greater accuracy and precision than otherwise) when an DSA offset is not available and/or rendered inaccurate by the passage of time and changes in SSA determination. Additionally, whereas in general a DSA location can only be directly determined by survey (including precise location on or over a fixed survey point), an NSA location can be determined based on a DSA location or based another NSA location via known mathematical and/or geometrical calculations. Likewise, an SSA location can be determined based on GPS signals or based on another SSA location via known mathematical and/or geometrical calculations.

Stated differently, GPS measurements must be "locally" accurate when setting up for an operating site, meaning that the measured distances and directions between reference points is the same as the actual distances and directions between such points (with some small acceptable margin for error). These measurements may also be globally accurate—that is, accurately identifying the exact location on earth of the point and would be consistent with all other high accuracy devices for measuring global position—but do not need to be so. Instead, RTK GPS can provide locally accurate measurements usable for the various implementations herein disclosed, whether or not those measurements are also globally accurate. If the base station is not accurately surveyed, then any locally accurate position measurement methodology will generally suffice. As such, the SSA locations are at least locally accurate (if not globally accurate) and thus provide sufficient measurements for the operations described for the various implementations herein disclosed.

Notably, the determined SSA locations for these objects, in turn, may have been determined by an autonomous vehicle using the autonomous vehicle's own SSA location and sensing the relative location of said objects (at an SSA level of accuracy) with regard to the SSA location of the autonomous vehicle using any of the several methodologies and approaches disclosed elsewhere herein including without limitation solar panel and post detection. For certain specific implementations, the MBS and the autonomous vehicle may be one-and-the-same insofar as performing both functions as herein described, although for various other implementations the MBS and autonomous vehicles serviced by said MBS would be separate and distinct (at least in time as to function) in order to enable the MBS to provide cyclical, iterative, or continuous (i.e., "repeated") offset updates for at least one other navigational vehicle operating at the site, and to do so without the MBS having to continuously update its own location due to its own movements is also operating as a navigational vehicle on the site in a capacity other than as an MBS.

In any event, after NSA locations are determined and stored/mapped for objects at the operating site, the MBS is thereafter able to "relocate" and, for subsequent operation on the site (and from a new location), the MBS may subsequently determine (or "recalibrate") its own near-survey-accurate (NSA) location—either autonomously, in cooperation with an autonomous vehicle, or with other methods such as a hand-held surveying tool—this recalibration being based on a current offset determined for the previously mapped and NSA-located objects at the site, ostensibly by the determining of current SSA locations for these objects for comparison to the previously determined NSA locations for such objects to derive a current NSA offset, and which then enables the MBS to calculate its own NSA location and thereafter operate to provide new and updated offsets (albeit NSA and not DSA) based on received GPS data and its determined NSA location. This subsequent NSA location thereby acts as an acceptably accurate surrogate for a true DSA location—being sufficiently more accurate than SSA locations—and the resulting NSA offsets act as acceptably accurate surrogate for a DSA offset.

Additionally, after the initial NSA locations for objects are determined based on the MBS's initial DSA location (i.e., survey-accurate), autonomous vehicles can thereafter perform their own offset determinations and corrections in the absence of the MBS. Furthermore, one or more MBSs different from the initial one can be subsequently used on-site to provide NSA offsets in the same fashion as the initial MBS could after recalibration provided, however, that the current offset based on object NSA locations versus current SSA locations can be determined which, in turn, requires the NSA locations for said objects be available for such offset calculations—by an autonomous vehicle on site or by the MBS itself—when said subsequent MBS arrives on-site. Similarly, for operating sites having more than one autonomous vehicle, one such autonomous vehicle may operate as a temporarily-stationary MBS for the benefit of the other autonomous vehicles using a determined NSA location or possibly using a DSA location when carefully located at a fixed point such as a fixed recharge station—especially when the autonomous vehicle would be stationary anyway while being charged—or precisely located on or over a determinable fixed survey point, this latter solution also being available for subsequent returns by an MBS to continue providing DSA offsets.

As such, determining an NSA location for an MBS at or near an operating site requires calculations based on (1) known NSA locations for objects; current determined SSA locations for said objects sufficient to determine an NSA offset; and (3) current determined SSA location for the MBS sufficient to determine the MBS's NSA location. In contrast, determining a DSA location for an MBS (or a navigational vehicle operating as an MBS) requires a survey of the MBS's location or precisely locating itself on or over a determinable fixed survey point.

Figure 6C:
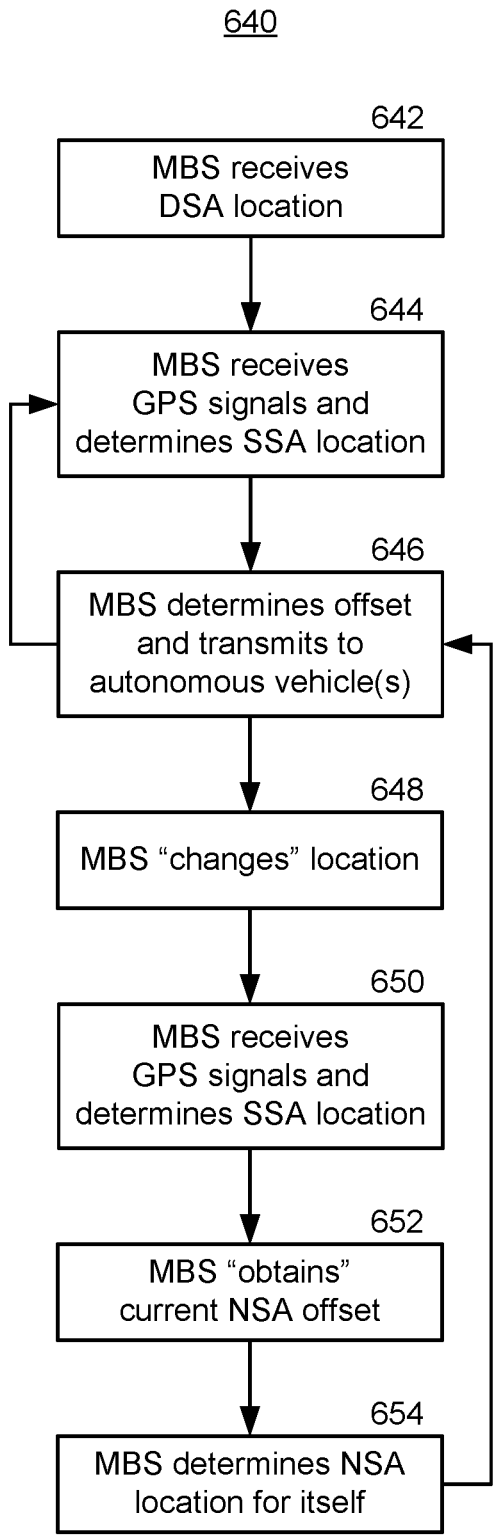
FIG. 6C is a process flow diagram, representative of the various implementations disclosed herein, illustrating a mobile base station determining an offset from a surveyed location and a subsequent near-survey-accurate (NSA) location after moving.

FIG. 6C is a process flow diagram 640, representative of the various implementations disclosed herein, illustrating a mobile base station determining an offset from a surveyed location and determining its subsequent near-survey-accurate (NSA) location after moving. In FIG. 6C, at 642 the MBS receives its DSA location and, at 644, also receives GPS signals and determines its SSA location. Based on the difference between its DSA location and determined SSA location, at 646 the MBS determines a DSA offset and transmits this offset to recipients to use in refining their own SSA locations determinations into more accurate NSA locations, as well as for certain such recipients—namely, autonomous vehicles so configured—to determine NSA locations for objects and map/store this NSA location information. For a time, and from its DSA location, the MBS may iteratively receive additional GPS signals for determining its SSA location and update the DSA offset accordingly.

At 648, the MBS may then "change" location by moving from one location to another relative to the site, by leaving the site altogether and subsequently returning to the site, or by leaving the site altogether with another different MBS later arriving at the site, the effect of which is that an MBS is again present at the site but without the benefit of its DSA location. To rectify this situation, at 650 the MBS receives GPS signals and determines its SSA location while also, at 652, "obtaining" a current NSA offset for the site from which, at 654, the MBS can determine its own NSA location. This "obtaining" can be achieved by any of several different means including but not limited to one or more navigational vehicles at said site by calculating the current NSA offset based on NSA locations determined for a variety of sensed objects at the site based on a previous DSA offset. Alternatively, the sensing and calculating of the current offset may be performed by the MBS itself if it has the sensing capabilities and logic for determining SSA-relative locations for such objects as well as access to the DSA location information previously determined for such objects. Regardless, after the MBS has determined its NSA location, the MBS can then return to 646 to determine the offset (now an NSA offset) and again iteratively receive GPS signals for its own SSA location at 644 to update the offset at 646 and so on.

For certain alternative implementations, 642 and 646 may be optional or entirely absent because only locally-accurate locations are needed (that is, globally accurate positions are not necessary). For such alternative implementations, at 652 and 654 an SSA offset would instead be calculated and utilized in lieu of an NSA offset to achieve much the same effect but utilizing locally accurate positions instead of globally accurate determinations. Similar use of locally-accurate SSA offsets—in lieu of globally-accurate DSA and NSA offsets—can also be used by such alternative implementations with regard to the process described in FIG. 6D that follows.

Figure 6D:
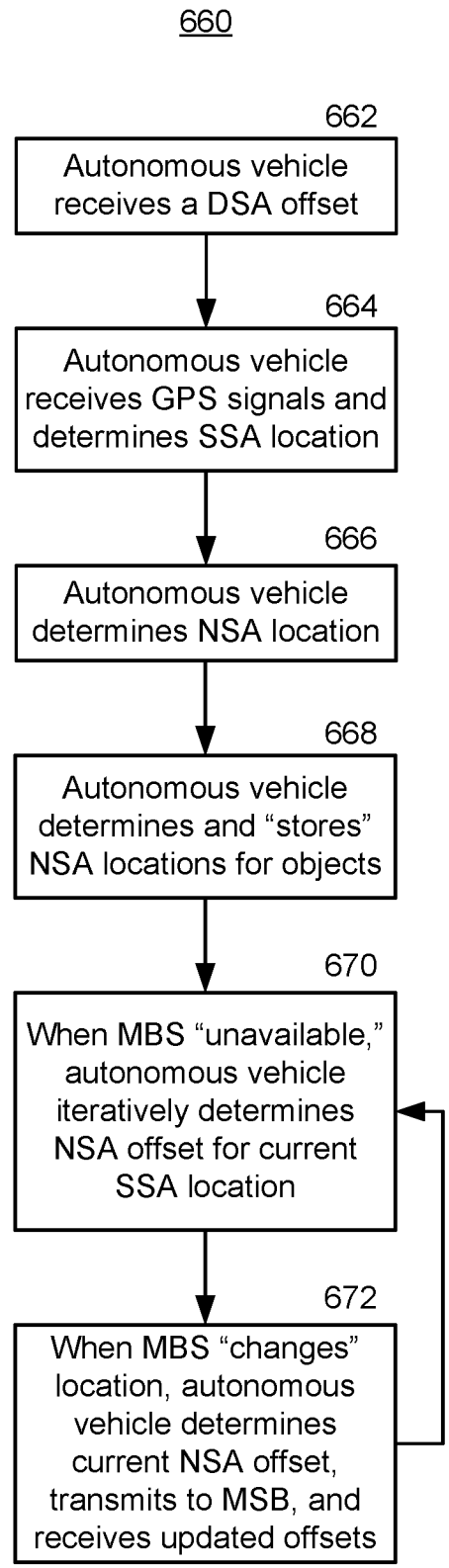
FIG. 6D is a process flow diagram, representative of the various implementations disclosed herein, illustrating an autonomous vehicle using an MBS-provided offset to determining NSA locations for on-site objects—fixed obstacles and dynamic objects—suitable for later use in determining a subsequent NSA location for the MBS itself after the latter changes its location.

FIG. 6D is a process flow diagram, representative of the various implementations disclosed herein, illustrating an autonomous vehicle using an MBS-provided offset to determining NSA locations for on-site objects—fixed obstacles and dynamic objects—suitable for later use in determining a subsequent NSA location for the MBS itself after the MBS changes its location. In FIG. 6D, at 662 an autonomous vehicle receives a DSA offset from an MBS and at 664 (before, concurrent with, or after 662) the autonomous vehicle also receives GPS signals from which it determines its SSA location. At 666 the autonomous vehicle then determines its more accurate NSA location based on the offset applied to the determined SSA location. At 668 the autonomous vehicle, using its sensing technologies to identify objects and determine and stores their NSA locations (fixed or equivalent) for later reference by the autonomous vehicle, the MBS, or other devices when useful.

At 670 the autonomous vehicle may find that the MBS is no longer providing offsets—possibly because the MBS has moved off-site or is otherwise unavailable—and so the autonomous vehicle may iteratively determine its own NSA offset based on its current SSA location and the relative SSA-based location determinations for the objects versus their earlier stored NSA locations. Then at 672, when an MBS is again available but now located at a different location (i.e., not the DSA location—such as when the original MBS returns to the site or when another MBS arrives on site—the autonomous vehicle can provide the MBS with its most current NSA offset (that it determined based on the NSA locations of objects versus SSA-equivalent locations for said objects at that time), and thereafter the autonomous vehicle can again begin receiving MBS-provided offset information (albeit NSA and not DSA).

In this manner, the autonomous vehicle may navigate by its own SSA determinations based on the GPS signals it receives refined into an NSA location by the offset provided by an MBS, and/or the autonomous vehicle may navigate by determining its location based on the DSA determined for objects it can detect by its other sensing means (as discussed earlier herein). Likewise, an MBS may operate at a site to either (1) provide NSA offsets when its own location can be determined from NSA offsets based on NSA locations previously determined for objects detectable by an autonomous vehicle (when SSA locations are also available for both the MBS the autonomous vehicle) or (2) provide DSA offsets when survey information is available for the MBS (such as at an initial site setup for MBS operations).

Stated differently, disclosed herein are various implementations directed to systems, processes, apparatuses, methods, computer-readable instructions, and other implementations for recalibrating a mobile base station communicatively coupled to an autonomous vehicle—or, for certain alternative implementations, communicatively coupled to a different GPS-based device (such as a handheld GPS receiver) capable of being utilized to directly re-survey location points—the method comprising: determining a satellite-signal-accurate (SSA) location for the mobile base station based on GPS signals received by the mobile base station; and determining a near-survey-accurate (NSA) location for the mobile base station based on the determined SSA location for the mobile base station and applying an offset calculated by the navigational vehicle. For certain such implementations: the offset calculated by the navigational vehicle is based on a difference between a satellite-signal-accurate (SSA) location determined for the navigational vehicle based on GPS signals received by the navigation vehicle, and a near-survey-accurate (NSA) location determined for the navigational vehicle; the near-survey-accurate (NSA) location determined for the navigational vehicle is based on the navigational vehicle sensing the relative locations of a plurality of objects each having a known near-survey-accurate (NSA) location; the known near-survey-accurate (NSA) location for each object from among the plurality of objects was previously calculated based on a direct-survey-accurate (DSA) location; the known near-survey-accurate (NSA) location for each object from among the plurality of objects was previously calculated by the navigational vehicle or by a second navigational vehicle (or handheld GPS device, etc.); a subset of objects from among the plurality of objects are dynamic objects; and/or the dynamic objects are solar panels and posts.

With regard to several such implementations specifically directed to autonomous mowers, for example, it should be noted that during the initial setup of a site numerous reference points around the site may be proactively surveyed for the purpose of accurately and efficiently defining mowing areas or equivalent, particularly in and around infrastructure components such as solar panels and posts. Additionally, other reference points that may not be used directly in site setup but may be uniquely and easily identifiable for later use might also be surveyed. Notably, the surveying of these points may be locally accurate but may or may not be globally accurate depending on whether the associated base station for the local surveying was accurately surveyed itself. Moreover, subsequent surveys of the same reference points may be subsequently made with different base stations but, again, will be locally accurate and with the positions differing from the original surveyed positions. Being locally accurate in both cases, further subsequent measurements of the surveyed positions can be used by the then-current and updated base station location to correct such localized errors and subsequent measurements of the originally surveyed points could then be matched to the original measurements as adjusted based on the later-acquired highly-accurate survey.

Regardless, for various such implementations, the autonomous vehicle may operate in conjunction with the base station, both in the initial setup and then in subsequent base station operations, for determinations and utilizations of offsets (local or global). For each such subsequent utilization, the autonomous vehicle would necessarily need to be aware (or become aware by its own determination) that the MBS has moved (i.e., is in a new location) and would need to perform the surveying to determine the correct offset for the new base station position. For example, the MBS may itself communicate that it is in a new location, or the autonomous vehicle may automatically presume as much when the MBS is communicatively unavailable for a threshold period of time (i.e., when the MBS is off-site). Skilled artisans will understand and appreciate the numerous alternatives available in this regard.

Terrain Prediction and Detection

Safely traversing unknown or unfamiliar terrain is an important capability for autonomous vehicles and especially those traveling outdoors. For sustainable operations, an autonomous vehicle must be able to safely traverse the contours of the ground on which it travels. However, given the natural variation in ground in undeveloped and/or vegetative environments, the potentially drastic variations in surfaces and contours can be particularly challenging for an autonomous vehicle during outdoor operations on a variety of different types of ground.

Various implementations disclosed herein are directed to proactively sensing the condition of the ground in the path of the autonomous vehicle in order to mitigate the risks of an autonomous vehicle encountering troublesome terrain, navigation obstacles, and other potential risks to the continued uninterrupted operation of said autonomous vehicle. Accordingly, various implementations disclosed herein are directed to the use of ground analysis sensors—including but not limited to physical-contact sensors as well as non-contact sensors capable of sensing through visibility-obscuring vegetation such as radar- or sonar-based solutions or the like—to assist in the detection of navigationally-difficult terrain including, for example, the use of cantilevered sensors operating well in front of the autonomous vehicles front wheels (drive wheels or otherwise).

For example, for the several implementations disclosed herein, the autonomous vehicle may be an autonomous mower utilizing a cantilevered deck (or substantially cantilevered deck when low-contact ride wheel are still present) which provide an in-front floating platform comprising special forward sensors positioned well in front of the forward wheels (e.g., the drive wheels) of the autonomous mower's tractor—if not on the leading edge of the cantilevered deck itself—said forward-placed sensors providing ground analysis helpful to the autonomous mower in avoiding troublesome terrain.

For certain such implementations, the forward-place sensors may include drop sensors integrated with low-contact ride wheels integrated into the mower's (substantially) cantilevered deck where the ride wheels would allow the autonomous vehicle to sense negative obstacles such as ground holes or other drastic drops in the terrain ahead. These sensors enable detection of obstacles by changes in weight or pressure borne by each said wheel. This approach may also be utilized in certain alternative implementations that lack a cantilevered deck—such as where the deck is substantially supported by the ride wheels—where a drop in one or both ride wheels can be detected and thereby enable the autonomous vehicle to take appropriate actions to avoid the detected obstacle.

Several such implementations may also comprise strain gauges integrated in the tilt actuators of the mower deck to allow the autonomous vehicle to sense positive elevation changes in the terrain ahead of the vehicle. For other such implementations, non-contact sensors might also provide information on the condition of the terrain around the vehicle—detecting both positive and negative obstacles—said non-contact sensors including but not limited to sensors such as cameras, LIDAR, radar, ultrasonic sensing, ground penetrating radar (GPR), and so forth.

Drop wheel sensors, strain gauges, and other such detectors such as bump bars, tractions slips, and so forth without limitation could also be utilized elsewhere on the autonomous vehicle in similar fashion as will be readily-appreciated and well-understood by skilled artisans. For example, for the several implementations disclosed herein where the autonomous vehicle may be an autonomous mower, drop wheel sensors might be integrated with the rear wheels of the autonomous mower (drive wheels or otherwise) to detect ground drops that might not have been detected by wheels located farther forward—for example, when forward-located drive wheels execute a zero-radius turn causing the rear wheels to roll over ground that the front drive wheels did not—and again enable the autonomous vehicle to detect and avoid troublesome terrain.

Based on this approach and the various variations thereof that would be readily apparent and well understood by skilled artisans, several implementations disclosed herein are directed to an autonomous vehicle to navigate over terrain by detecting a ground-based navigational obstacle in the direction of travel of the autonomous vehicle, determining a navigational solution for overcoming the detected navigational obstacle, performing the navigational solution to traverse the navigational obstacle and, for certain implementations, mapping the navigational obstacle for future reference by the autonomous mower. For several exemplary implementations the detecting may performed by a sensor that is, or that is located on, a cantilever of the autonomous vehicle that is forward of the autonomous vehicle relative to the direction of travel. For some implementations, the autonomous vehicle may be an autonomous mower the cantilever may be a cantilevered mowing deck.

For several implementations, the autonomous vehicle may be capable of elevating the cantilever and the navigational solution may comprise elevating the cantilever. Moreover, for select implementations: the detector may comprise a drop sensor for detecting a negative obstacle, and that drop sensor may comprise a ride wheel; and the detector may comprise a strain gauge, a bump bar, or other similar sensor for detecting a positive obstacle.

Exemplary Systems and Component Technologies

An autonomous mower is one example of an autonomous vehicle and which may comprise a mowing deck and a tractor. The tractor may also include a main body that houses various electrical components and electronics such as batteries, drive motors, a battery- or power-management system, component controllers, sensors (e.g., LIDAR, RADAR, IMU, inertial navigation systems, temperature sensors, humidity sensors, noise sensors, accelerometers, pressure sensors, GPS, ultrasonic sensors, cameras or other sensors), network interface devices, a computer system to provide overall control of the mower, and/or other components.

A mowing deck (or "mowing platform") may include one or more blades disposed below the mowing deck. The mowing deck may be supported by a number of wheels. For certain implementations, the mowing deck may be cantilevered from tractor without supporting wheels. Power may be provided through electrical connections to motors on mowing deck to drive the mower blades.

A mowing deck may be adapted to provide for low-profile mowing that can pass under solar panels, even when the solar panels are positioned close to the ground and the tractor cannot drive under them. For example, a mowing deck may be disposed forward of tractor and outside of the wheels of a tractor, and thus the tractor can drive the mowing deck into spaces which the tractor cannot go such as under panels that are lower to the ground than the top of the tractor. The form factor of the mowing deck may be selected to achieve a desired cutting width and low profile. A mowing deck may also be otherwise configured to have a larger or smaller width, to work in different clearances, and to have different mowing heights. For several implementations, a mowing deck may be raised and lowered and, in addition or in the alternative, a mowing deck may be tilted up and down.

Figure 7A:
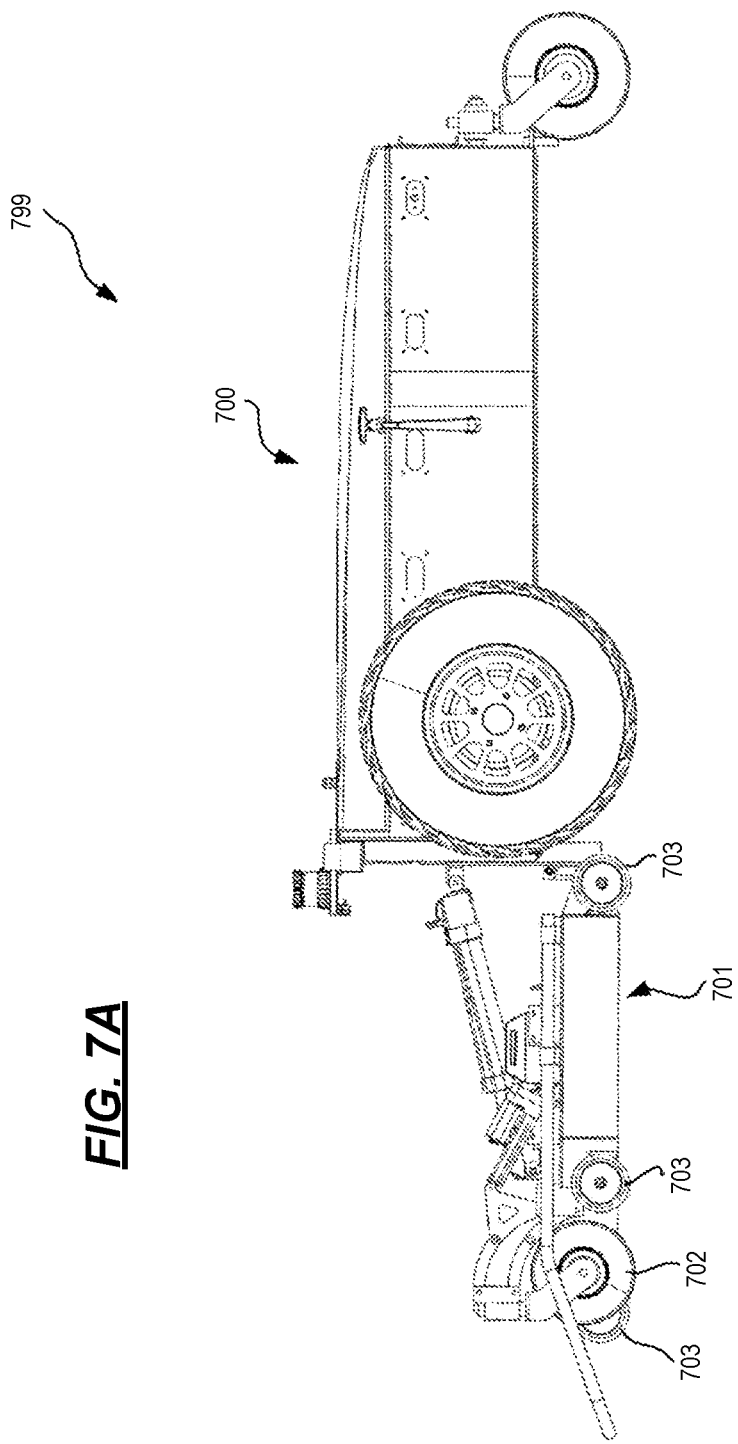
FIG. 7A is a first diagrammatic illustration of an autonomous mower—specifically, a side of view of an autonomous mower that comprises a tractor and a mowing deck—as an exemplary implementation of an autonomous vehicle representative of the various implementations disclosed herein.

FIG. 7A is a first diagrammatic illustration of an autonomous mower—specifically, a side of view of an autonomous mower 799 that comprises a tractor 700 and a mowing deck 701—as an exemplary implementation of an autonomous vehicle representative of the various implementations disclosed herein.

Figure 7B:
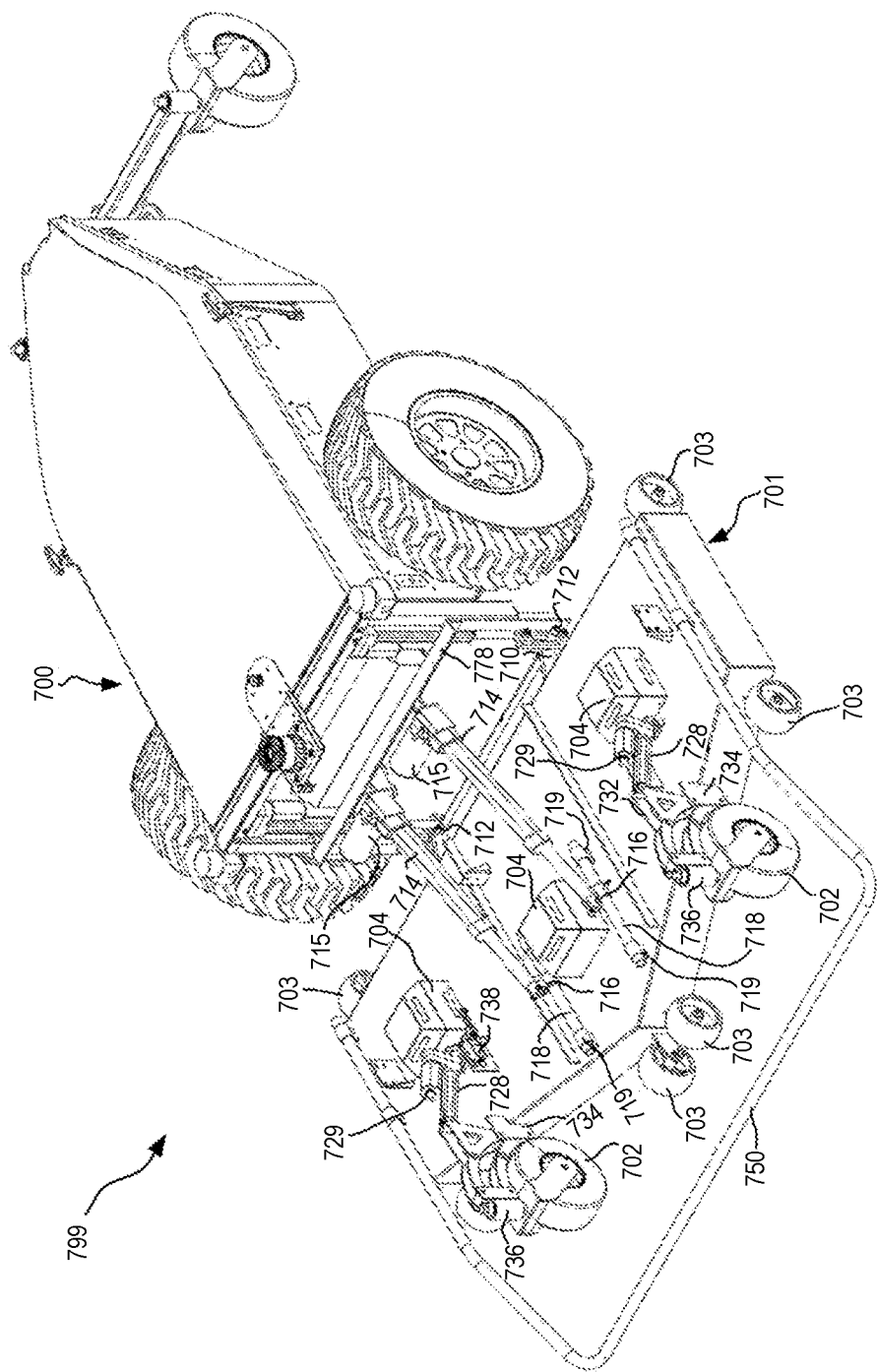
FIG. 7B is a second diagrammatic illustration of the autonomous mower of FIG. 7A—specifically, an oblique front view of an autonomous mower that comprises tractor and a mowing deck—as an exemplary implementation of an autonomous vehicle representative of the various implementations disclosed herein.

FIG. 7B is a second diagrammatic illustration of the autonomous mower of FIG. 7A—specifically, an oblique front view of an autonomous mower 799 that comprises tractor 700 and a mowing deck 701—as an exemplary implementation of an autonomous vehicle representative of the various implementations disclosed herein.

Figure 7C:
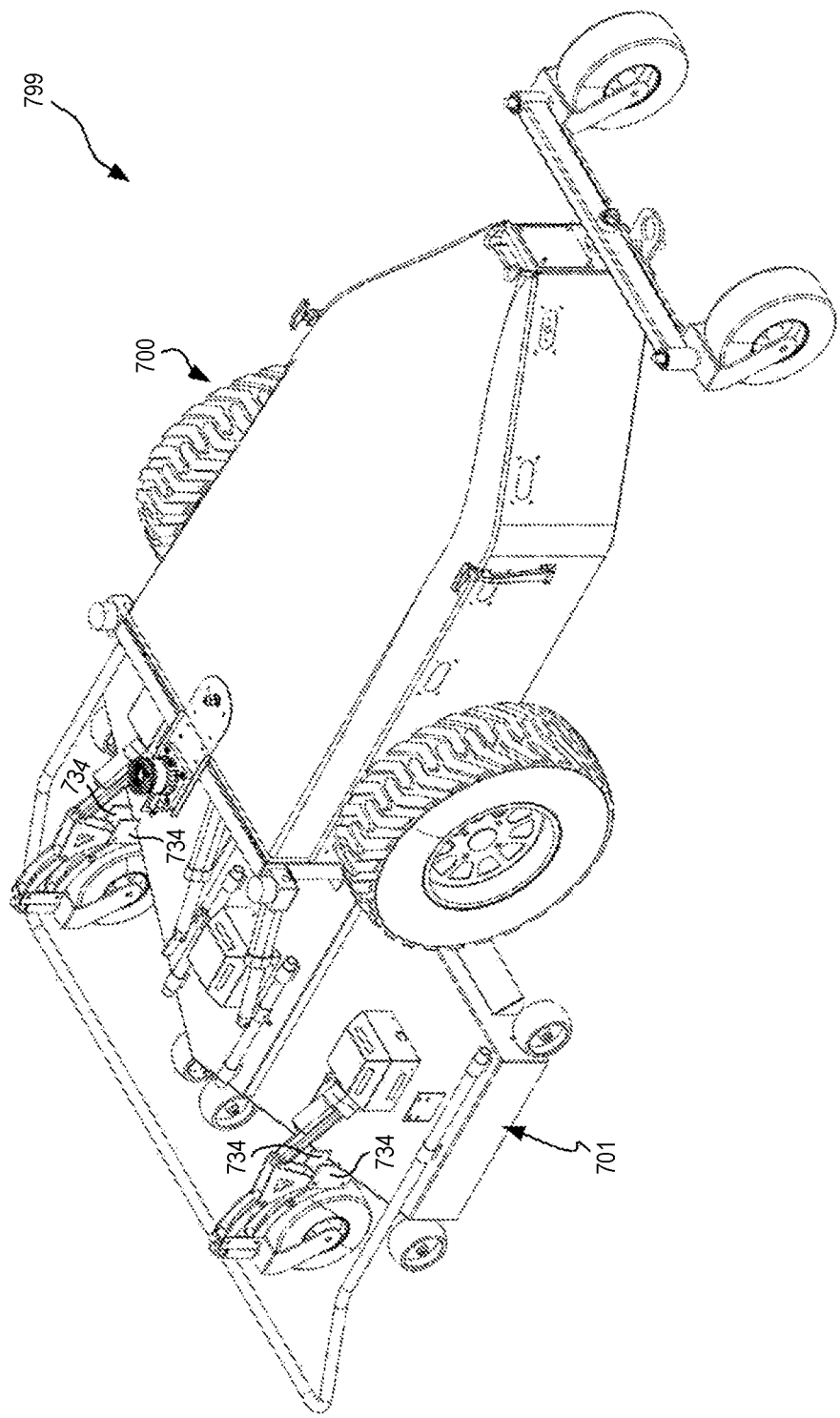
FIG. 7C is a third diagrammatic illustration of an autonomous mower of FIGS. 7A and 7B—specifically, an oblique rear view of an autonomous mower that comprises tractor and a mowing deck—as an exemplary implementation of an autonomous vehicle representative of the various implementations disclosed herein.

FIG. 7C is a third diagrammatic illustration of an autonomous mower of FIGS. 7A and 7B—specifically, an oblique rear view of an autonomous mower 799 that comprises tractor 700 and a mowing deck 701—as an exemplary implementation of an autonomous vehicle representative of the various implementations disclosed herein.

In FIGS. 7A, 7B, and 7C—which may be referred to collectively hereinafter as "FIG. 7" for convenience—autonomous mower 799 may include one or more blades disposed below a mowing deck 701. The mowing deck may be supported by a number of wheels including contact wheels 702 which can be moved to maintain contact with the ground and other wheels 703. Power may be provided through electrical connections to motors 704 on mowing deck 701 to drive the mower blades.

Mowing deck 701 may be adapted to provide for low-profile mowing that can pass under solar panels, even when the solar panels are positioned close to the ground and the tractor cannot drive under them. Mowing deck 701 may be disposed forward of tractor 700 and outside of the wheels of tractor 700, and thus tractor 700 might drive the mowing deck 701 into spaces which tractor 700 itself cannot go, such as under panels that are lower to the ground than the top of tractor 700. The form factor of the mowing deck may be selected to achieve a desired cutting width and low profile. Mowing deck 701 may be otherwise configured to have a larger or smaller width, to work in different clearances and to have different mowing heights.

The rear of mowing deck 701 may be mounted to tool mounting bracket 770 using a hinged connection such that the front of mowing deck 701 can be tilted up. For example, mowing deck 701 may include rearwardly extending hinge members 710. Hinge pins 712 may extend laterally from hinge members 710 to pass through the respective hinge pin openings 783. Hinge pins 712 may comprise bolts that pass-through hinge members 710 and side plates 782. The hinge pins 712 may define an axis of rotation for tilting mowing deck 701 relative to tractor 700.

Additionally, mowing deck 701 may be coupled to tool mounting bracket 770 by tilt actuators 714, which are linear actuators driven by electric motors 715. A first end of each tilt actuator 714 may be rotatably coupled to tool mounting bracket 770 at attachment points 779. The second end of each tilt actuator 714 (e.g., the end of the drive tube) may be connected to the top of mowing deck 701 by a slidable connection or other connection that allows translation. More particularly, guiderails 718 may be attached to and spaced from the top surface of mowing deck 701 (e.g., by standoffs 719) and the second end of each tilt actuator may be coupled, at a rotatable connection, to a sleeve 716 that is translatable along the respective guiderail 718. Biasing members, such as springs disposed about the guiderails 718, may be provided to bias the sleeves 716 forward or rearward.

Autonomous mower 799 thus may include a lift and tilt mowing deck 701. Retracting and extending lift actuators 784 may lift and lower tool mounting bracket 770 and hence mowing deck 701. Retracting tilt actuators 714 may tilt the front end of mowing deck 701 up and extending tilt actuators 714 may lower the front end of mowing deck 701. As discussed above, the capability to lift/tilt the mowing surface may provide a mobile automated maintenance system the enhanced capability to adapt to different contours of the ground and thereby may provide the advantage of level cutting of vegetation by the mowing system. Moreover, the capability to tilt the mowing deck 701 may increase the ease of maintenance and may provide an operator easy access to replace or maintain the mowing blades.

Mowing deck 701 may also include contact wheels 702 that may be operationally coupled to contact wheel actuators 728 (e.g., by linkages 732). Contact wheel actuators 728, which may be linear actuators driven by electric motors 729, may be actuated to maintain contact between contact wheels 702 and the ground and in some cases to maintain a desired amount of deck front pressure (e.g. pressure between wheels 702 and the ground). Moving wheels to maintain a desired amount of contact may allow mowing deck 701 to better follow the contour of the ground or to allow wheels 702 to continue to provide support at the front portion of mowing deck 701 when mowing deck 701 is lifted by lift actuators 784. Moreover, maintaining pressure on contact wheels 702 may be used to help regulate the traction of drive wheels 756 and, as discussed earlier herein, to sense anomalies in the ground that could be obstacles to navigation representative of various implementations herein disclosed.

In addition, a first end of each contact wheel actuator 728 may be rotatably coupled to the top of mowing deck 701. The second end of each contact wheel actuator 728 (e.g., the end of the drive tube, in the illustrated embodiment) may be rotatably coupled to a respective linkage 732. A first end of each linkage may be rotatably coupled to the front of mowing deck 701. The end of each linkage 732 may then capture a pin or other member disposed between a respective pair of forwardly extending plates 734. The distal end of each linkage 732 may include a collar 736 with an internal bushing to receive the shank of a respective contact wheel caster. Extending contact wheel actuators 728 may cause the respective linkages 732 to rotate, pushing the respective contact wheels 702 down. Retracting contact wheel actuators 728 may cause the respective linkages 732 to rotate and pull the respective contact wheels 702 up relative to mowing deck 701.

Mowing deck 701 may include a variety of sensors, such as sensors 738 to measure the frontside pressure at contact wheels 702 (one sensor 738 is visible in FIG. 7B, but a similar sensor can be provided for the other contact wheel). Rotary sensors may be used to output an indication of an amount of contact, and other sensors may also be used. The output of sensors 738 may be used for active control of mowing deck and provide information about the terrain usable in future control decisions.

Mowing deck 701 may include a bump bar 750 which may incorporate a sensor to indicate that autonomous mower 799 has run into an obstacle. Bump bar 750 may also incorporate a kill switch such that autonomous mower 799 will stop the blades, stop moving, shut down, or take other action in response to bump bar 750 bumping into an obstacle with a threshold amount of force. The various motors and sensors associated with mowing deck 701 may be electrically connected to controllers in main body 752.

Notably the mowing deck may be cantilevered (or substantially cantilevered) instead of or in addition to being minimally supported by contact wheels 702 or other deck wheels 703, in which case the contact wheels 702 might be utilized primarily for sensing holes, edges, and other obstacles in accordance with the various implementations disclosed herein.

For certain implementations, mowing deck 702 can connect to tractor 701 using a tool mounting bracket such as tool mounting bracket 770 that may be slidably coupled to the tractor 701. Mowing system 700 may also include lift actuators 784 to lift the mowing deck 702 and tilt actuators 714 to tilt the mowing deck 702. It can be noted then the lift and tilt actuators can be independently controlled to provide increased control over the pitch (rotation about a lateral (side-to-side) axis) and roll (rotation about a longitudinal (front-to-rear) axis) of the mowing deck and the autonomous vehicle can be controlled to control the yaw (rotation about the vertical axis) of the mowing deck. It can be further noted that in some embodiments, all the motors, actuators in an autonomous vehicle or automated maintenance system may be electrical thus eliminating the possibility of hydraulic oil leaks that is present if hydraulic actuators are used.

Figure 8:
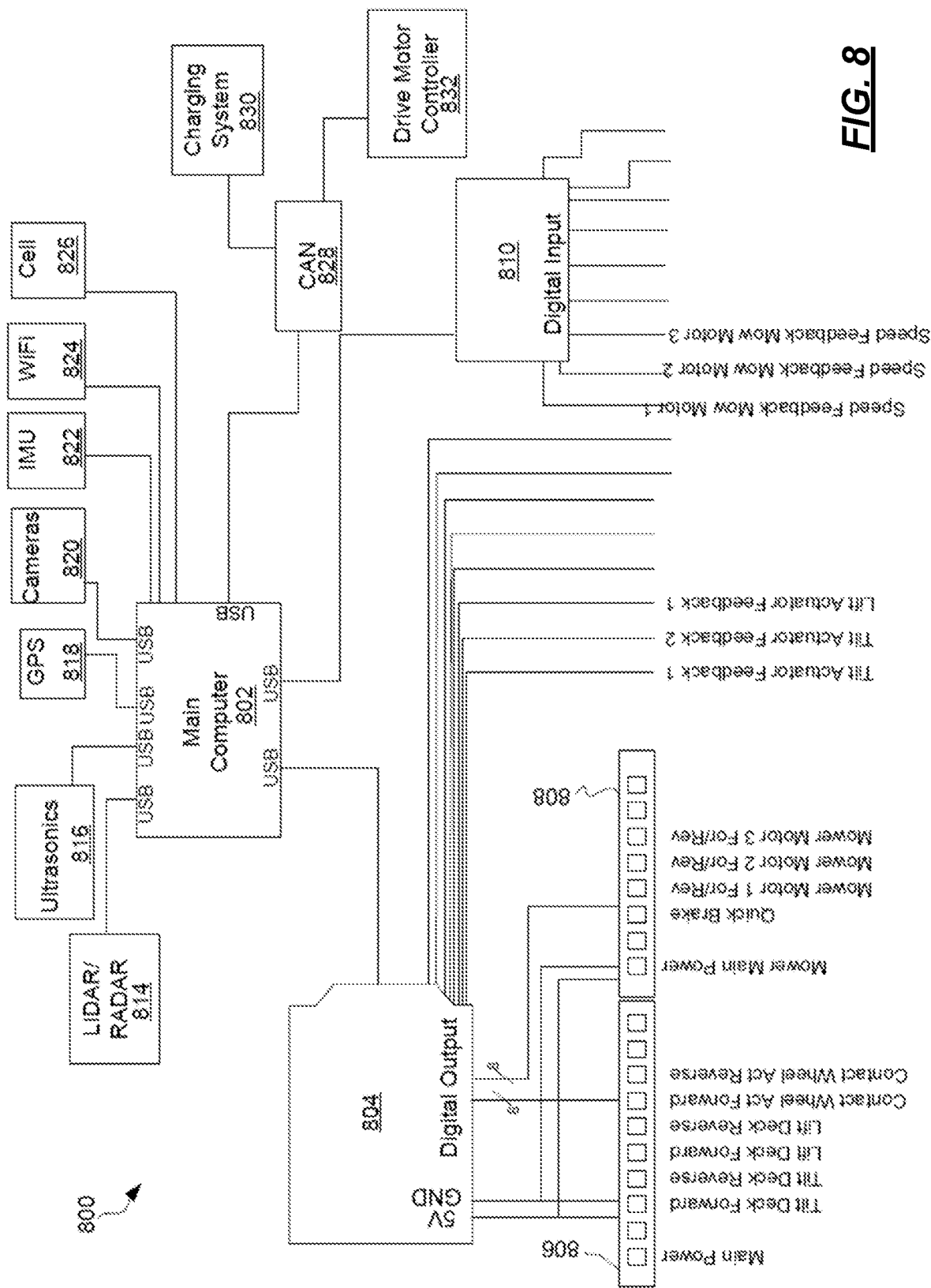
FIG. 8 is a diagrammatic illustration of an exemplary control system for an autonomous vehicle such as, for example, the autonomous mower illustrated in FIGS. 7A, 7B, and 7C and representative of the various implementations disclosed herein.

FIG. 8 is a diagrammatic illustration of an explanatory control system for an autonomous vehicle such as, for example, the autonomous mower illustrated in FIG. 7 and representative of the various implementations disclosed herein. More specifically, FIG. 8 is a diagrammatic representation of certain implementations of a control system for an autonomous mower such as autonomous mower 310. Components of FIG. 8 may be housed in an autonomous, unmanned vehicle, such as a tractor. Control system 800 may include a main computer 802 to provide overall control of the tractor or other autonomous vehicle. For select implementations, main computer 802 may be a computer system adapted for expected operating conditions of the autonomous vehicle. By way of example but not limitation, main computer 802 may be a fan-less embedded system suited for industrial applications, and/or main computer 802 may include software and hardware to implement a state machine comprising, for example, autonomy, halt-and-wait capabilities, and remote-control states, as well as control autonomous navigation, maintenance operation functionality, and other functionality described, disclosed, or otherwise suggested herein.

In the specific implementation illustrated in FIG. 8, main computer 802 may be connected to various controllers that control the distribution of power to and receive feedback from various components. Main computer 802 may also be connected to a first controller 804 by a bus, such as a USB or other bus architecture. First controller 804 may control the distribution of power to various components as needed, for example, first controller 804 may control logic relays 806 to provision main power for drive motor controller 832, control power to drive motor controller 832, and forward or reverse power to tilt actuator motors, lift actuator motors, and wheel actuator motors. Via relays 808, first controller 804 may control distribution of power to the motor controllers of the mower motors that turn the mower's blades. In this example, each mower motor controller may have a main power input, an enable control signal input (e.g., high level/stop low level/run), a quick brake input (e.g., high level/stop, low/level run), a forward/reverse (F/R) input, and/or other inputs. First controller 804 may also control the signals to these inputs to start/stop and otherwise control power to the mower motors as needed.

First controller 804 may also receive feedback from various components. For example, lift actuators, tilt actuators, and wheel actuators may incorporate Hall Effect sensors or other sensors to provide feedback indicative of position, movement, or other related information. Moreover, first controller 804 can receive feedback from wheel pressure sensors. First controller 804 can provide data based on the feedback to main computer 802 indicative of, for example, speed, position or other condition of the actuators or contact wheels.

Main computer 802 may be further connected to second controller 810 via a communications bus such as a USB bus. Second controller 810 may receive feedback from various components of the attached tool. In this example, second controller 810 may connect to speed feedback outputs and alarm outputs of the mower motor controllers. For some implementations, second controller 810 may also provide hardware monitoring of various components of the attached tool and main computer 802 can provide software monitoring. Main computer 802 may be connected to various other components of the autonomous vehicle. For various implementations herein disclosed, communications may be secured on a private network, utilize one or more security protocols in one or more layers, and implement other security features known and appreciated by skilled artisans.

Additionally, one or more sensor components may be connected to main computer 802 over a communications bus. For example, main computer 802 may be connected to a LIDAR and/or RADAR unit 814, ultrasonic sensors 816, GPS 818, cameras 820 and an IMU 822. Main computer 802 may also be connected to (or include) various network interfaces. For example, main computer 802 may be connected to a Wi-Fi adapter 824 and a cellular network adapter 826. In the specific implementation illustrated in FIG. 8, the communications bus is a USB bus, although any suitable communications bus may be used. Furthermore, as illustrated in FIG. 8, main computer 802 may be connected to one or more components of a charging system 830 and a drive motor controller 832 by a controller area network (CAN) 828 or other connection. Main computer 802 can, for example, communicate with drive motor control to control drive motors to turn the drive wheels and battery management system to receive data regarding battery status and control charging and discharging of batteries.

Control system 800 is provided by way of example and not intended to limit the disclosures and implementations described herein in any way. For some implementations, the control system 800 of an autonomous vehicle, such as a tractor 710 or other mobile automated or autonomous system, can be reconfigured for a particular type of tool. For example, for a cantilever mowing deck there would not be a connection for (or the connection would not be used) for the deck wheel actuators, nor would connections for deck wheel actuator feedback be used. For certain implementations, control system 800 could be reconfigured as needed to provide appropriate controllers and/or software configuration of main computer 802.

Figure 9:
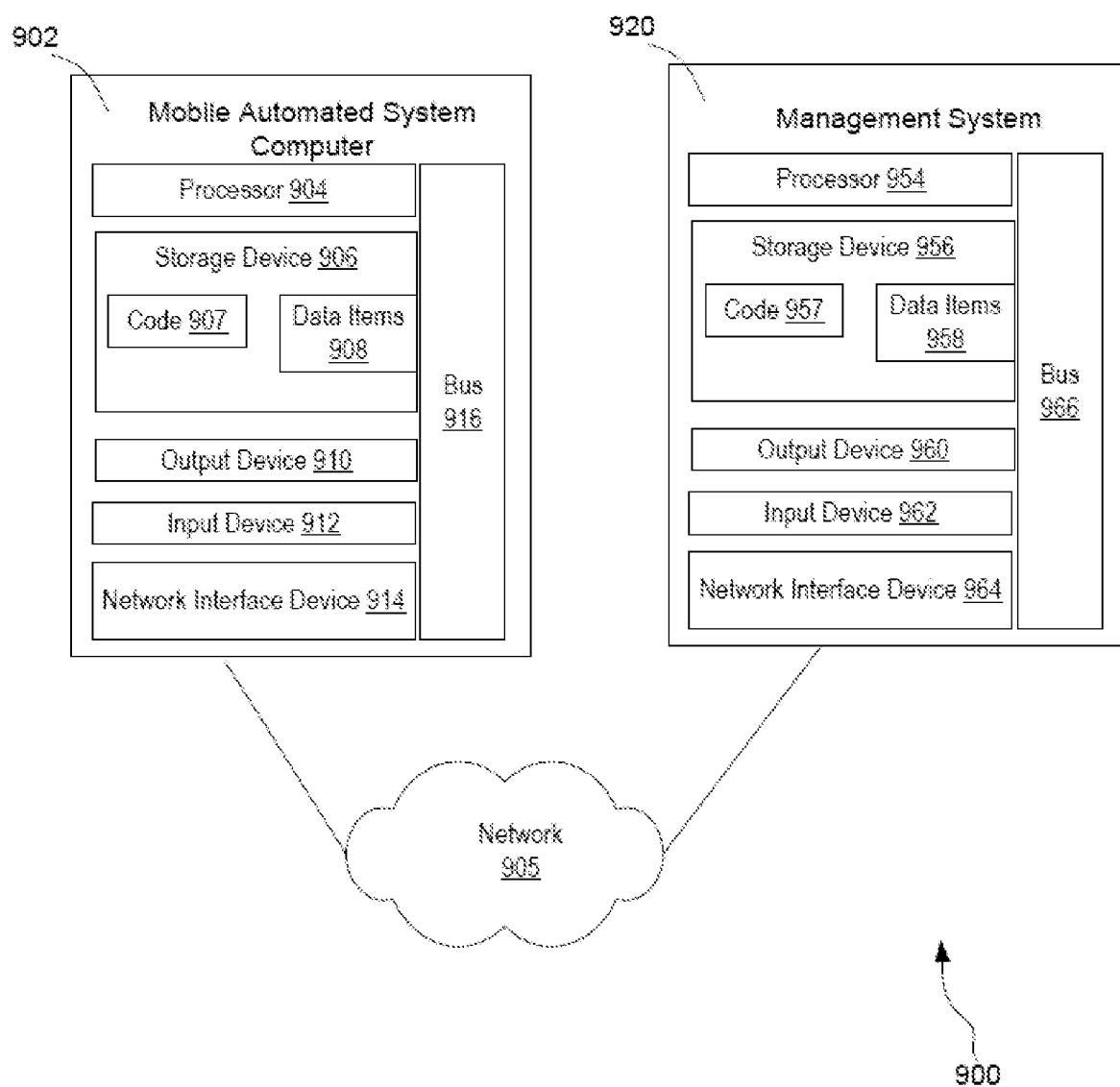
FIG. 9 is a block diagram illustrating an exemplary network system representative of the various implementations disclosed herein.

FIG. 9 is a block diagram illustrating an exemplary network system representative of the various implementations disclosed herein. More specifically, FIG. 9 is a diagrammatic representation of various implementations of a maintenance network system 900 comprising a computer 902 communicatively coupled to a central management system 920 via a network 905. Computer 902 may be one example of a computer for controlling an autonomous vehicle including an autonomous vehicle that provides a mobile automated maintenance system. Computer 902 may be one instance of a main computer 802 of an autonomous mower. Central management system 920 also may be one instance of management system 106.

Computer 902 may include a processor 904, a storage device 906, an output device 910, an input device 912, and a network interface device 914 connected via a bus 916. Processor 904 may represent a central processing unit of any type of processing architecture, such as CISC (Complex Instruction Set Computing), RISC (Reduced Instruction Set Computer), VLIW (Very Long Instruction Word), a hybrid architecture, or a parallel architecture in which any appropriate processor may be used. Processor 904 executes instructions and may include that portion of the computer that controls the operation of the entire computer. Processor 904 may also include a control unit that organizes data and program storage in memory and transfers data and other information between the various parts of the computer. The processor receives input data from the input device 912 and the network, reads and stores code and data in the storage device 906 and outputs data to the output devices 910.

Although a single processor, input device, storage device output device, and single bus are illustrated in FIG. 9, computer 902 may have multiple processors, input devices, storage devices, output devices and busses with some or all performing different functions in different ways. Furthermore, storage device 906 may represent one or more mechanisms for storing data. For example, storage device 906 may include read-only memory (ROM), random access memory (RAM), magnetic disk storage media, optical storage media, flash memory devices, solid state device storage media, and/or other machine-readable media, both non-transitory and transitory in nature. In other implementations, any appropriate type of storage device may be used, and/or multiple types of storage devices may be present. Additionally, multiple and different storage devices and types may be used in conjunction with each other to perform data storage functions for the computer. Furthermore, although the computer is illustrated in FIG. 9 as containing the storage device, the storage device may be distributed across other computers communicatively coupled over a suitable network such as, for example, on a remote server.

Storage device stores code 907 and data items 908 therein. Code 907 may be capable of storing instructions executable by processor 904 to carry out various functions described herein including but not limited to autonomous navigation and other functions. In some implementations, code 907 may be executable to implement a command center application. In other implementations, code 907 may be executable to implement a mow pattern planner. In some implementations, code 957 may be executable to implement a path generator. In some implementations, code 957 may be executable to implement a route generator. In some implementations, code 907 may be executable to implement a state machine having, for example, an autonomy state, a hold-and-wait state, and a remote-control state. In other implementations, some or all of the functions may be carried out via hardware in lieu of a processor-based system.

As will be understood by those of ordinary skill in the art, the storage device may also contain additional software and data (not shown). Indeed, data items 908 may include a wide variety of data including but not limited to configuration data, data collected by the autonomous vehicle during use, data provided to the autonomous vehicle by the central management system 920 or other system, maintenance plans, path information, and other data. Although the code 907 and the data items 908 as shown to be within the storage device 906 in the computer 902, some or all of them may be distributed across other systems communicatively coupled over the network, for example on a server.

Output device 910 represents devices that may output data to a user or direct data to be sent to other systems connected through the network. The output may be a liquid crystal display (LCD), in one example, though any suitable display device may be used. For certain implementations, an output device displays a user interface. Any number of output devices can be included, including output devices intended to cause data to be sent to other systems connected through network 905. Input device 912 may represent one or more devices that provide data to processor 904, and input device 912 may represent user input devices (e.g., keyboards, trackballs, keypads and the like), sensors, or other input devices.

The network interface device 914 may provide connection between the computer 902 and network 905 through any suitable communications protocol. The network interface device 914 sends and receives data items from the network. Bus 916 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Computer 902 may be implemented using any suitable hardware and/or software. Peripheral devices such as auto adapters or chip programming devices, such as EPROM (Erasable Programmable Read-Only Memory) programming devices may be used in addition to, or in place of, the hardware already depicted. Computer 902 may be connected to any number of sensors or other components via a bus, network or other communications link.

Network 905 may be any suitable network and may support any appropriate protocol suitable for communication to the computer. Network 905 can include a combination of wired and wireless networks that the network computing environment of FIG. 9 may utilize for various types of network communications. For example, network 905 can include a local area network (LAN), a hotspot service provider network, a wide area network (WAN), the Internet, GPRS network or other cellular data network or cell-based radio network technology mobile network, an IEEE 802.IIx wireless network or other type of network or combination thereof. For some implementations, network 905 may support the Ethernet IEEE 802.3x specification. For some implementations, network 905 may support IP (Internet Protocol) over either or UDP (User Datagram Protocol).

For some implementations, a mobile automated system can communicate with a central management system 920 via network 905 to communicate data to and receive data and commands. For example, computer 902 may send status information, alerts, collected data and other information to central management system 920. Similarly, computer 902 can receive updated routing information, maintenance plans, decision algorithms or other information from central management system 920. For some implementations, code 907 implements watchers to watch for various commands from central management system 920.

For some implementations, a mobile automated system may operate in various states including, but not limited to an autonomy state and a remote-control state. In an autonomous state, the mobile automated system (e.g., under the control of computer 902) performs autonomous navigation to generate paths, generate routes, follow routes, implement maintenance plans or take other actions without human intervention. Autonomous navigation can include route following, collision avoidance and other aspects of autonomous navigation. In some cases, the mobile automated system may encounter a situation that requires intervention, such as becoming stuck or encountering an obstacle that the mobile automated system cannot navigate around. The mobile automated system can send alerts to central management system 920 and, in some cases, await further instructions before moving again.

Central management system 920 may communicate with computer 902 to update the mobile automated system, put the mobile automated system in a manual state or carry out other actions. Central management system 920 can provide an interface, such as a web page or mobile application page, through which an operator can control the mobile automated system in the manual state. Commands entered by the operator (e.g., movement commands or other commands) are routed to computer 902 over network 905 and computer 902 controls the mobile automated system to implement the commands. Central management system 920 can further return the mobile automated system to an autonomous state. Central management system 920 may provide a centralized management for a large number of geographically dispersed mobile automated systems.

Central management system 920 may be one instance of management system 106. Central management system 920 includes a processor 954, a storage device 956, an output device 960, an input device 962, and a network interface device 964 connected via a bus 966. Processor 954 represents a central processing unit of any type of processing architecture, such as CISC (Complex Instruction Set Computing), RISC (Reduced Instruction Set Computer), VLIW (Very Long Instruction Word), a hybrid architecture, or a parallel architecture. Any appropriate processor may be used. Processor 954 executes instructions and may include that portion of the computer that controls the operation of the entire computer. Processor 954 may include a control unit that organizes data and program storage in memory and transfers data and other information between the various parts of the computer. The processor receives input data from the input device 962 and the network, reads and stores code and data in the storage device 906 and outputs data to the output devices 960. While a single processor, input device, storage device output device and single bus are illustrated, Central management system 920 may have multiple processors, input devices, storage devices, output devices and busses with some or all performing different functions in different ways. Moreover, various secure communications approaches may be utilized, as well as other security measures known and appreciated by skilled artisans.

Storage device 956 represents one or more mechanisms for storing data. For example, storage device 956 may include read-only memory (ROM), random access memory (RAM), magnetic disk storage media, optical storage media, flash memory devices, solid state device storage media, and/or other machine-readable media. For some implementations, any appropriate type of storage device may be used. Multiple types of storage devices may be present. Additionally, multiple and different storage devices and types may be used in conjunction with each other to perform data storage functions for the computer. Further, although the computer is drawn to contain the storage device, it may be distributed across other computers communicatively coupled over a suitable network, for example on a remote server.

Storage device stores code 957 and data items 958 therein. Code 957 can include instructions executable by processor 954 to carry out various functionality described herein. For some implementations, code 957 is executable to implement a command center application. For some implementations, code 957 is executable to implement a mow pattern planner. For some implementations, code 957 is executable to implement a path generator. For some implementations, code 957 is executable to implement a route generator. For some implementations, some or all of the functions are carried out via hardware in lieu of a processor-based system. As will be understood by those of ordinary skill in the art, the storage device may also contain additional software and data (not shown). Data items 958 can include a wide variety of data including, but not limited to, configuration data, data collected from the autonomous mower, data provided to central management system 920 by other systems, maintenance plans, path information, and other data. Although the code 957 and the data items 958 as shown to be within the storage device 956, some or all of them may be distributed across other systems communicatively coupled over the network.

Output device 960 represents devices that output data to a user or direct data to be sent to other systems connected through the network. The output may be a liquid crystal display (LCD), in one example, though any suitable display device may be used. For some implementations, an output device displays a user interface. Any number of output devices can be included, including output devices intended to cause data to be sent to other systems connected through network 905. Input device 962 represents one or more devices that provide data to processor 954. Input device 962 can represent user input devices (e.g., keyboards, trackballs, keypads and the like), sensors or other input devices.

The network interface device 964 connects between central management system 920 and network 905 through any suitable communications protocol. The network interface device 964 sends and receives data items from the network. Bus 966 may represent one or more busses, e.g., USB (Universal Serial Bus), PCI (Peripheral Component Interconnect), ISA (Industry Standard Architecture), X-Bus, EISA (Extended Industry Standard Architecture), MCA (Micro Channel Architecture), IEEE 994, or any other appropriate bus and/or bridge.

Central management system 920 may be implemented using any suitable hardware and/or software. For some implementations, central management system 920 may be implemented according to a cloud-based architecture. Peripheral devices such as auto adapters or chip programming devices, such as EPROM (Erasable Programmable Read-Only Memory) programming devices may be used in addition to, or in place of the hardware already depicted. Central management system 920 may be connected to any number of sensors or other components via a bus, network or other communications link.

Autonomous Vehicle Power System

Figure 10:
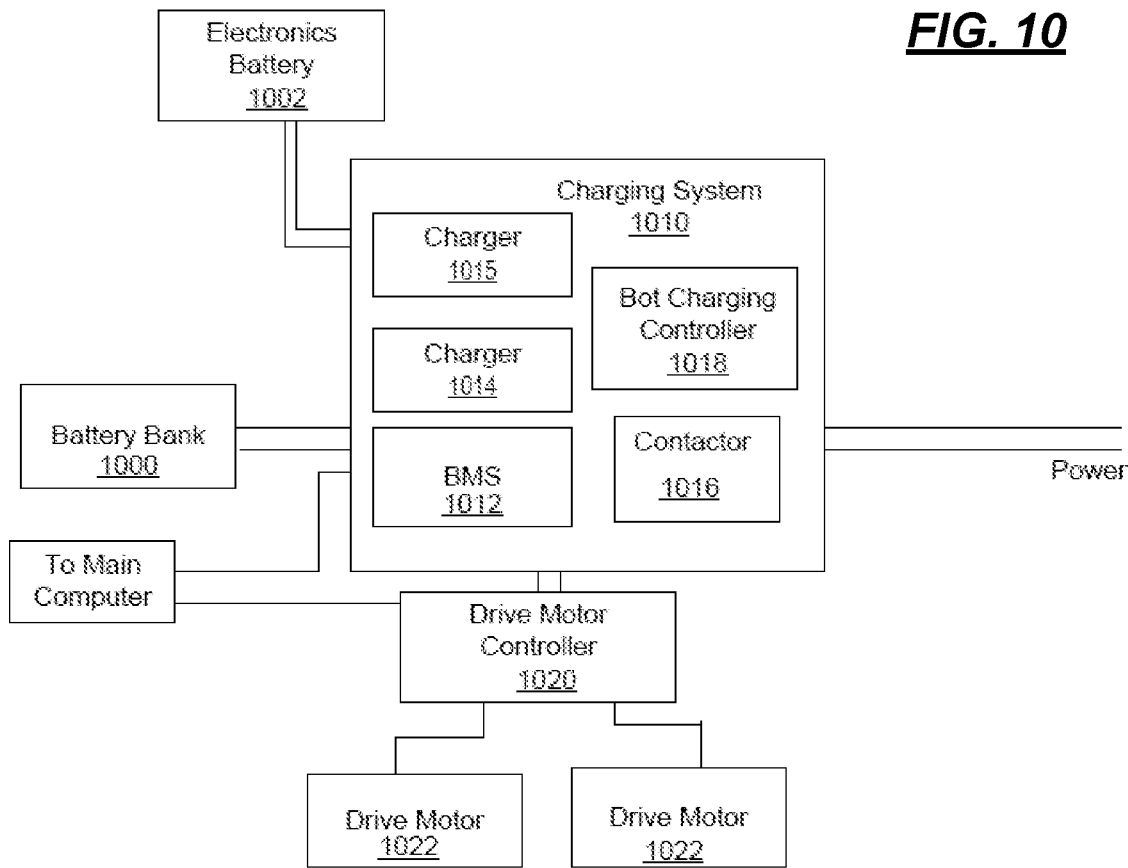
FIG. 10 is a block diagram illustrating exemplary power and drive components for an autonomous vehicle, an autonomous robot, an autonomous mower, or other autonomous system representative of the various implementations disclosed herein.

FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating exemplary power and drive components for an autonomous vehicle, an autonomous robot, an autonomous mower, or other autonomous system representative of the various implementations disclosed herein. More specifically, FIG. 10 is a block diagram illustrating select implementations of power and drive components of an autonomous vehicle, such as autonomous mower 310 or autonomous mower 700 or other mobile automated system. With regard to FIG. 10, the autonomous vehicle includes a main battery bank 1000 having one or more battery modules (for example one or more lithium ion or other rechargeable battery modules). The number of modules needed may be increased or decreased for a variety of reasons, including, but not limited to, altering the amount of power for the maintenance system based on the location of the maintenance system, and run time needed for the maintenance system and any attached devices. For some implementations, the autonomous vehicle contains 8 48V battery modules, with each having approximately 2850 kWh of power. As will be well understood by one of ordinary skill in the art, the efficiency of battery systems may increase over time, and any number of battery modules may be used.

The battery modules of main battery bank 1000 may be a higher voltage than supported by computers (e.g., main computer 802), actuators, various electronics or other components of the mobile automated system. For some implementations, the autonomous vehicle can include one or more secondary batteries 1002 to power the main computer 802, various sensors, electronics, logic relays and other components. For example, or some implementations an autonomous vehicle may include a common car, motorcycle, Gel cell battery or the like.

As illustrated in FIG. 10, the autonomous vehicle can include a charging system 1010 that includes various components involved in charging the batteries. The charging can be an example of charging system 830. As illustrated, the charging system includes battery management system (BMS) 1012, charger 1014, contactor 1016 and autonomous vehicle (or "bot") charging controller 1018. Various components of the charging system can be connected to a bot computer (e.g., main computer 802) by a network or other communications link.

For some implementations, BMS 1012 is directly connected to battery bank 1000 and is adapted to manage and maintain batteries in battery bank 1000. As will be appreciated, BMS 1012 can provide various functions with respect to the rechargeable batteries of main battery bank 1000. By way of example, BMS 1012 can provide constant monitoring of charge balance, generate alerts, and implement preventive action to ensure proper charging. For some implementations, BMS 1012 assesses battery profiles for the battery modules of battery bank 1000 and the temperature of the battery modules, oversees balancing, performs monitoring of battery health and ensure battery bank 1000 is being charged in a safe manner (e.g., not being overcharged, not exceeding temperature limits, etc.). For some implementations, a bot computer (e.g., main computer 802) is connected to BMS 1012 (e.g., by a CAN or other communication link) and monitors/controls whether BMS 1012 allows charging.

The charging system further includes a charger 1014 to charge the batteries in battery bank 1000. Charger 1014 includes one or more chargers that have programmed profiles for the battery modules of battery bank 1000. Charger 1014 monitors the voltage of the battery bank 1000 and, if a charging voltage is out of range, stops charging. The charging system also includes a charger 1015 to charge secondary battery 1002 from main battery bank 1000. For some implementations, the charging system includes or is connected to a contactor 1016 that is electrically coupled to the charging contacts of the autonomous vehicle. Contactor 1016 can be selectively engaged and disengaged to allow charging when the bot is docked at a charging station. For several such implementations, the chargers 1014 may be located outside of the autonomous vehicle. For several such alternative implementations, certain components illustrated in FIG. 10 may be located within the autonomous vehicle while certain other components may be located outside of the autonomous vehicle in any of several variations.

The charging system includes a bot charging controller 1018 electrically coupled to the charging contacts. Bot charging controller 1018, for some implementations, is configured to determine when the autonomous vehicle has docked with a charging dock and engage/disengage contactor 1016 as needed to connect the charge power lines to charger 1014 and/or BMS 1012 to charge batteries in main battery bank 1000. For some implementations, the determination that the autonomous vehicle has docked successfully may be based, in part on a data communication between bot charging controller 1018 and a charging station controller. Such communication may be implemented according to any suitable protocol including power-line protocols or other protocols. To this end, bot charging controller 1018 may include a power-line communication or other adapter for communicating with the charging station.

The autonomous vehicle includes a drive motor controller 1020, which may be one example of drive motor controller 832. Drive motor controller 1020 is electrically connected to the drive motors 1022 that turn the drive wheels (and/or other motive mechanisms) of the autonomous vehicle. For some implementations, drive motor controller 1020 distributes power from battery bank 1000 to drive motors 1022 based on commands from the main computer. For some implementations, drive motor controller 1020 is connected to the main battery bank 1000 through the charging system, for example, through BMS 1012 or other components.

Charging Station and Dock

In order for an autonomous vehicle to operate autonomously in a meaningful fashion, the recharging process must also be automated and thereby utilize human-independent recharging. Several implementations disclosed herein pertain to battery-powered autonomous vehicles where performing such recharging has several challenges including but not limited to how the autonomous vehicle interconnects with a recharge station to enable power transfer. While several such challenges might be avoided using wireless recharging, for example, wireless recharging is inherent inefficiency and limited throughput make it generally unsuitable for most implementations disclosed herein versus power transfer by direct contacts such as power plugs. Yet the use of power plugs has its own shortcomings such as difficulties in precision docking necessary to interface with a plug, as well as the realities of outdoor operations and risks of dirt and mud filling the cavity of the power plug if not rain, water, insects, and other factors that could prevent successfully interfacing with a plug. Similar issues can also negatively impact the use of exposed power contacts—often used for low-power indoor applications—and exposed the contacts for high-power outdoor utilization of autonomous vehicles can also present significant safety risks.

Accordingly, various implementations disclosed herein are directed to an autonomous vehicle charging station featuring self-cleaning contact points, power flow safety features, and electrical connection testing (meeting minimum performance thresholds) for safe and efficient power transfer from the charging station to the autonomous vehicle.

Figure 11:
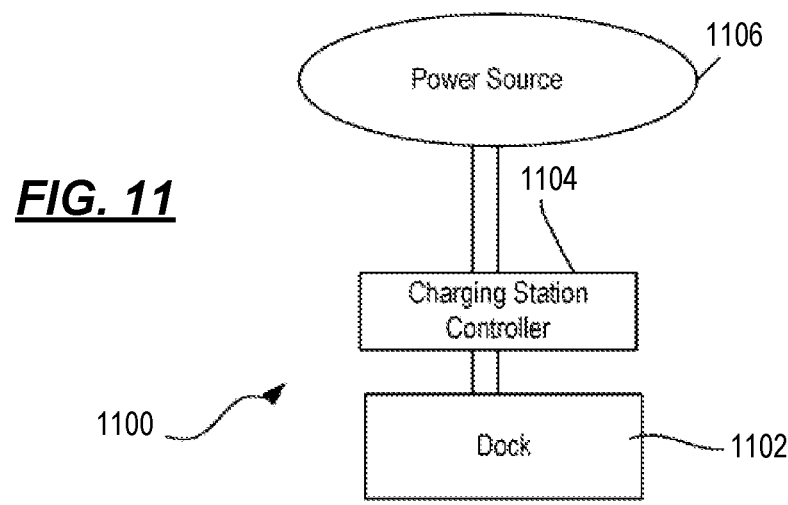
FIG. 11 is a block diagram illustrating an exemplary implementation of a charging station representative of the various implementations disclosed herein.
Figure 13A:
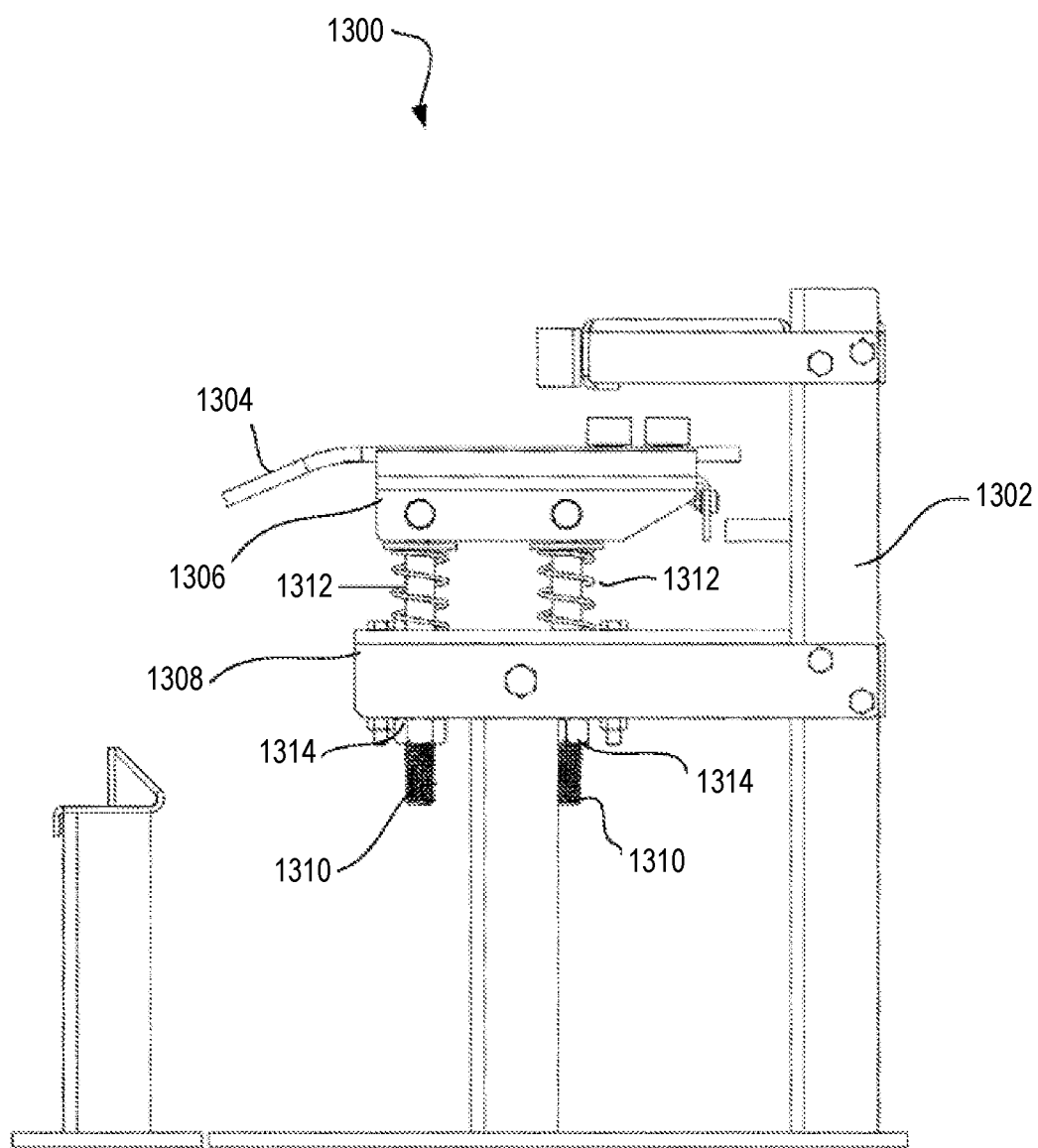
FIG. 13A is a first diagrammatic illustration of a charging dock—specifically, a side view of the charging dock—for an autonomous vehicle charging station representative of various implementations disclosed herein.
Figure 13B:
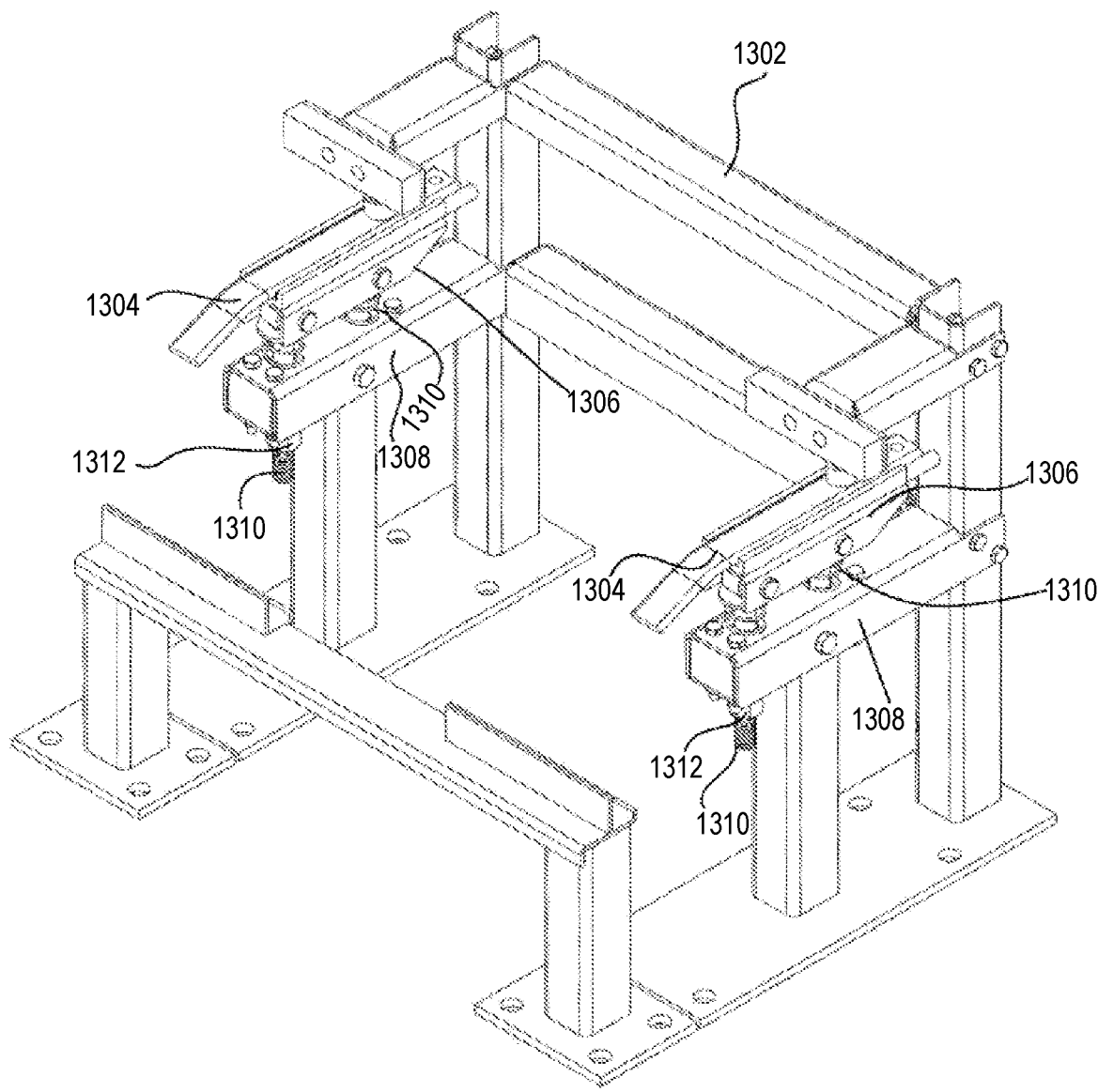
FIG. 13B is a second diagrammatic illustration of the charging dock of FIG. 13A—specifically, an oblique front view of the charging dock—for an autonomous vehicle charging station representative of various implementations disclosed herein.
Figure 13C:
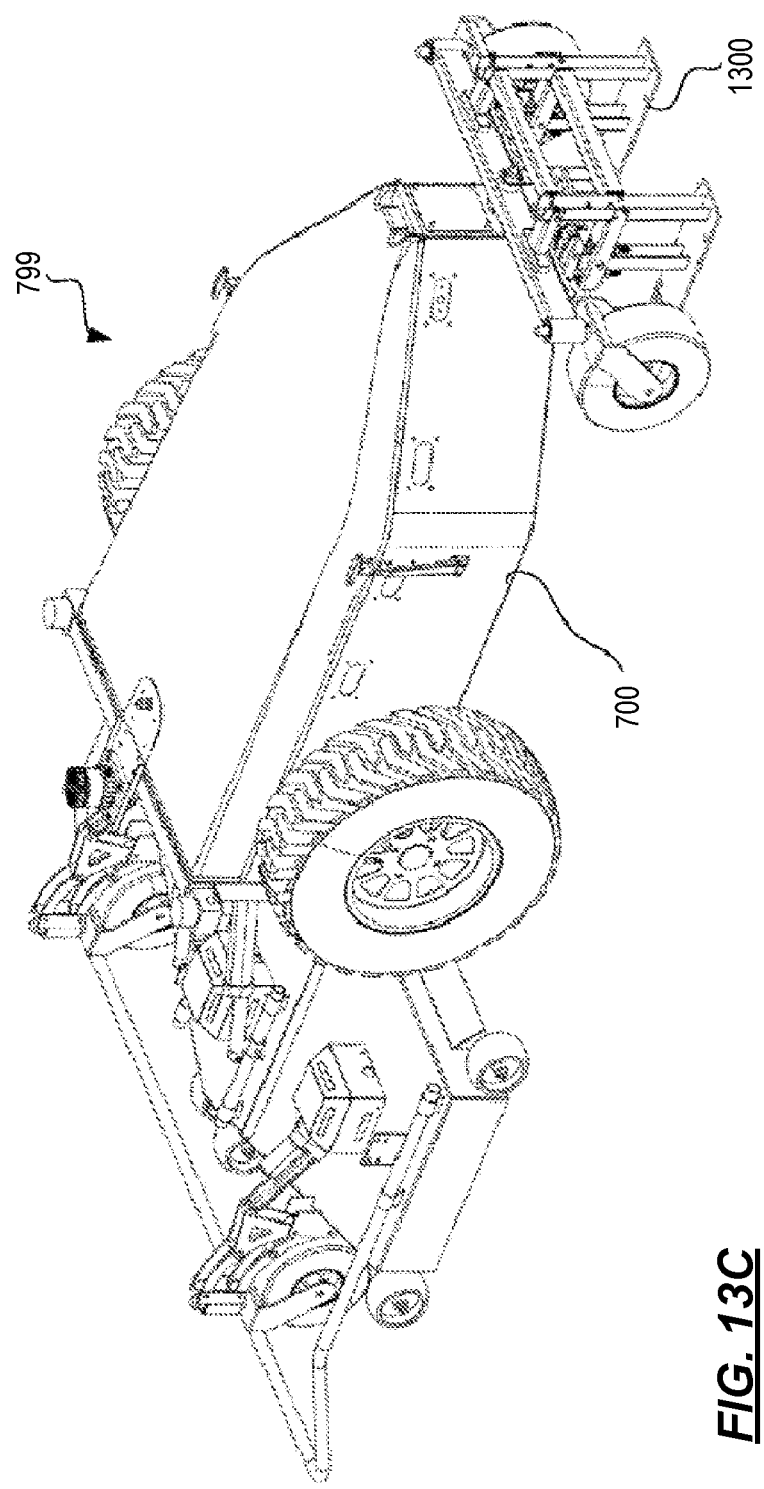
FIG. 13C is a third diagrammatic illustration of the charging dock of FIGS. 13A and 13B—specifically, an oblique back view of the charging dock—with a navigational vehicle docked for charging representative of various implementations disclosed herein.

FIG. 11 is a block diagram illustrating an exemplary implementation of a charging station representative of the various implementations disclosed herein. In FIG. 11, charging station 1100 comprises a charging dock 1102 that provides a physical interface for electrically connecting to an autonomous vehicle. While charging dock 1102 may include any compatible charger interface for charging an autonomous vehicle, an exemplary implementation is illustrated in FIGS. 13A-13C later herein.

For various implementations of a charging station disclosed herein, a charging station controller 1104 may be connected to a charging dock 1102 by one or more power connections—alternating current (AC) and/or direct current (DC)—and for several such implementations one or more data connections. Charging station controller 1104 controls the distribution of power from one or more power sources 1106 to charging dock 1102. Power may be supplied from a local power grid, one or more power generators of an energy farm (e.g., one or more solar panels, wind turbines, or other generators), or other power sources. Power is provided through charging dock 1102 to the autonomous vehicle in order to charge the latter's batteries.

For certain implementations, charging station 1100 may also connect to the autonomous vehicles for charger-related data communications, and thus charging dock 1102 may further include charger data interface connections, which may be part of or separate from the charging connector. In addition (or in the alternative), charging station 1100 and an autonomous vehicle may communicate via power-line communications. For example, autonomous vehicle charging controller 718 and charging station controller 1104 may include power-line communications capabilities in order to facilitate such communications, in which case the same contacts for power transfer can also act as connections for the charger power interface and charger data interface.

For select implementations, charging station controller 1104 may have limited intelligence. For example, charging station controller 1104 may include logic to listen for and respond to data connection requests from a docked autonomous vehicle and provide limited control over power (e.g., for safety purposes); however, for some implementations, once the autonomous vehicle has docked, the autonomous vehicle may control charging. When charging station controller 1104 senses an electrical potential at dock 1102—indicating that an autonomous vehicle has docked and, for example, contactor 716 has engaged—charging controller 1104 supplies power to charging dock 1102, and the autonomous vehicle may control charging by selectively engaging and disengaging contactor 1016 of FIG. 10.

Figure 12:
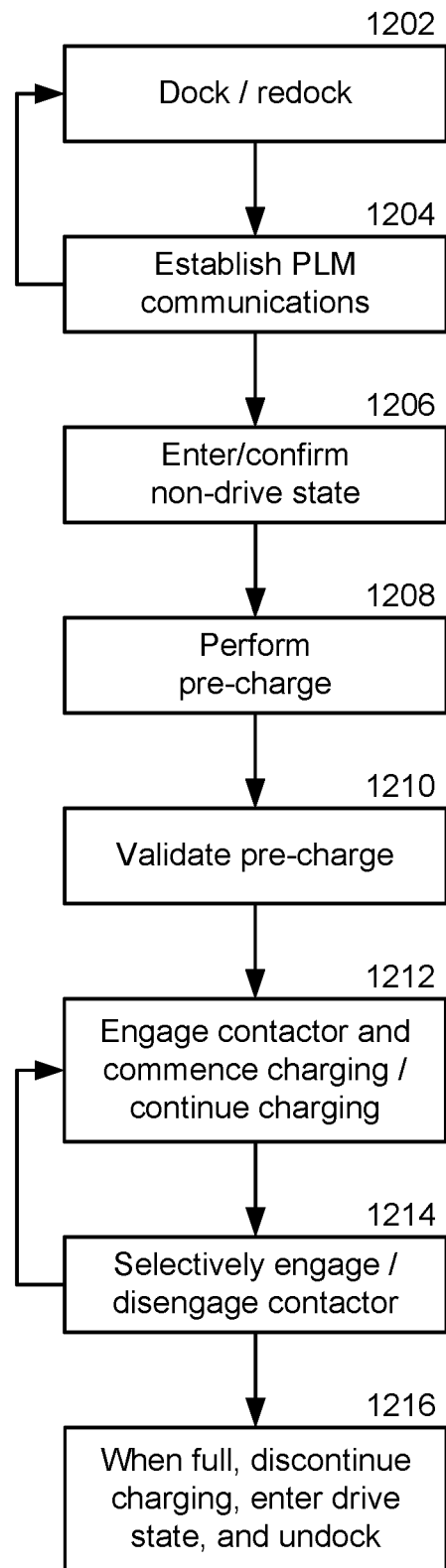
FIG. 12 is a modified logical flow diagram, representative of the various implementations disclosed herein, illustrating an exemplary docking and charging process.

FIG. 12 is a modified logical flow diagram, representative of the various implementations disclosed herein, illustrating an exemplary docking and charging process. Referring to FIG. 12, at 1202 the autonomous vehicle docks at the charging station. At 1204 communications between the autonomous vehicle and the charging station are established utilizing power line modems (PLMs) and, if unable to establish PLM communications, the process returns 1202 in order for the autonomous vehicle to redock in an attempt to establish a better communications connect and, by implication, a better power connection. In this manner, the quality of the connection needed to establish communications between the autonomous vehicle and the charging station via PLM acts as an initial test of the connection for power transfer—that the autonomous vehicle is docked safely and securely.

After successful PLM communications have been established between the autonomous vehicle and the charging station, at 1206 the autonomous vehicle then enters a non-drive state, effectively locking itself into its docked position with the charging station. At 1208 a pre-charge is then performed whereby a measured quantity of a low, non-lethal current is passed from the autonomous vehicle to the charging station, after which at 1210 the autonomous vehicle validates the pre-charge by comparing the value determined by the charging station (i.e., the received charge) to the value determined by the autonomous vehicle (i.e., the transmitted charge) and, if a threshold amount of energy (e.g., 95%) is successfully passed by the autonomous vehicle to the charging station—and not lost through an unexpected ground such as a person, animal, or other unsafe cause for the draw off of the energy—then the connection is deemed safe and full charging commences at 1212. At 1216 when the charging is complete (e.g., the autonomous vehicle's batteries are fully or optimally recharged), the charging is discontinued and the autonomous vehicle enters a drive state and undocks from the charging station.

Although elements of the foregoing process may be performed by the charging station, the autonomous vehicle, or both in collaboration, select implementations disclosed herein are specifically directed to an autonomous vehicle capable of performing all of these process elements. For other implementations, however, the process elements may be rightly viewed as being performed by the autonomous vehicle and the charging station collaboratively as a single performing entity or device.

FIG. 13A is a first diagrammatic illustration of a charging dock—specifically, a side view of the charging dock—for an autonomous vehicle charging station representative of various implementations disclosed herein.

FIG. 13B is a second diagrammatic illustration of the charging dock of FIG. 13A—specifically, an oblique front view of the charging dock—for an autonomous vehicle charging station representative of various implementations disclosed herein.

FIG. 13C is a third diagrammatic illustration of the charging dock of FIGS. 13A and 13B—specifically, an oblique back view of the charging dock—with a navigational vehicle docked for charging representative of various implementations disclosed herein.

In FIGS. 13A, 13B, and 13C—which may be referred to collectively hereinafter as "FIG. 13" for convenience—charging dock 1300 may be part of a charge station that includes charging controllers, inverters, or other components to facilitate charging. Charging dock 1300 may comprise a support frame 1302 that can be bolted to a skid or other structure at a location accessible to one or more autonomous vehicles. Support frame 1302 may include various members and features to assist an autonomous vehicle approach and dock at the charging dock. Charging dock 1300 includes charging station contacts 1304 adapted to charger contacts (not shown) of the autonomous vehicle. In the embodiment illustrated, charging station contacts 1304 may be plates of suitable conductive material that extend primarily longitudinally with respect to an autonomous vehicle navigating to dock. Charging station contacts 1304 may be electrically connected to a power source via a charging station controller.

Charging contacts 1304 may be held by contact holders 1306 which may be coupled to and movable relative to support frame 1302. Support frame 1302 may include forwardly extending arms 1308 and contact holders 1306 that are held above the arms 1308. Bolts or other attachment members may pass through the bottom portions of contact holders 1306 and the through openings in arms 1308. Springs 1312 may be disposed between the top surface of arms 1308 and the bottom surfaces of contact holders 1306 about the shafts of the bolts 1310 to bias the contact holders 1306 away from arms 1308. Nuts 1314 or other retaining members may be used to limit movement of contact holders 1306 away from arms 1308. The front ends of the charging contacts 1304 may overhang the contact holders 1306 and may be angled downward to form ramp portions that facilitate docking.

For certain implementations, contact holders 1306 may hold the charging station contacts so that each ramp portion will vertically align with the respective autonomous vehicle charger contact. When the autonomous vehicle approaches charging dock 1300, the charger contacts would contact the front ramp portion of charging station contacts 1304 first. As the autonomous vehicle continues to move back into charging dock 1300, contacts on the autonomous vehicle will slide over contacts 1304, pushing contact holders 1306 down. The biasing force of springs 1312 helps maintain connection between charging station contacts 1304 and charger contacts of the autonomous vehicle. It can be noted that shapes and placement of contacts 1304 allow for charging to occur even if there is some misalignment between the autonomous vehicle and the charging dock 1300.

In view of these disclosures—and as will be readily-appreciated and well-understood by skilled artisans—various implementations disclosed herein are directed to an autonomous vehicle charging station featuring self-cleaning contact points, power flow safety features, and electrical connection testing (meeting minimum performance thresholds) for safe and efficient power transfer from the charging station to the autonomous vehicle. More specifically, disclosed herein are various implementations directed to systems, processes, apparatuses, methods, computer-readable instructions, and other implementations for charging an autonomous vehicle at a charging station comprising: docking the autonomous vehicle at the charging station; establishing power line modem (PLM) communications between the autonomous vehicle and the charging station via an electrical power connection resulting from the docking; determining that the electrical power connection is without current diversion before sending a full charge over said electrical power connection; and charging the autonomous vehicle. Several such implementations may further comprise: re-docking the autonomous vehicle at the charging station if the power line modem (PLM) communications cannot be established; charging the autonomous vehicle until it is fully charged or charging the autonomous vehicle until it is optimally charged, said optimal charge being less than fully charged; and/or charging the autonomous vehicle until it is fully charged or optimally charged, said optimal charge being less than fully charged.

For several implementations disclosed herein, determining that the electrical power connection is without current diversion may comprise: transmitting a fixed amount of electrical power from the autonomous vehicle to the charging station via the electrical power connection; and determining whether the difference between the power transmitted by the autonomous vehicle and the power received by the charging station exceeds a threshold for indicating current diversion. For several such implementations, the electrical power transmitted is non-lethal. For certain implementations, the electrical power connection may be formed by a set of autonomous vehicle contacts physically contacting, with a biasing force or pressure, a corresponding set of charging station contacts and, for several such implementations, this biasing force or pressure exposes an electricity-conducing surface for each of the set of autonomous vehicle contacts and the corresponding set of charging station contacts.

Alternative implementations disclosed herein may also include a charging station that pre-charges replacement batteries for the autonomous vehicle and then swaps one or more batteries with the autonomous vehicle while it is docked, substantially reducing the time the autonomous vehicle remains docked and not operating while also enabling the depleted batteries removed from the autonomous vehicle to be charged. The autonomous vehicle continues operations using the pre-charged batteries it received from the charging station. Other alternative implementations may combine both a charging component for one or more primary batteries while simultaneously swapping one or more secondary batteries (pre-charged batteries for depleted batteries) to speed up the recharging process. Other alternative implementations may provide simultaneous recharge of different batteries (or groups of batteries) over multiple connection points, and different connection points may vary in voltage, amperage, or other variations of electrical current including but not limited to the provision of alternating current (AC), direct current (DC), or both.

The various charging station implementations disclosed herein may also be configured to service multiple autonomous vehicles serially or in parallel, and may include logic for varying certain charging parameters (voltage, time, etc.) based on number of autonomous vehicles needing to be charged and an operating plan for the site. Lastly, although the various charging station implementations so far described herein may be fixed or static on-site, other implementations may be moveable and/or mobile such as implementations directed to mobile recharge stations such as those described in the next section.

Mobile Recharge Station

Although fixed on-site charging stations for autonomous vehicles may have certain advantages—for example, being hardwired into an existing power source, maximizing availability for on-site operations, and so forth—they may also have certain disadvantages for operating sites that, for example, do not warrant the cost and build required for a fixed charging station, or operating sites that are not otherwise well-suited to a fixed and immobile charging station. Accordingly, various implementations disclosed herein are directed to mobile charging stations capable of charging multiple autonomous vehicles at more than one operating site, and may further include features whereby certain such implementations of mobile charging stations also act as mobile base stations (MBS) and/or as means of transportation for relocating autonomous vehicles from one site to another while recharging. Certain implementations herein disclosed may be self-propelled, towed, or able to be carried by other conveying means.

Notably, utilization of mobile recharge stations can preclude the need for establishing charging station infrastructure at operating sites, or can supplement (temporarily or on a regular basis) charging station capabilities at one or more operating sites. Moreover, several mobile recharge stations implementations may also provide several additional complimentary services to the site in addition to battery recharging and/or, for several such implementations, a conveying means for transporting autonomous vehicles from site to site. Other services that can be incorporated into and performed by the mobile recharge station include but are not limited to serving as an MBS and/or an RTK base station, housing and environmental protection (while charging and/or while stored or being transported).

The various implementations for a mobile recharge station disclosed herein may also include the following features alone or in any combination with each other: charging contacts and/or contactless charging; removable battery charging and swapping; GPS receiver(s); MBS and/or RTK capabilities; wireless communications with the navigational vehicle(s); (5) environmental controls for improved or optimum recharging and/or storage conditions; multiple recharge points for multiple autonomous vehicles to recharge simultaneously; multiple ports for storage and transportation of multiple autonomous vehicles simultaneously; automated doors, lifts, and other features for on-boarding and off-boarding autonomous vehicles; stabilizing features for protecting the autonomous vehicle during transport; drone storage and deployment for assisted on-site navigation; automated leveling capabilities; automated servicing and/or repair capabilities (e.g., blade sharpening for autonomous mowers, LIDAR cleaning, repair/replace of worn mechanical components, etc.); an enhanced communications subsystem for enhancing communications between the navigational vehicle and an off-site command/control center; and so on and so forth as will be well-understood and readily-appreciated by skilled artisans.

As for sources of power, the mobile recharge station may include its own power storage means (e.g., batteries) as well as means for interfacing directly with AC and/or DC inbound power sources and/or generating its own electrical power including but not limited to combustion power generators (and fuel storage for same), solar panels, wind turbines, and other such sources.

Figure 14:
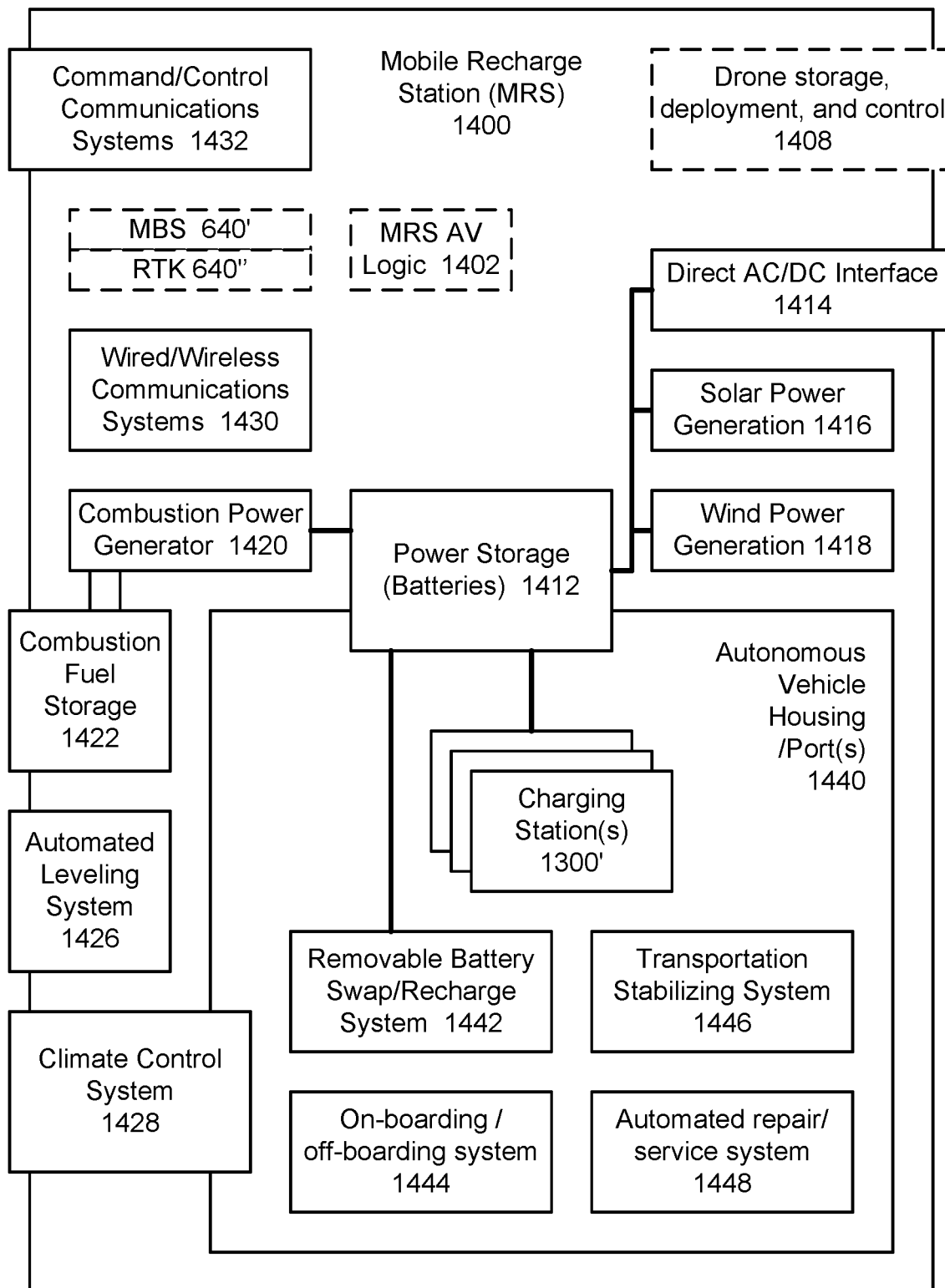
FIG. 14 is a block diagram of a mobile recharge station for charging/recharging an autonomous vehicle (or multiple autonomous vehicles) representative of various implementations disclosed herein.

FIG. 14 is a block diagram of a mobile recharge station for charging/recharging an autonomous vehicle (or multiple autonomous vehicles) representative of various implementations disclosed herein. In FIG. 14, the mobile recharge station (MRS) 1400 may comprise one or more charging stations 1300' (akin to said charging dock 1300) electrically coupled to MRS power storage (batteries) 1412 which, in turn, may be electrically coupled to an external direct-source AC/DC interface 1414, solar panel generation 1416, and/or wind power generation 1418. The MRS power storage (batteries) 1412 may also be electrically coupled to a combustion power generator 1420 that may draw fuel for combustion from a combustion fuel storage 1422. For certain implementations, power storage 1412 may also comprise power conversion such as AC/DC or DC/DC, but in any event power storage 1412 is optional and not necessary for directly recharging batteries of the autonomous vehicle.

The charging stations 1300' may be located in—and engageable by one or more autonomous vehicles also located within—the autonomous vehicle housing/port(s) 1440 of the MRS 1400. The housing/port(s) 1440 may further comprise a removable battery swap/recharge system 1442, electrically coupled to the power storage (batteries) 1412, as well as an on-boarding/off-boarding system 1444 for the bringing in and taking out of autonomous vehicles relative to the housing/port(s) 1440. The housing/port(s) 1440 may also further comprise a transportation stabilizing system 1446 for protecting autonomous vehicle(s) while being transported from one location to another by the MRS, and the housing/port(s) 1440 also may comprise an automated repair/service system 1448 for servicing or performing maintenance on autonomous vehicle(s) while they are located within the housing/port(s) 1440. The MRS 1400 may also comprises an automated leveling system 1426 for leveling the MRS, as well as a climate control system 1428 for maintaining a sufficiently optimal recharge/transportation/storage environment for the autonomous vehicle(s) while located within the autonomous vehicle housing/port(s) 1440.

In addition, and with regard to certain implementations herein disclosed, the MRS 1400 may further comprise wired and/or wireless communications systems 1430 for communications between the MRS 1400 and the autonomous vehicles, as well as command/control communications systems 1432 for facilitating communications with off-site command and control systems and the MRS 1400 and/or the autonomous vehicles(s). For specific implementation of the MRS 1400 as an autonomous vehicle itself, the MRS 1400 may further comprise MRS autonomous vehicle logic 1402 suitable for its self-navigation from site to site or location to location. The MRS 1400 may also comprise and/or constitute an MBS 640' and/or an RTK base station 640" in accordance with these features as described earlier herein and as well-known and readily-appreciated by skilled artisans. The MRS 1400 may also comprise system(s) for drone storage, deployment, and/or control 1408 as a mobile platform for launching, utilizing, and maintaining such drones.

Based on the foregoing, various implementations disclosed herein are directed to mobile charging stations capable of charging multiple autonomous vehicles at more than one operating site, and may further include features whereby certain such implementations of mobile charging stations also act as mobile base stations (MBS) and/or as means of transportation for relocating autonomous vehicles from one location to another while recharging. Certain implementations herein disclosed may be self-propelled, towed, or able to be carried by other conveying means. Also, as used herein, the term "battery" may include capacitors, super-capacitors, or other power storage devices or power sources.

More specifically, disclosed herein are various implementations directed to systems, processes, apparatuses, methods, computer-readable instructions, and other implementations for a mobile recharge station (MRS) for an autonomous vehicle comprising: a self-contained platform capable of self-relocating or being relocated from a first operating site to a second operating site; a charging station coupled to the mobile platform and capable of charging the navigational vehicle both when the MBS is not moving and when the MBS is relocating from a first location to a second location; and/or a GNSS-based location subsystem. Several such implementations may further comprise: an environmentally controlled compartment for the autonomous vehicle and, for certain such implementations, wherein the environmentally controlled compartment comprises an air-conditioning unit capable of maintaining a compartment temperature at or below a first threshold while the autonomous vehicle is charging; a second charging station coupled to the mobile platform and capable of charging a second navigational vehicle while simultaneously charging the navigational vehicle; a battery swapping mechanism for removing a first battery from the autonomous vehicle and emplacing a second battery in the autonomous vehicle; an automated service or repair component for performing an automated service or repair on the autonomous vehicle. For select implementations, the autonomous vehicle may be an autonomous mower comprising a mowing blade as well as an automated service or repair component for sharpening the mowing blade.

Alternative or supplemental implementation herein disclosed may be directed to a mobile recharge station (MRS) for an autonomous vehicle comprising: a self-contained platform capable of self-relocating or being vehicularly-relocated from a first operating site to a second operating site; a charging station coupled to the mobile platform and capable of charging the navigational vehicle both when the MBS is not moving and when the MBS is relocating from a first location to a second location; and on-board batteries for storing power for transfer to the autonomous vehicle. Several such implementations may further comprise an interface for inbound AC or DC power sources for directly charging the autonomous vehicle and for directly recharging the on-board batteries of the MRS; a combustion power generator capable of generating electrical power and a storage for fuel for said combustion power generator; at least one solar panel for generating electrical power; a wireless communication system capable of communicating with the navigational vehicle; and/or a power line modem (PLM) communications interface for communicating with the navigational vehicle when docked for charging.

Further alternative or supplemental implementations herein disclosed may also be directed to a mobile recharge station (MRS) for an autonomous vehicle comprising: a self-contained mobile platform; a charging station coupled to the mobile platform and capable of charging the navigational vehicle both when the MBS is not moving and when the MBS is relocating from a first location to a second location; and stabilizing features for minimizing movement of the autonomous vehicle while relocating, stabilizing the MRS to allows the autonomous vehicle to enter and leave the MRS without tipping the MRS or causing the MRS to move (e.g., stabilizing jacks), and so forth. For several such implementations: the MRS may be towable by a tracked or wheeled vehicle; the MRS may be itself be a tracked or wheeled vehicle; the MRS may be an autonomous vehicle capable of relocating from a first operation site to a second operating site; the MRS may be an airlift conveyance capable of being transported by one or more drones or other flight-based vehicle(s); the MRS may further comprise a base station or an RTK base station; and/or the MRS may comprise an enhanced communications subsystem for enhancing communications between the navigational vehicle and a command/control center.

The various mobile recharge station implementations disclosed herein may also be configured to service multiple autonomous vehicles serially or in parallel, and may include logic for varying certain charging parameters (voltage, time, etc.) based on number of autonomous vehicles needing to be charged, an operating plan for the site, and the frequency and duration of the mobile recharge stations presence on the site. Lastly, although the various mobile recharge station implementations described herein may be mobile and moveable, other implementations featuring similar or identical features may be implemented as fixed on-site charging stations such as those described in the previous section.

Solar-Based Semi-Mobile Recharge Skid

As alluded to earlier herein, certain autonomous vehicles may need to operate in areas lacking direct AC power sources and/or where the necessary infrastructure for supplying fast high-power DC-based recharging is impractical or not desired. While some such areas might be serviceable utilizing various implementations of mobile recharge stations (MRS) described earlier herein, other areas might have features which are not optimally served by MRSs alone or at all. For example, a sufficiently remote site might not be suitable for an MRS to reach regularly enough or easily enough to be economical, or the site's recharging demands may exceed the capacity of a single MRS but where use of multiple MRSs is impractical. Similarly, other sites that may be initially serviceable by fixed charging station infrastructure established on the site or by one or more MRSs regularly visiting the site, but which later on require increase recharging capacity—due to seasonality, site expansion, etc.—may not warrant additional infrastructure builds or increased MRS visits but would benefit from a low-cost high-power DC recharge solution. Other possible solutions—such as mounting solar panels directly to an autonomous vehicle—may be useful and utilized for some implementations but may not be an adequate or complete solution, and options for drawing power from the site itself—such as drawing power directly the solar panels already emplaced at a solar farm for example—may not be possible or practical for myriad reasons that will be readily apparent to skilled artisans.

Accordingly, in order to augment on-site fixed charging stations and/or mobile recharge stations—or a lack thereof—various implementations disclosed herein are directed to a solar-based semi-mobile recharge skid ("solar skid"). The solar skids of several such implementations may operate in conjunction with fixed charging stations or mobile recharge stations and/or that operate independently. These solar skids are able to supply DC power for charging high-power electric-based autonomous vehicles—supplying variable charging power levels as needed—in a relatively short period of time and at relatively low cost. Various implementations are also directed to modular-based solar skids that can be interconnected for higher levels of recharge power.

Figure 15:
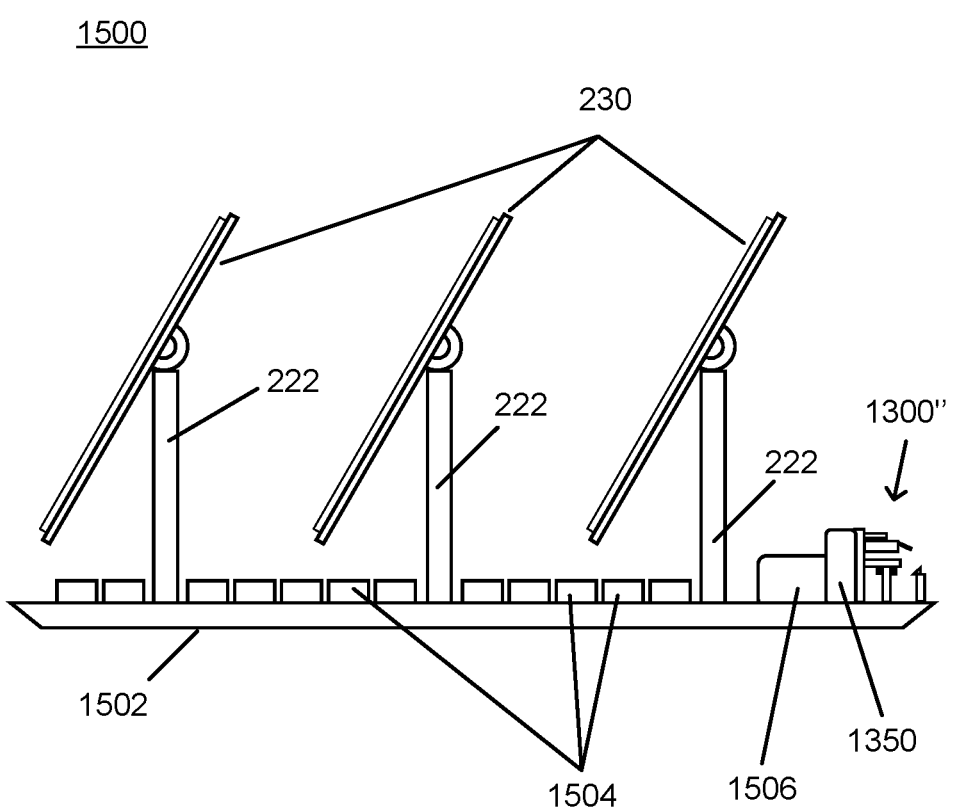
FIG. 15 is an illustration of a solar-based semi-mobile recharge skid for use with an autonomous vehicle charging station, a mobile recharge station, or directly with an autonomous vehicle representative of various implementations disclosed herein.

FIG. 15 is an illustration of a solar-based semi-mobile recharge skid 1500 ("solar skid") for use with an autonomous vehicle charging station, a mobile recharge station, or directly with an autonomous vehicle representative of various implementations disclosed herein. As illustrated in FIG. 15, the solar skid 1500 may comprise a base 1502 (or "skid base") and a plurality of solar panels 230 moveably affixed on posts 222 that are fixedly coupled to the base 1502 and, for certain such implementations, said solar panels 230 are capable of tracking the movement of the sun as discussed earlier herein. For certain alternative implementations, however, the solar panels might not track the sun but are instead oriented (along with the entire skid) toward the sun in a more general sense, and such solar panels may be affixed directly to the skid without utilizing solar panel posts. The base 1502 of the solar skid 1500 may comprise a ground-engaging surface for relatively fixed emplacement at an operating site, and may further comprise additional stabilizing features such pegs, spikes, or other emplaceable/removable features to better affix the base to the ground where it is placed at the operating site.

The solar skid 1500 may further comprises a plurality of ballast blocks 1504 for weighing down the base 1502 once emplaced on-site—and easily removed from the base to later relocate the solar skid 1500 to another location—said ballast blocks 1504 comprising power storage (batteries), modular dead weight, or a combination of both. Of course, weighing down the base 1502 may instead be accomplished with any of a variety of alternative materials such as cinder blocks, gravel, stones, liquid container(s) and liquid, and so forth. For select implementations, the ballast blocks may be liquid containers fillable with water, for example, and facilitate quick emptying for when the solar skid 1500 is to be moved to another location; for other select implementations, the ballast blocks may be combustible fuel storage for an on-board combustible fuel generator for augmenting power generating by the solar panels or for refueling similar generators aboard a mobile base station or other vehicles including, without limitation, autonomous vehicles that may utilize a combustion engine for power generation or otherwise. Regardless, for storing power generated by the solar panels, one or more batteries is also included with the recharge skid 1500 as ballast blocks 1504 or as a separate subcomponents including without limitation swappable batteries (discussed herein).

As further illustrated in FIG. 15, the solar skid 1500 may further comprise a charging station comprising a charging port 1300" (akin to said charging dock 1300 and charging station 1300') and a charging subsystem 1350 powered by the solar panels 230 and/or from batteries (e.g., batteries from among the ballast blocks 1504). In addition to or in lieu of the charging station 1300", the solar skid 1500 may further comprise an engagement or energy transfer component for connecting directly to an on-site fixed charging station, a mobile recharge station 1400, or to one or more additional solar skids 1500. Regarding the latter—where one or more solar skids 1500 are operationally coupled together—said solar skids 1500 may be coupled in serial (to increase voltage output) or in parallel (to increase amperage), and this coupling may be dynamic insofar as offering one or the other at any given time simply by appropriate wiring and subsequent switching performed by an automated selection capability.

Solar skid 1500 may further comprise one or more supplemental subsystem(s) (SS)—represented by SS 1506 in FIG. 15—said SS comprising, or comprising the equivalent functionality of, one or more of the following: logic for a solar-tracking system (by which the solar panels 230 move to track motion of the sun), a mobile base station, a RTK base station, a GPS receiver, a backup combustion generator, a backup power storage (battery), and/or any of the other systems or functionalities described herein.

In operation, some or all of the various components of the solar skid 1500 may be easily assembled and disassembled to facilitate transportation, setup, and subsequent takedown for future relocation. For example, the solar panels 230 and solar panel posts 222 may be detachable from each other and from base 1502, and the ballast blocks 1504 and other components may also be easily attached or removed as needed. In this manner, several solar skids 1500 can be transported simultaneously—such as stacked on the back of a flatbed truck for example—and emplaced on one or more sites with minimal setup and intermediate-term operation.

In this manner—and as will be appreciated and understood by skilled artisans—various implementations disclosed herein are directed to a solar-based semi-mobile recharge skid ("solar skid") for augmenting on-site fixed charging stations and/or mobile recharge stations, as well as for autonomous operation. The solar skids of several such implementations may operate in conjunction with fixed charging stations, mobile recharge stations, both, or neither (i.e., operating independently). These solar skids are able to supply DC power for charging high-power electric-based autonomous vehicles—including providing variable charging power levels if needed—in a relatively short period of time and at relatively low cost. Various implementations are also directed to modular-based solar skids that can be interconnected for even higher levels and greater availability of recharge power.

More specifically, disclosed herein are various implementations directed to systems, processes, apparatuses, methods, computer-readable instructions, and other implementations for semi-mobile solar-powered recharging for an autonomous vehicle at an operating site comprising: at least one solar panel; a skid upon which the at least one solar panel is capable of being directly or indirectly affixed at the operating site; at least one battery capable of storing power generated by the at least one solar panels; and at least one charging port for transferring power stored in the at least one battery to the autonomous vehicle. Several such implementations may further comprise: removable ballast capable of being directly or indirectly emplaced and removed on said skid at the operating site, said ballast comprising in part the at least one battery; at least one solar panel post directly affixed to the skid, and wherein said at least one solar panel is moveable affixed to said solar panel post; a solar tracking system that enables the at least one solar panel to track movement of the sun; a charging station for an autonomous vehicle, said charging station comprising a charging dock, said charging station and charging dock coupled to the skid and electrically engageable by the autonomous vehicle; and/or a mobile base station (MBS); a real-time kinematic (RTK) base station.

Several implementations disclosed herein, substitutionally or supplementally, may be directed to an apparatus for semi-mobile solar-powered recharging for an autonomous vehicle comprising at least one solar panel; a skid upon which the at least one solar panel is capable of being directly or indirectly affixed; a plurality of batteries capable of storing power generated by the at least one solar panel, said plurality of batteries comprising ballast for the skid when affixed to the skid; and at least one charging port affixed to the skid and capable of transferring power stored in the plurality of batteries to the autonomous vehicle. For several such implementations: the apparatus may comprise three solar panels; the skid may comprise a ground-engaging surface for relatively fixed emplacement at an operating site; the batteries, solar panels, and charging port may be removable in order to facilitate relocating the apparatus from a first location to a second location; the apparatus may further comprise logic for autonomous operation to include charging the plurality of batteries and recharging an autonomous vehicle; wherein the charging port comprises a charging dock capable of being slideably engaged by an autonomous vehicle; and/or wherein charging the autonomous vehicle only occurs after power line modem (PLM) communications have been established between the autonomous vehicle and the apparatus.

For certain implementations disclosed herein, substitutionally or supplementally, may be directed to an apparatus for semi-mobile solar power generation comprising: at least one solar panel; a skid upon which the at least one solar panel is capable of being directly or indirectly affixed; at least one battery capable of storing power generated by the at least one solar panels; and an energy transfer component for directly or indirectly transferring power stored in the at least one battery to at least one device. Select implementations may further comprises feature whereby: the at least one device is a charging station; the apparatus is electrically coupled to at least one additional apparatus for semi-mobile solar-powered recharging for an autonomous vehicle at an operating site; the apparatus and the at least one additional apparatus are electrically coupled in series; the apparatus and the at least one additional apparatus are electrically coupled in parallel; and/or a series/parallel automated selection subsystem such that the apparatus and the at least one additional apparatus are electrically coupled for selectively operating in series or in parallel per operation of said automated selection subsystem.

Monitoring and Control Platform

An operator or its customer(s) may have multiple, geographically distributed sites (e.g., renewable energy farms or other sites) at which automated maintenance operations are to be performed. To facilitate such operations, autonomous vehicles that provide automated maintenance systems can be deployed to each site. The number and type automated maintenance systems deployed can depend, for example, on the size of each site, the types of maintenance operations to be performed, the frequency of maintenance and other factors. Autonomous vehicles may thus provide a variety of mobile automated maintenance systems such as, but not limited to, mowing systems, inspection maintenance systems, cleaning maintenance systems, fire protection maintenance systems, repair maintenance systems or other mobile automated maintenance systems. The deployed autonomous vehicles may include, in some implementations, an autonomous robot or may otherwise employ various features described herein.

Various implementations disclosed herein are directed to a command and control center and related infrastructure collectively serving as an overarching mission control for unifying the communication to autonomous vehicles via a single set of communications protocols focused on security, transmission speed, and other factors inherent to autonomous vehicle operations at multiple distributed sites. Several such implementations may comprise a centralized command and control facility capable of performing data management and analytics, provide supplemental security services, and grant portal-based access for customer support including but not limited to the ability for customers to view information pertaining to autonomous vehicles operating on their locations real-time, both individually and in the aggregate. For several such implementations, detailed data may be captured and/or stored from all devices communicatively coupled to the command and control center for analysis and optimization of the entire network of devices, and individual components of the overall system may be controlled—including override capabilities—and all activities (including human-based activities) may be logged and traceable.

Figure 16:
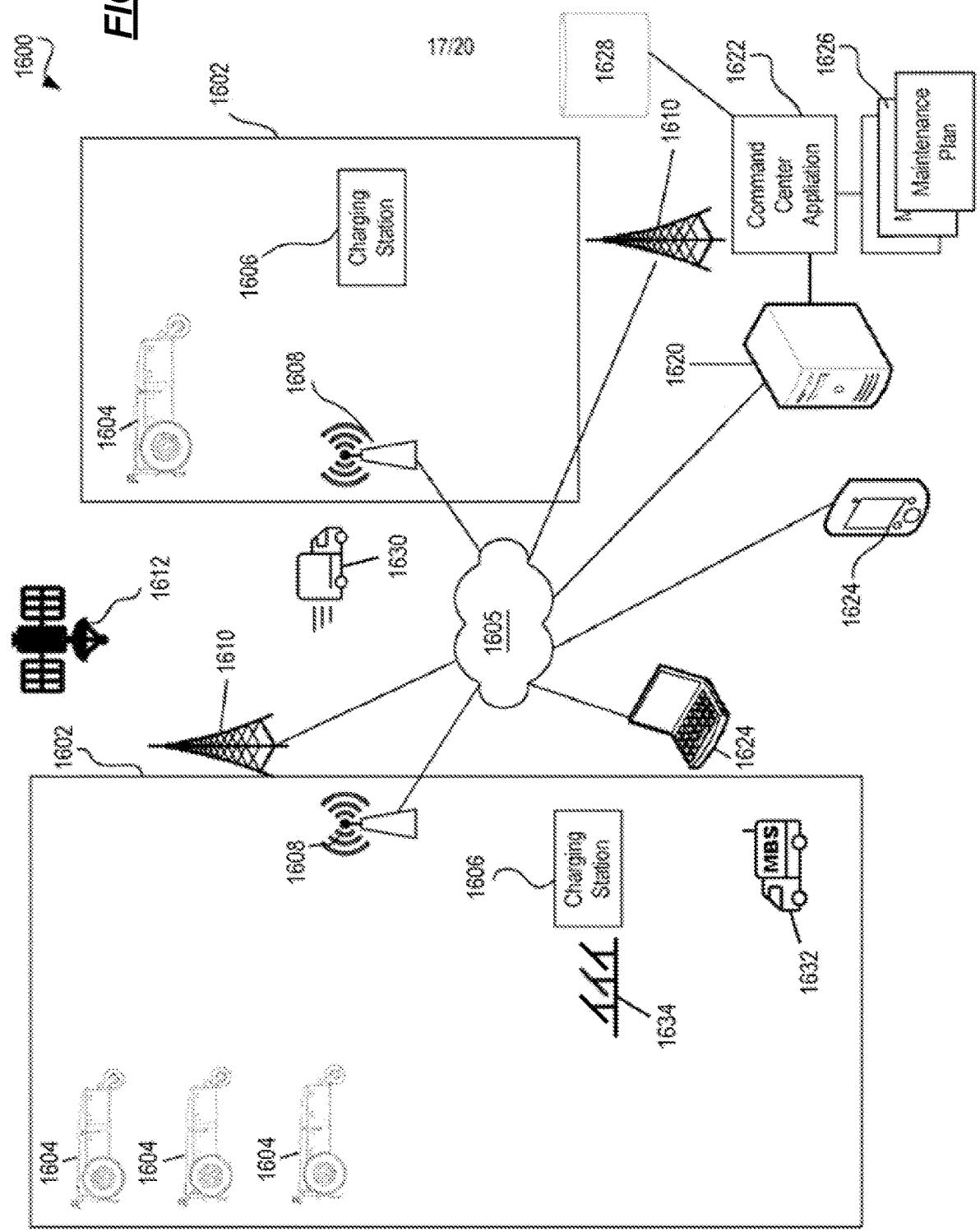
FIG. 16 is a diagrammatic representation of a communication network for use in controlling and/or monitoring a plurality of autonomous vehicles, mobile base stations, mobile recharging stations, and other devices representative of various implementations disclosed herein.

FIG. 16 is a diagrammatic representation of a communication network for use in controlling and/or monitoring a plurality of autonomous vehicles, mobile base stations, mobile recharging stations, and other devices representative of various implementations disclosed herein. More specifically, and by way of example, in FIG. 16 a "distributed maintenance system" 1600 is illustrated, although said implementations are in no way limited to any narrowing concept of "maintenance" but instead should be interpreted to include any and all uses for which autonomous vehicles may be utilized or deployed.

In FIG. 16, one or more charging stations 1606 may be deployed at each of the geographically distributed sites 1602 for charging one or more autonomous vehicles 1604. Charging stations 1606 can be connected to the local power grid, directly to the renewable energy farm, or to other power source including one or more solar skids 1634. Each charging station 1606 includes an interface to connect with and provide power to autonomous vehicles 1604. In some implementations, charging stations 1606 may also have the capability to establish charger communications with a docked deployed autonomous vehicle 1604 via power-line communication or other protocol that uses the charger power lines or other connections.

For various implementations disclosed herein, autonomous vehicles 1604 can connect to and communicate with a central management system 1620 via a network 1605, and this central management system can operate as a command and control center for collective operations for the distributed maintenance system 1600. Network 1605 can include a combination of wired and wireless networks that may be utilized for various types of network communications. According to one implementation, one or more wireless devices 1608 (e.g., access points or gateways) may be deployed at each site 1602 to create a wireless network at the site 1602 that is connected to network 1605. The type of wireless devices 1608 deployed may depend on the type of network connectivity available at the site 1602. For example, a wireless device 1608 may be a device that connects to the Internet through to a local ISP, a satellite data network, a GPRS network or other cellular data network.

If there is an available GPRS network or other cellular data network or cell-based radio network technology mobile network (e.g., as represented by towers 1610), the deployed autonomous vehicle 1604 may also connect to that network to communicate with central management system 1620. In some implementations, charging stations 1606 may also communicate with central management system 1620 via network 1605. Autonomous vehicles 1604 can receive commands, configuration information, updates, and other data from central control system 1620 and send status information, alerts, collected data and other information to central management system 1620. Further as illustrated, autonomous vehicles 1604 receive GPS data from a GPS network 1612.

Central management system 1620 comprises one or more computer systems with central processing units executing instructions embodied on one or more computer readable media where the instructions are configured to perform at least some of the functionality associated with implementations of the present invention. In the illustrated implementation, these applications include command center application 1622.

Command center application 1622—which may be maintained at a centralized command and control location—may comprise one or more applications configured to implement one or more interfaces utilized by central management system 1620 to gather data from or provide data to client computing devices 1624, autonomous vehicles 1604, various information provider systems or other systems. Central management system 1620 utilizes interfaces configured to, for example, receive and respond to queries from users at client computing devices 1624, interface with autonomous vehicles 1604 or other components of the distributed maintenance system, interface with various information provider systems, obtain data from or provide data obtained, or determined, by central management system 1620 to client computing devices 1624, information provider systems, autonomous vehicles 1604 or other components of the distributed maintenance system.

It will be understood that the particular interface utilized in a given context may depend on the functionality being implemented by central management system 1620, the type of network 1605 utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

For various implementations, a command and control operator may establish maintenance plans 1626 (e.g., inspection plans, cleaning plans, mow plans) for a site 1602 to be maintained, said plans and other data of the system being storable at storage device(s) 1628. With respect to mowing for example, a site 1602 can be broken into a grid and a mow plan established for each portion of the grid, where the mow plan for a grid portion specifies the paths a mowing system is to follow to mow that grid portion. A path is considered to be a line that exists in real world space between two GPS coordinate points, or other coordinate system points. Paths have a start point and an end point defined by GPS coordinates. According to one implementation, paths can be either straight or curved, and are typically definable by some mathematical geometric construct, such as a line or curve in two-dimensional space, or a line or spline in three-dimensional space, as examples.

For the various implementations, paths may be generated either manually or algorithmically. Autonomous vehicles 1604 can use paths as a guide for driving. As an autonomous vehicle traverses along the path, the autonomous vehicle (e.g., its main computer 602 or other onboard processing system) may compare its position via GPS coordinates to the path and makes corrections as necessary to follow the path as accurately as the mechanical capabilities and/or precision of the sensors of the autonomous vehicle will allow. Paths are generally lines of travel which are defined in a way to allow the autonomous vehicle to safely traverse near and around static obstacles in the operating space, and thus a route is a collection of paths which are interconnected either at end points or any point along intersecting paths referred to as "nodes."

FIG. 16 also shows a mobile recharge station (MRS) 1630 moving between sites 1602, ostensibly carrying an autonomous vehicle from one operation site to another and charging said autonomous vehicle while in transit. Meanwhile, mobile base station 1632 is shown on site 1602 and ready to provide offsets (described earlier herein) while solar-based semi-mobile recharge skid 1634 provides solar power to charging station 1606 at one of the sites 1602.

Based on these disclosures in specific view of FIG. 16 and supported by the other figures, various implementations disclosed herein are directed to a command and control center and related infrastructure collectively serving as an overarching mission control for unifying the communication to autonomous vehicles via a single set of communications protocols focused on security, transmission speed, and other factors inherent to autonomous vehicle operations at multiple distributed sites. Several such implementations may comprise a centralized command and control facility capable of performing data management and analytics, provide supplemental security services, and grant portal-based access for customer support including but not limited to the ability for customers to view information pertaining to autonomous vehicles operating on their locations real-time, both individually and in the aggregate.

Stated differently, disclosed herein are various implementations directed to systems, processes, apparatuses, methods, computer-readable instructions, and other implementations for coordinating operations for a plurality of autonomous vehicles, the system comprising at least one subsystem configured for: receiving operating data from each of the plurality of autonomous vehicles that comprise a first operating group; determining a control optimization with regard to the plurality of autonomous vehicles based at least in part on the operating data received; and issuing at least one coordinating command to at least one asset in the operating group for implementing the control optimization. Various such implementations herein disclosed may further feature one or more of the following: wherein the operating data comprises a power level and a power utilization data for at least one autonomous vehicle from among the plurality of autonomous vehicles; wherein the control optimization comprises a coordinating command for recharging at least one autonomous vehicle from among the plurality of autonomous vehicles; wherein the control optimization comprises a coordinating command for re-tasking at least one autonomous vehicle; wherein the control optimization comprises a coordinating command for relocating an autonomous vehicle from a first operating site to a second operating site; wherein the recipient of a coordinating command includes an autonomous vehicle, a mobile recharge station, or a mobile base station. Certain such implementation may further comprise portal-based access for operations occurring at a first operating site to a third party associated with said first operating site.

Exemplary Computing Environment

Figure 17:
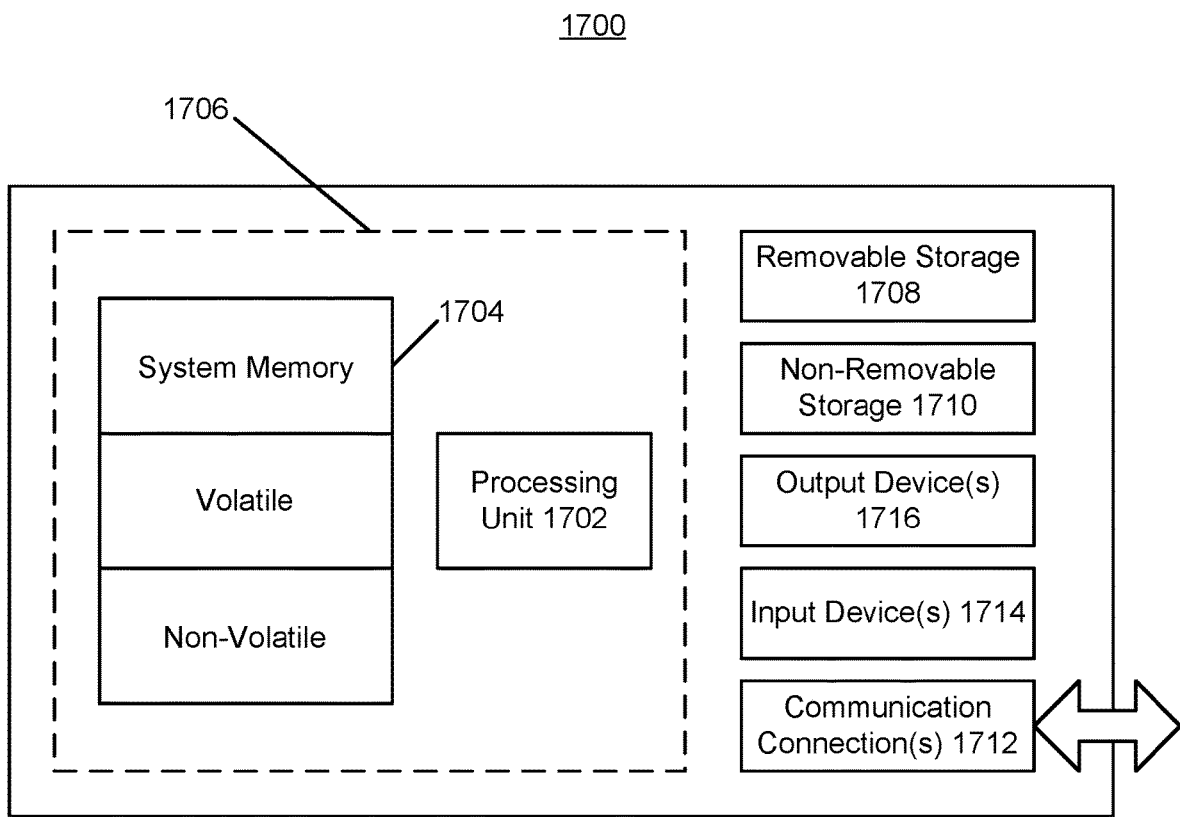
FIG. 17 is a block diagram of an example computing environment that may be used in conjunction with any of the various implementations and aspects herein disclosed.

FIG. 17 is a block diagram of an example computing environment that may be used in conjunction with example implementations and aspects such as those disclosed and described with regard to FIGS. 1-16. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, and so forth that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA), an analog-to-digital converter (ADC), or other programmable logic device, discrete gate or transistor logic, discrete hardware components, discrete data acquisition components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

With reference to FIG. 17, an exemplary system for implementing aspects described herein includes a computing device, such as computing device 1700. In a basic configuration, computing device 1700 typically includes at least one processing unit 1702 and memory 1704. Depending on the exact configuration and type of computing device, memory 1704 may be volatile (such as random access memory (RAM)), non-volatile (such as read-only memory (ROM), flash memory, etc.), or some combination of the two. This basic configuration is illustrated in FIG. 17 by dashed line 1706 as may be referred to collectively as the "compute" component.

Computing device 1700 may have additional features/functionality. For example, computing device 1700 may include additional storage (removable and/or non-removable) including, but not limited to, magnetic or optical disks or tape. Such additional storage is illustrated in FIG. 17 by removable storage 1708 and non-removable storage 1710. Computing device 1700 typically includes a variety of computer readable media. Computer readable media can be any available media that can be accessed by device 1700 and may include both volatile and non-volatile media, as well as both removable and non-removable media.

Computer storage media include volatile and non-volatile media, as well as removable and non-removable media, implemented in any method or technology for storage of information such as computer readable instructions, data structures, program modules or other data. Memory 1704, removable storage 1708, and non-removable storage 1710 are all examples of computer storage media. Computer storage media include, but are not limited to, RAM, ROM, electrically erasable program read-only memory (EEPROM), flash memory or other memory technology, CD-ROM, digital versatile disks (DVD), or other optical storage, magnetic cassettes, magnetic tape, magnetic disk storage or other magnetic storage devices, or any other medium which can be used to store the information and which can be accessed by computing device 1700. Any such computer storage media may be part of computing device 1700.

Computing device 1700 may contain communication connection(s) 1712 that allow the device to communicate with other devices. Computing device 1700 may also have input device(s) 1714 such as a keyboard, mouse, pen, voice input device, touch input device, and so forth. Output device(s) 1716 such as a display, speakers, printer, and so forth may also be included. All these devices are well-known in the art and need not be discussed at length herein. Computing device 1700 may be one of a plurality of computing devices 1700 interconnected by a network. As may be appreciated, the network may be any appropriate network, each computing device 1700 may be connected thereto by way of communication connection(s) 1712 in any appropriate manner, and each computing device 1700 may communicate with one or more of the other computing devices 1700 in the network in any appropriate manner. For example, the network may be a wired or wireless network within an organization or home or the like, and may include a direct or indirect coupling to an external network such as the Internet or the like. Moreover, PCI, PCIe, and other bus protocols might be utilized for embedding the various implementations described herein into other computing systems.

Interpretation of Disclosures Herein

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Certain implementations described herein may utilize a cloud operating environment that supports delivering computing, processing, storage, data management, applications, and other functionality as an abstract service rather than as a standalone product of computer hardware, software, etc. Services may be provided by virtual servers that may be implemented as one or more processes on one or more computing devices. In some implementations, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database, etc.) of a device that is actually providing the service (e.g., computing, storage). Users may access cloud services via, for example, a web browser, a thin client, a mobile application, or in other ways. To the extent any physical components of hardware and software are herein described, equivalent functionality provided via a cloud operating environment is also anticipated and disclosed.

Additionally, a controller service may reside in the cloud and may rely on a server or service to perform processing and may rely on a data store or database to store data. While a single server, a single service, a single data store, and a single database may be utilized, multiple instances of servers, services, data stores, and databases may instead reside in the cloud and may, therefore, be used by the controller service. Likewise, various devices may access the controller service in the cloud, and such devices may include (but are not limited to) a computer, a tablet, a laptop computer, a desktop monitor, a television, a personal digital assistant, and a mobile device (e.g., cellular phone, satellite phone, etc.). It is possible that different users at different locations using different devices may access the controller service through different networks or interfaces. In one example, the controller service may be accessed by a mobile device. In another example, portions of controller service may reside on a mobile device. Regardless, controller service may perform actions including, for example, presenting content on a secondary display, presenting an application (e.g., browser) on a secondary display, presenting a cursor on a secondary display, presenting controls on a secondary display, and/or generating a control event in response to an interaction on the mobile device or other service. In specific implementations, the controller service may perform portions of methods described herein.

Anticipated Alternatives

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other implementations may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

The term "computer-readable instructions" as used above refers to any instructions that may be performed by the processor and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, embodiments, and implementations, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed:

1. A method for recalibrating a mobile base station communicatively coupled to an autonomous vehicle, the method comprising:
   determining a satellite-signal-accurate (SSA) location for the mobile base station based on GPS signals received by the mobile base station; and
   determining a near-survey-accurate (NSA) location for the mobile base station based on the determined SSA location for the mobile base station and applying an offset calculated by the navigational vehicle.

2. The method of claim 1, wherein the offset calculated by the navigational vehicle is based on a difference between a satellite-signal-accurate (SSA) location determined for the navigational vehicle based on GPS signals received by the navigation vehicle, and a near-survey-accurate (NSA) location determined for the navigational vehicle.

3. The method of claim 2, wherein the near-survey-accurate (NSA) location determined for the navigational vehicle is based on the navigational vehicle sensing the relative locations of a plurality of objects each having a known near-survey-accurate (NSA) location.

4. The method of claim 3, wherein the known near-survey-accurate (NSA) location for each object from among the plurality of objects was previously calculated based on a direct-survey-accurate (DSA) location.

5. The method of claim 4, wherein the known near-survey-accurate (NSA) location for each object from among the plurality of objects was previously calculated by the navigational vehicle or by a second navigational vehicle.

6. The method of claim 5, wherein a subset of objects from among the plurality of objects comprises dynamic objects.

7. The method of claim 6, wherein the dynamic objects are solar panels and posts.

8. A system for recalibrating a mobile base station communicatively coupled to an autonomous vehicle, the system comprising at least one subsystem configured for:
   determining a satellite-signal-accurate (SSA) location for the mobile base station based on GPS signals received by the mobile base station; and
   determining a near-survey-accurate (NSA) location for the mobile base station based on the determined SSA location for the mobile base station and applying an offset calculated by the navigational vehicle.

9. The system of claim 8, wherein the offset calculated by the navigational vehicle is based on a difference between a satellite-signal-accurate (SSA) location determined for the navigational vehicle based on GPS signals received by the navigation vehicle, and a near-survey-accurate (NSA) location determined for the navigational vehicle.

10. The system of claim 9, wherein the near-survey-accurate (NSA) location determined for the navigational vehicle is based on the navigational vehicle sensing the relative locations of a plurality of objects each having a known near-survey-accurate (NSA) location.

11. The system of claim 10, wherein the known near-survey-accurate (NSA) location for each object from among the plurality of objects was previously calculated based on a direct-survey-accurate (DSA) location.

12. The system of claim 11, wherein the known near-survey-accurate (NSA) location for each object from among the plurality of objects was previously calculated by the navigational vehicle or by a second navigational vehicle.

13. The system of claim 12, wherein a subset of objects from among the plurality of objects comprises dynamic objects.

14. The system of claim 13, wherein the dynamic objects are solar panels and posts.

15. A non-transitory computer-readable medium comprising computer-executable instructions for recalibrating a mobile base station communicatively coupled to an autonomous vehicle, the computer-executable instructions comprising instructions for:
- determining a satellite-signal-accurate (SSA) location for the mobile base station based on GPS signals received by the mobile base station; and
- determining a near-survey-accurate (NSA) location for the mobile base station based on the determined SSA location for the mobile base station and applying an offset calculated by the navigational vehicle.

16. The computer-readable instructions of claim 15, further comprising instructions whereby the offset calculated by the navigational vehicle is based on a difference between a satellite-signal-accurate (SSA) location determined for the navigational vehicle based on GPS signals received by the navigation vehicle, and a near-survey-accurate (NSA) location determined for the navigational vehicle.

17. The computer-readable instructions of claim 16, further comprising instructions whereby the near-survey-accurate (NSA) location determined for the navigational vehicle is based on the navigational vehicle sensing the relative locations of a plurality of objects each having a known near-survey-accurate (NSA) location.

18. The computer-readable instructions of claim 17, further comprising instructions whereby the known near-survey-accurate (NSA) location for each object from among the plurality of objects was previously calculated based on a direct-survey-accurate (DSA) location.

19. The computer-readable instructions of claim 18, further comprising instructions whereby the known near-survey-accurate (NSA) location for each object from among the plurality of objects was previously calculated by the navigational vehicle or by a second navigational vehicle.

20. The computer-readable instructions of claim 19, further comprising instructions whereby a subset of objects from among the plurality of objects are dynamic objects, and whereby a subset of dynamic objects from among the dynamic objects comprise at least one solar panel and post.

\* \* \* \* \*